United States Patent [19]

Peregrim et al.

[11] Patent Number: 5,430,445
[45] Date of Patent: Jul. 4, 1995

[54] SYNTHETIC APERTURE RADAR GUIDANCE SYSTEM AND METHOD OF OPERATING SAME

[75] Inventors: Theodore J. Peregrim, Bedford; Frank A. Okurowski, Concord; Albert H. Long, Framingham, all of Mass.

[73] Assignee: Raytheon Company, Lexington, Mass.

[21] Appl. No.: 999,758

[22] Filed: Dec. 31, 1992

[51] Int. Cl.$^6$ ............................................. G01S 13/90
[52] U.S. Cl. .................................... 342/25; 342/62; 342/64
[58] Field of Search ................. 342/25, 62, 63, 64

[56] References Cited

U.S. PATENT DOCUMENTS

| | | | |
|---|---|---|---|
| 4,034,370 | 7/1977 | Mims | 343/5 CM |
| 4,084,158 | 4/1978 | Slawsby | 343/5 CM |
| 4,217,583 | 8/1980 | Hiller et al. | 343/7.7 |
| 4,355,311 | 10/1982 | Jain | 343/5 CM |
| 4,387,373 | 6/1983 | Longuemare, Jr. | 343/5 CM |
| 4,559,537 | 12/1985 | Pearson et al. | 343/7 A |
| 4,617,567 | 10/1986 | Chan | 342/25 |
| 4,771,287 | 9/1988 | Mims | 342/25 |
| 4,837,577 | 6/1989 | Peregrim et al. | 342/80 |
| 4,881,079 | 11/1989 | Peregrim | 342/194 |
| 5,018,218 | 5/1991 | Pergrim et al. | 382/22 |
| 5,083,130 | 1/1992 | Cardiasmenos | 342/188 |
| 5,260,709 | 11/1993 | Nowakowski | 342/62 |
| 5,341,142 | 8/1994 | Reis et al. | 342/64 |
| 5,341,143 | 8/1994 | Reis et al. | 342/64 |

OTHER PUBLICATIONS

"Digital versus optical in synthetic aperture radar (SAR) data processing," D. A. Ausherman, Optical Engineering, vol. 19, No. 2, Mar./Apr. 1980, pp. 157–167.
"SAR digital image-formation processing," D. A. Ausherman, SPIE vol. 528 Digital Image Processing (1985) pp. 118–133.
"Motion-Compensated SAR Image ISLR," P. L. Bogler, IEEE Transactions on Geoscience & Remote Sensing, vol. GE-25, Nov. 1987, No. 6, New York, NY, pp. 871–878.
"Synthetic Aperture Radar," L. J. Cutrona, Radar Handbook, McGraw-Hill Publishing Company, Second Edition, pp. 21.1–21.23.

Primary Examiner—John B. Sotomayor
Attorney, Agent, or Firm—Donald F. Mofford; Walter F. Dawson

[57] ABSTRACT

A synthetic aperture radar guidance system adapted for use in a guided missile is described wherein the frequency of the transmitted pulses changes with time with a chirp slope which varies with range. The time between pulses also changes as a function of range. The desired values of the chirp slope and the interpulse interval are computed for all values within a range of interest and stored. Furthermore, the operating parameters of the SAR are changed as the range changes. The time intervals and frequencies are selected to avoid interruption ambiguities and eclipsing. The phase and frequency of the synthesized signal are controlled to adjust for motion of a vehicle on which the SAR is mounted. The SAR is operated in several modes. In a search mode, the beam of transmitted pulses is steered across a mapping area to form a plurality of patches of the mapping area. The patches are combined into one map of the entire area. Each pixel of the map is compared with a target template until a match is provided. Then the SAR operates in track mode wherein a correlation process ensures the missile is steered toward the target area using a template provided using known feature data.

17 Claims, 31 Drawing Sheets

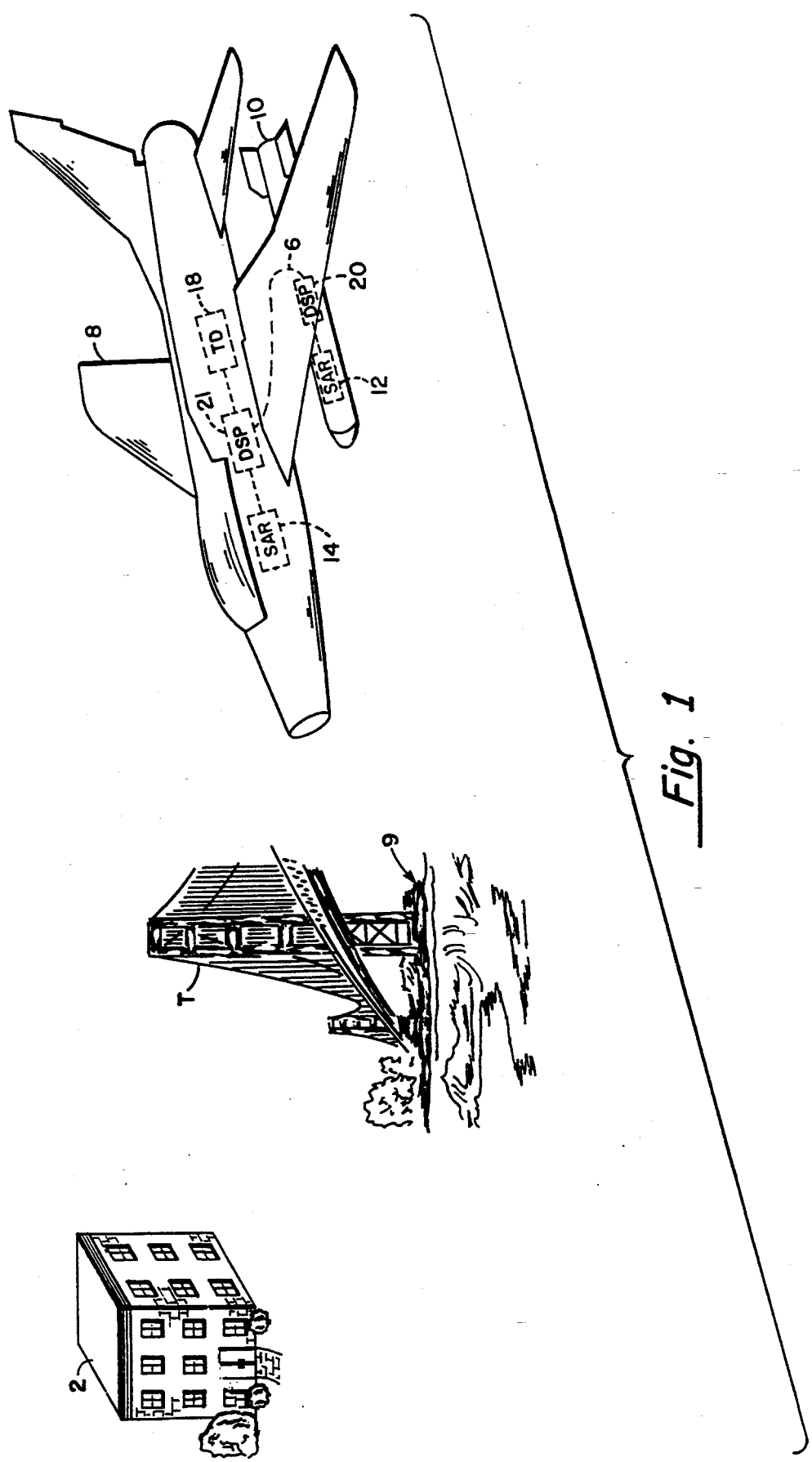

Fig. 14

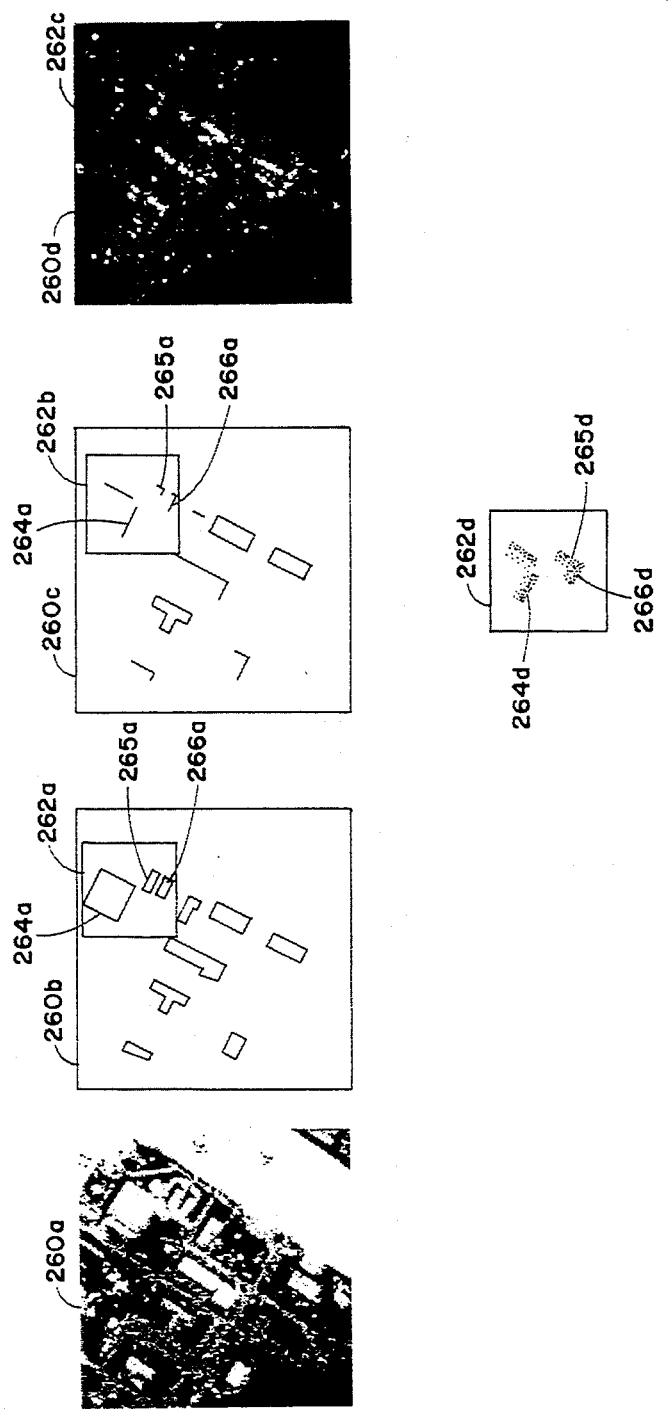
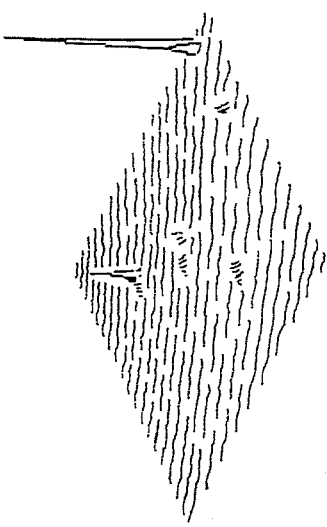
Fig. 20C
Fig. 20D

SYNTHETIC APERTURE RADAR GUIDANCE SYSTEM AND METHOD OF OPERATING SAME

BACKGROUND OF THE INVENTION

This invention pertains generally to synthetic aperture radars and more particularly to a synthetic aperture radar adapted for use in a guided missile.

In a modern military operation, it is desirable to launch a missile from an aircraft toward a target on the ground with the missile having a capability of discriminating between targets. In such a weapon system, the missile must have access to targeting information and must be able to identify a specific target while in flight, thus enabling the aircraft to stay out of the dangerous area around the target.

In one type of weapon system, an aircraft and a missile are equipped with a synthetic aperture radar (SAR). A SAR mounted within an aircraft or a missile makes an image of objects within a field of view of the SAR on the underlying ground. The SAR forms a map of pixels, the pixels (pixel elements) divide objects on the ground into resolution cells. Typically, a human on the aircraft designates a specific object in the image as a target. A portion of the image about the object designated as the target becomes a reference image. After launch, the missile would fly toward the target forming its own SAR images. Data processing circuitry within the missile identifies groups of pixels representing the target. Processing on the missile would compare the reference image with the current image from the missile. The guidance system within the missile would use the results of the image comparisons to generate guidance commands to steer the missile towards the target.

In guiding a missile in this fashion, it is desirable for the SAR to initially make a map of a wide area on the ground. The wide area map helps ensure the target is somewhere in the map. A single beam from a SAR making a wide area map would typically be correspondingly broad, which can be undesirable. For example, such a SAR would be more susceptible to electronic countermeasure techniques and require lengthy real time computational processing time. One proposed solution is to use a SAR with a relatively narrow beam which is scanned over the wide area on the ground. A problem with such an approach is that the portions of the map formed at different portions of the scan need to be related to each other.

Another desirable feature of a SAR used for guiding a missile is that it makes a map with high resolution. The high resolution allows the data processing circuitry to identify relatively small targets. One known way to improve the resolution of a SAR is to increase the bandwidth i.e. sampling rate. However, components which operate at high sampling rates, especially analog to digital converters, are very expensive.

Another problem is, as the missile approaches the target, the viewing angle changes such that the SAR images formed by the missile in flight will differ from the SAR images formed at the time the missile was launched. Thus, the image processing technique must be relatively insensitive to the viewing angle.

One technique used within a missile to guide a missile toward the target is described in U.S. Pat. No. 5,027,422, issued Jun. 25, 1991, to T. J. Peregrim, et al. (which patent is assigned to the same assignee as this application and is incorporated herein by reference). In U.S. Pat. No. 5,027,422, a technique is described for providing a reference template of a designated target. The reference template is then compared to each area of a second image provided by the missile as the missile flies toward the target to find the area within the second image matching the reference template. Once the area of the second image is found to match the reference template, the area of the match indicates the location of the target in the target area image and the direction of the target in the target area image can be provided to the missile control system to adjust the line of flight of the missile. With the latter in mind, it is desirable to develop improved image processing techniques to extract surface targets from clutter and then determine a target aimpoint within the target area image.

SUMMARY OF THE INVENTION

With the foregoing background of this invention in mind, it is a primary object of this invention to provide a synthetic aperture radar capable of making a map of a wide area.

Another object of this invention is to provide a synthetic aperture radar with high resolution at a low cost.

Another object of this invention is to provide a technique to determine target aimpoint within a target area image.

Still another object of this invention is to provide a signal processing technique to improve precision track against specified target aimpoints.

A still further object of this invention is to provide an improved autonomous guidance system.

The foregoing and other objects of this invention are met generally by a synthetic aperture radar (SAR) mounted on a moving object. The SAR transmits pulses towards a mapping area and processes the reflected signals. The frequency of the transmitted pulses changes with time with a chirp slope which varies with range. The time between pulses also changes as a function of range. The desired values of the chirp slope and the interpulse interval are computed for all values within a range of interest and stored. The operating parameters of the SAR are changed as the range changes.

Reflected signals from the transmitted pulses are received and processed. The reflected signals are dechirped and down converted by a synthesized signal. Reflected signals arrive during specific time intervals and falling in a specific frequency range are passed for further processing. The time intervals and frequencies are selected to avoid interruption ambiguities and eclipsing.

The passed signals are processed by a first set of fast fourier transform (FFT) processors producing a first set of signals representing reflections from objects in specific range bins. The first set of signals is further processed by a second set of FFT processors to produce a second set of signals representing reflections in range and azimuthal bins. The second set of signals forms a SAR image of one patch of a mapping area.

According to another feature of the invention, the phase and frequency of the synthesized signal are controlled to adjust for motion of a vehicle on which the SAR is mounted.

According to another feature of the invention, the SAR is operated in several modes. In a search mode, the beam of transmitted pulses is steered across the mapping area to form a plurality of patches of the mapping area. The patches are combined into one map of the entire area. In the initialization mode of operation, patches are formed of a few areas of the mapping area. For each area, a patch is formed using a sum beam and two difference beams of a monopulse radar within the SAR. By comparing values of corresponding pixels in these patches, the height of the vehicle carrying the SAR relative to the mapping area can be calculated.

BRIEF DESCRIPTION OF THE DRAWINGS

For a more complete understanding of this invention, reference is now made to the following description of the accompanying drawings, wherein:

FIG. 1 is a sketch of a system employing the invention;

FIG. 14 is a sketch of a 7 by 7 mask used in the processing of the alternative template processor of FIG. 13;

FIG. 18 is a window illustrating the template generation process for simple roof buildings and the like;

FIGS. 20C and 20D is an illustration showing an example of template feature selection and editing and the predicted radar response;

DESCRIPTION OF THE PREFERRED EMBODIMENT

Figure 1A:
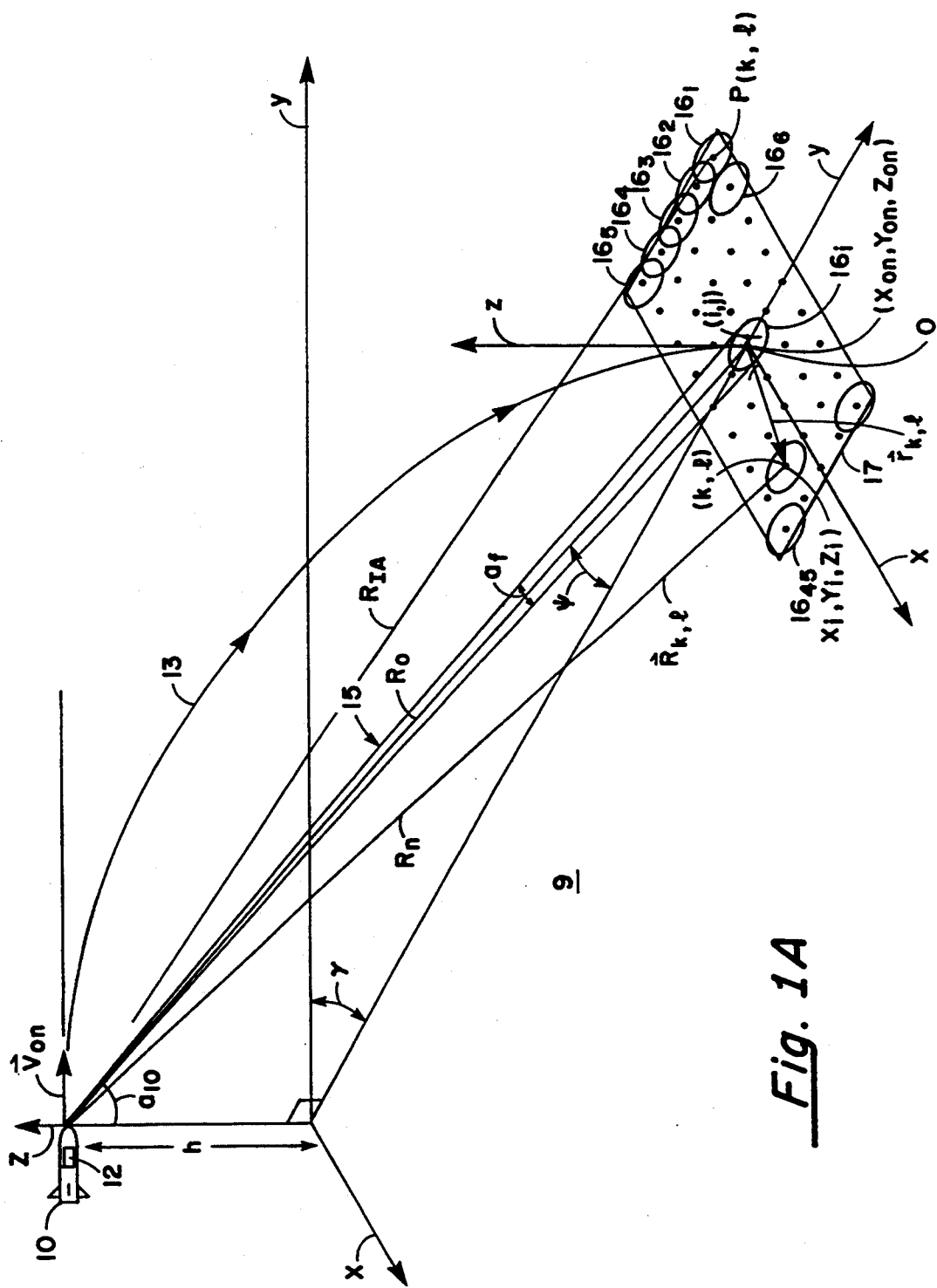
FIG. 1A is a sketch of a typical homing missile engagement useful in understanding the contemplated guidance system.

Referring now to FIG. 1, an airplane 8 is shown armed with a missile 10. The airplane 8 includes a synthetic aperture radar (SAR) 14, which provides a digital image of objects within a field of view on the underlying ground. The digital image produced by the SAR 14 is fed to a digital signal processor 21 wherein the digital image is processed in a manner as described herein below. The digital signal processor 21 is connected to a target designator 18 which here comprises a digital computer with a screen for displaying the digital images from the SAR 14. The target designator 18 also includes an input means (not shown) which allows a pilot (not shown) of the airplane 8 to designate a target (here a trestle T) across a stream (not numbered) within the digital image.

The missile 10 includes a SAR 12 which also makes an image of objects within a field of view on the underlying ground. The digital image produced by the SAR 12 is fed to a digital signal processor 20 wherein the digital image is processed in a manner as described herein below. While the missile 10 is mounted to the airplane 8, a digital link 6 connects the digital signal processor 20 within the missile 10 to the digital signal processor 21 mounted within the airplane 8.

With such an arrangement, the SAR 12 and the SAR 14 are capable of providing digital images to the digital signal processors 20, 21, respectively, and wherein said signals are compared and fed to the target designator 18. As shown, the digital signal provided by the SARs 12, 14 defines the banks of the stream (not numbered), the trestle T and other objects in the field of view such as a building 2 and trees. The pilot using the target designator 18 selects a target within the target area image by sliding a window over the target and further selects an aimpoint within the window, here a point located on the trestle T. The location of the window and the aimpoint within the target area image is fed, via the data link 6 and the digital signal processor 21, to the digital signal processor 20 wherein a reference template is created of the reference image. The digital link 6 here is any known bus for passing digital information from one computer to another. When the missile 10 is fired at the trestle T, digital link 6 is broken. As the missile 10 flies toward the trestle T, the SAR 12 makes further images (hereinafter also referred to as a sensed image) of the target area. The digital signal processor 20 compares the reference template earlier formed with each one of the sensed images produced by the SAR 12. The digital signal processor 20 matches the template to a portion of the sensed image produced by the SAR 12. The missile guidance system (not shown) is then actuated to steer the missile toward the trestle T at the selected aimpoint. A radio data link (not shown) can be maintained between the digital signal processor 20 within the missile 10 and the digital signal processor 21 within the airplane 8 depending upon the application. As the missile 10 flies toward the trestle T updated information is provided between the digital signal processor 20 and the digital signal processor 21. Thus for example, if the trestle T is destroyed by another missile (not shown) and enough time remains the pilot can designate another target, for example, the building 2 by selecting a new aimpoint on the building 2. Alternatively, the missile 10 can be operated as a launch, leave and forget system.

Referring now to FIG. 1A, a missile 10 including a synthetic aperture radar (SAR) 12, according to the present invention is shown in a typical homing missile engagement. Although the following discussion is applied to the missile 10 and the SAR 12, it should be apparent the discussion applies also to the SAR 14 and the airplane 8. The missile 10 flies above the ground 9 at a velocity V. The missile 10 is intended to strike a target (not shown) somewhere in a mapping area 17. The SAR provides maps representing objects within the mapping area 17, allowing data processing circuitry with the missile 10 to locate the target and guide the missile 10 towards the target.

The missile 10 is guided to keep a velocity vector $\overline{V}$ of the missile 10 in a "depression plane". The depression plane is a plane which includes the missile 10, the target (not shown) and a range bin thru the target. The depression plane intersects the ground 9 at an angle around the target. As is known, the missile 10 cannot be steered directly towards the target while making SAR images. The missile 10, therefore, follows a curved path 13 along the depression plane. This path is selected so that the angle between the velocity vector $\overline{V}$ and a line from the missile 10 to the center of the mapping area 14 (i.e. the "line of sight") changes at a constant rate. If this constant rate of change is maintained while a map is being formed, the signal processing performed by the SAR 12 is simplified. If the missile 10 is guided to follow some other path, compensation for the motion of the missile other than described here may be required.

FIG. 1A shows a beam 15 transmitted from the SAR 12 with a beam width at. The beam 15 intersects the ground 9 at patch $16_i$. As is known, the beam 15 will reflect a reflected signal from objects (not shown) within the patch $16_i$ and from the reflected signal the SAR 12 will form an array of pixels representing objects within the patch $16_i$. The patch $16_i$ is much smaller than the mapping area 17. To make a map of the full mapping area, the beam is steered to intersect the ground 9 at a plurality of patches $16_1 \ldots 16_{45}$ (representative ones of the patches being shown). As described further hereinafter, known mechanical methods are used to steer the beam 15 to the various patches $16_1 \ldots 16_{45}$. Alternatively, known methods for electronically steering a beam could also be used.

A grid of reference points which are used to generate beam pointing commands, motion compensation reference signals and timing signals as to be constructed in the horizontal plane (X,Y) of reference coordinates is shown in FIG. 1A. Separation between the reference points are scaled with respect to an initial acquisition range, $R_{IA}$, in map reference coordinates. The initial acquisition range is related to a grid scaling range, $R_o$, and can be represented by:

$$R_o = R_{IA} - V_{IA} [\cos\delta_{IA} \cos\gamma_{IA} \cos\psi_{IA} \sin\delta_{IA} - \sin\psi_{IA}] \cdot \frac{N_{ab}N_{eb}}{2} (T_i + 2T_{snap})$$

where:
$R_{IA}$ is the initial acquisition range;
$R_o$ is the scaling range to the center of the grid, i.e., the origin of map reference coordinates at the time search is half complete;
$V_{IA}$ is the velocity of the seeker at initial acquisition;
$\delta_{IA}$ is the depression angle of the velocity vector at initial acquisition;
$\gamma_{IA}$ is the squint angle at initial acquisition;
$N_{ab}$, $N_{eb}$ are the number of azimuth and elevation beam positions in the grid, respectively;
$T_i$ is the coherent integration time; and
$T_{snap}$ is the time it takes to snap the beam from one beam position to another beam position.

Grid coordinates x and y are centered at the map reference point, O. The y axis is taken to be aligned with the horizontal projection of the scaling range vector $\overline{R}_o$. The spacing between each of the reference points ($P_{kl}$) are set at an integer number of resolution cells. These are arrived at in the following manner, first calculate, $$\Delta X_A = \frac{R_o a_f}{\sqrt{2}}$$

and $$\Delta Y_R = \frac{R_o a_f}{\sqrt{2} \sin\psi_o} B'_{RF}$$

where:
$\Delta X_A$ is the azimuth ground projections of the antenna beamwidth;
$\Delta Y_R$ is the range ground projection of the antenna beamwidth;
$a_f$ is the 3 dB two way antenna beamwidth;
$\psi_o$ is the elevation angle of $R_o$; and
$B'_{RF}$ is the bandwidth ratio of the range bandpass filter ($B_{WR}$) to $\Delta F_b$. If $\Delta F_b \leq B_{WR}$, then $B'_{RF}=1$. If $\Delta F_b > B_{WR}$ then, $$B'_{RF} = \frac{C \Delta F_b \tan\psi_o}{\sqrt{2} \, S \, R_o \, a_f}$$

where:
C is the speed of an electromagnetic signal, typically assumed to be $1 \times 10^9$ ft/sec;
$\Delta F_b$ is the effective range frequency bandwidth; and
S is the chirp slope.

Then the number of azimuth resolution cells between reference points is:

$$N_A = NI\left(\frac{\Delta X_A}{\delta_A}\right)$$

and the number of range resolution cells between the reference points is:

$$N_R = NI\left(\frac{\Delta Y_R \cos\psi_o}{\delta R}\right)$$

where NI takes the nearest integer of the quantity in the parentheses.

Hence, the distance between each reference point $P_{(k,l)}$ in azimuth is:

$$D_A = N_A \delta_A$$

and the total number of azimuth reference points in the grid is:

$$N_{XG} = NI\left(\frac{X_G}{D_A}\right)$$

Similarly, the distance between each reference point $P_{(k,l)}$ in projected ground range $$D_{GR} = N_R \frac{\delta R}{\cos\psi_o}$$

and the total number of projected ground range points in the grid is:

$$N_{YG} = NI\left(\frac{Y_G}{D_{GR}}\right)$$

where:
NI=nearest integer;
$X_G$ is the azimuth dimension of the grid; and
$Y_G$ is the down range dimension of the grid.

The reference points are laid out in the x and y dimensions of the grid starting at the origin.

When range and doppler FFT cells are formed, $N_R$ and $N_A$ of their corresponding amplitudes are placed sequentially (as the beam is snapped) in a range, range rate acquisition array located in parameter memory 130. The latter have been designed to fit in adjacent positions following the raster scan sequencing.

All motion compensation, antenna pointing and timing signals are derived from the kl position vector ($\bar{r}_{kl}$) in the grid relative to the map reference point and the position vector from the seeker to map reference point ($\bar{R}$). The map reference point is usually taken to be at the best estimate when guiding a missile, a priori, of the target aimpoint. In vector form, the basic reference signal for the timing and control unit 128 is:

$$\bar{R}_{kl} = \bar{R} + \bar{r}_{kl}$$

wherein $\bar{R}$ is calculated from seeker inertial measurements, while $\bar{r}_{kl}$ is a grid vector denoting the kl reference point under illumination. Antenna pointing commands are generated by transforming the normalized $\bar{R}_{kl}$ components, which are in reference coordinates, to antenna coordinates and using the corresponding (antenna plane) direction cosines as error signals as described further hereinafter.

Figure 2:
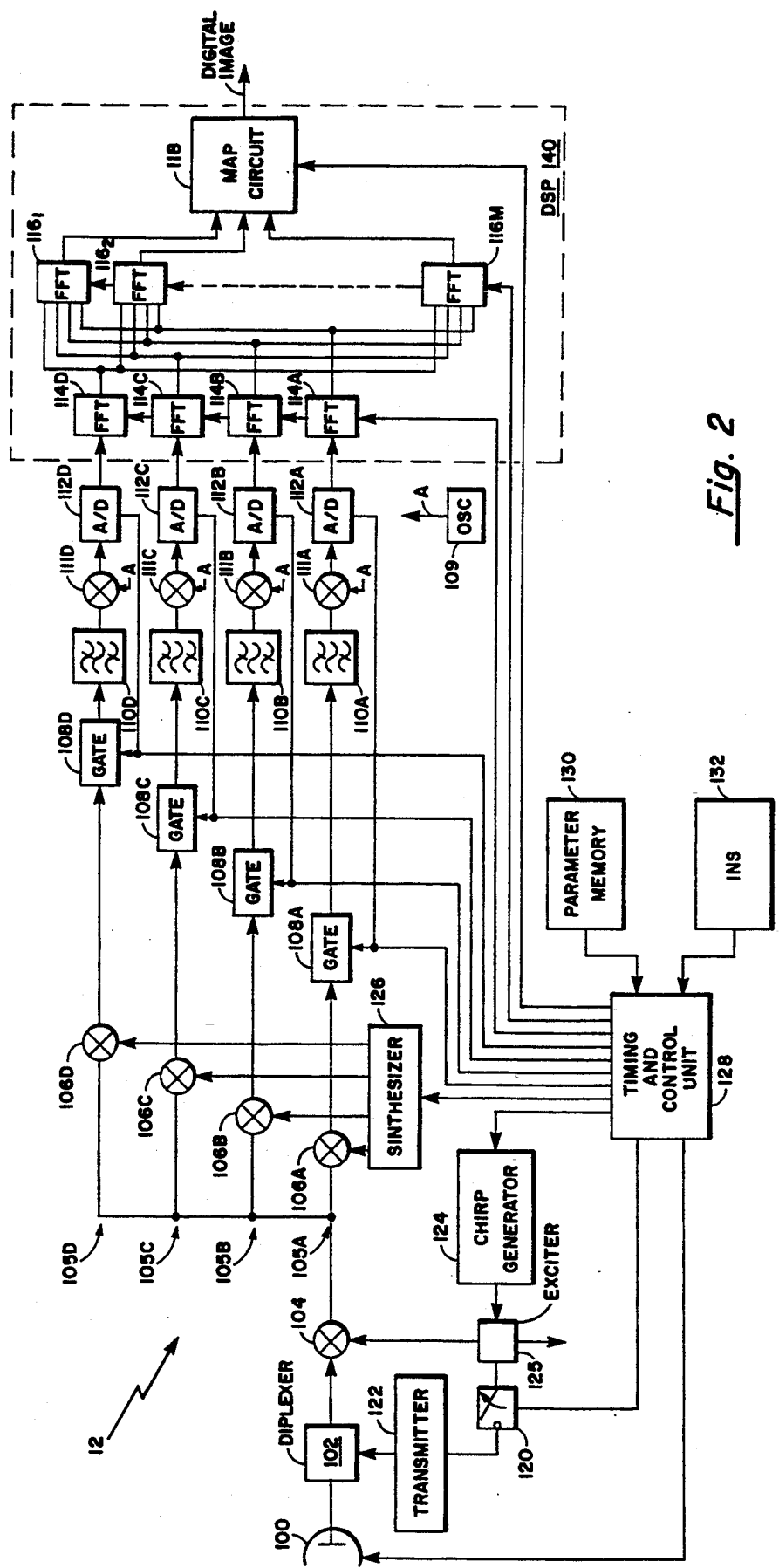
FIG. 2 is a block diagram, greatly simplified, of a portion of a SAR constructed according to the present invention.

Referring now also to FIG. 2, more details of the SAR 12 according to the present invention is shown. It will be noted that FIG. 2 does not show many standard elements in synthetic aperture radar systems such as power connections, timing signal sources, some filters and some amplifiers. However, it will be understood by one of the skill in the art using known design techniques that such elements are required.

Figure 3A:
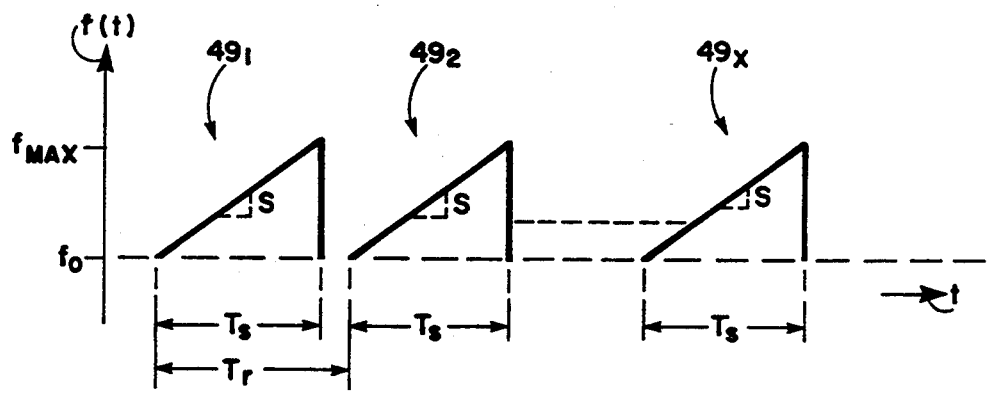
FIG. 3A is a plot showing the frequency as a function of time of a waveform transmitted by the SAR of FIG. 2.

The SAR 12 includes a chirp generator 124 which produces a signal having a frequency characteristic as shown in FIG. 3A and described further hereinafter. The frequency of the signal increases linearly at a chirp slope s. The signal makes one sweep in frequency between $f_o$ and $f_{max}$ in a sweep time $T_s$. The bandwidth, BW, of the signal is ($f_{max}-f_o$. The sweep in frequency is repeated at a sweep repetition interval, $T_r$. As will be apparent to one skill in the art, the signal of FIG. 3A is commonly called a chirped signal and circuitry for generating such a signal is known.

Figure 3B:
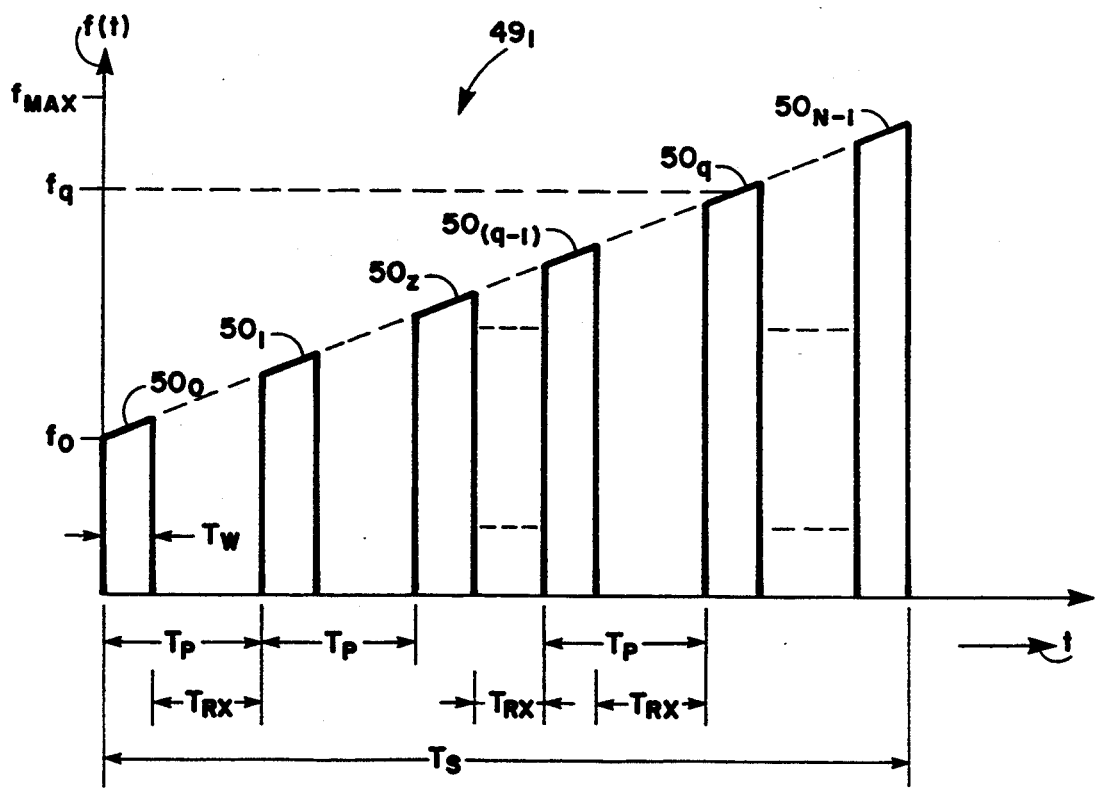
FIG. 3B is a plot showing the frequency as a function of time of one frequency sweep in FIG. 3A.

The chirped signal provided by the chirp generator 124 is fed to an exciter 125 wherein the chirped signal is mixed with a local oscillator signal to provide an output signal at an output frequency. The output signal form the exciter 125 is fed to a transmitter 122 via a switch 120. The transmitter 122 is of known construction such as might be found in radar systems. The switch 120 opens and closes in response to a control signal from timing and control unit 128. The opening and closing of switch 120 provides a pulsed signal as shown in FIG. 3B and described further hereinafter. For a single period $T_s$ of a chirped signal, as shown in FIG. 3A, the pulse signal is provided as shown in FIG. 3B wherein the pulses $50_o \ldots 50_{N-1}$ are repeated at a pulse repetition interval $T_p$ and have a time width of $T_W$.

The pulsed signal is fed, via transmitter 122, to a diplexer 102. The diplexer 102 routes the pulsed signal to an antenna 100. The diplexer 102 here operates in a manner as described in U.S. Pat. No. 5,083,130 entitled "Pulse Radar and Components Therefor" (which Patent is assigned to the same assignee as this application and is incorporated herein by reference). The antenna 100 transmits the pulsed signal in a direction as controlled by timing and control unit 128. The transmit direction is selected, in a manner to be described in greater detail below, to transmit the pulsed signal towards an appropriate one of the patches $16_1 \ldots 16_{45}$.

The transmitted pulses travel to a selected patch, for example patch $16_i$, reflect from objects in the patch $16_i$ and impinge on the antenna 100. When no pulses are being transmitted, the reflected pulses will pass through the diplexer 102 to mixer 104. As seen in FIG. 3B, each of the pulses $50_o \ldots 50_{N-1}$ is followed by an interval $T_{RX}$ during which pulses can be received. The SAR 12 is controlled in a manner described below to ensure reflections from objects within patch $16_i$ arrive at antenna 100 during one of the intervals $T_{RX}$.

The reflected signal is applied to the mixer 104, which is of known construction. The second input to the mixer 104 comes from the chirp generator 124. The mixer 104 performs an operation known as "dechirping" the reflected signal. The dechirped signal includes frequency components representing objects within the illuminated patch $16_i$. There is a component for each point (called "a reflecting point") within the patch $16_i$ which reflects one of the transmitted pulses back to antenna 100. The frequency components are proportional to the range from the missile 10 to the reflecting point with the higher frequencies representing longer ranges.

The frequency components of the dechirped signal can be filtered into separate frequency bins. Due to the relationship between frequency and range, each frequency bin represents reflections from objects in a specific band of ranges. As will be described later, FFT processors 114A . . . 114D are filter banks to filter the dechirped signal into separate signals representing bins of ranges, hereinafter called "range bins." Before filtering into range bins, the dechirped signal from the mixer 104 is divide into four signals and fed to mixers 106A . . . 106D. Having four channels reduces what are termed "ambiguities" in a manner which will be described hereinafter. The mixers 106A . . . 106D are of known construction with the second inputs to the mixers 106A . . . 106D being fed from a synthesizer 126. The frequency and phase of the signals out of the synthesizer 126 are controlled by timing and control unit 128 to compensate, in a manner to be described in greater detail below, for motion of the missile 10 while a SAR image is being formed.

The motion compensated signals from the synthesizer 126 are mixed with the received signals removing quadratic phase terms from the signals in mixers 106A . . . 106D and output signals from the mixers 106A . . . 106D are applied to range gates 108A . . . 108D respectively. The range gates 108A . . . 108D are switches which close at a particular time for a short duration. The time at which reflected pulses reach the SAR 12 depends on the range to reflecting points in patch $16_i$. Thus, by closing the switches of range gates 108A . . . 108D at the appropriate time after a pulse is transmitted, range gates 108A . . . 108D allow only reflections from points at desired ranges to pass and block reflections from all other ranges.

Figure 4:
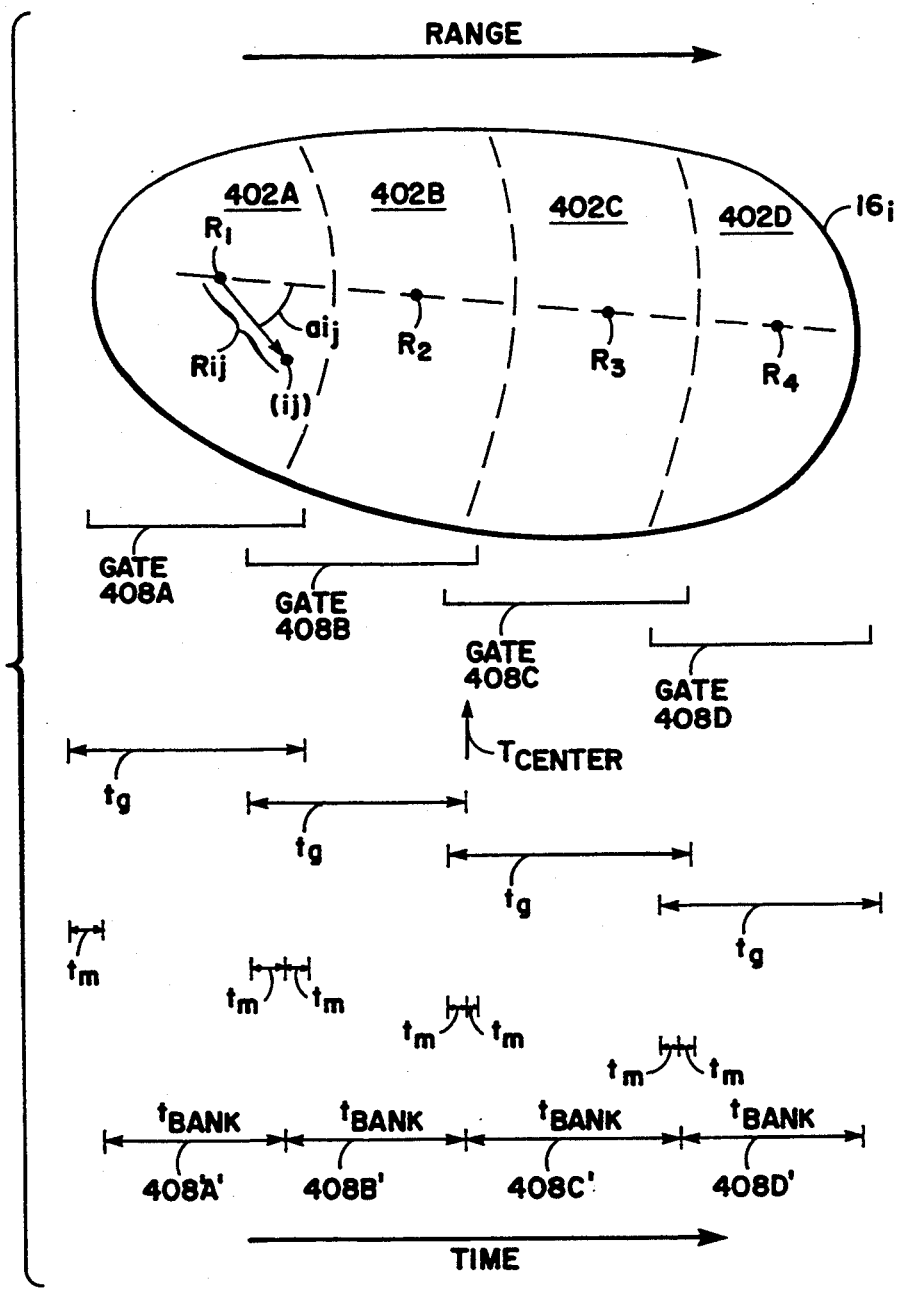
FIG. 4 is a sketch showing the correspondence between range and time.

Referring now also to FIG. 4, a greater detail of the patch $16_i$ and how the times for controlling the ranges gates 106A . . . 106D are selected will be described. The patch $16_i$ is divided into four coarse range bins, 402A, 402B, 402C and 402D, centered around ranges $R_1$, $R_2$, $R_3$ and $R_4$, respectively. As is known, the time at which a reflected signal is received in relation to when it is transmitted is two times the range R divided by the speed of light C or (2R/C). Thus, time is shown to correspond to range. For example, a time gate 408A, corresponding to range gate 108A, is shown to allow signals to pass while reflections from objects in coarse range bin 402A are being received.

Likewise, time gates 408B, 408C and 408D corresponding to range gates 108B, 108C and 108D, respectively, are shown to allow signals to pass while the reflections from objects in coarse range bands 402B, 402C and 402D, respectively, are being received. Each range gate is shown to allow signals to pass for a timed duration $t_g$.

The range gates 108A . . . 108D are operated such that there is some overlap in the time gates 408A . . . 408D. However, range gates 108A . . . 108D act only as coarse range gates. Further processing described below, in each of the paths 105A . . . 105D ensures that only signals arriving during the intervals 408A' . . . 408D', respectively, are used for further processing. The intervals 408A' . . . 408D' each have a time duration of $t_{bank}$ as shown.

Referring again to FIG. 2, the signals out of range gates 108A . . . 108D are fed to corresponding filters 110A . . . 110D. The filters 110A . . . 110D are bandpass filters of known construction with each passband having a width BW at some convenient intermediate frequency. The frequency of the corresponding signals applied to mixers 106A . . . 106D are controlled by synthesizer 126 to frequency translate the signal applied to each of the range gates 108A . . . 108D to the center frequency of each of the bandpass filters 110A . . . 110D.

As described above, the frequency components of the dechirped signal depends on the range to the reflecting points. The signals applied to each of the filters 110A . . . 110D, due to the time gating of range gates 108A . . . 108D, represent different reflected signals from different ranges and therefore are received at antenna 100 having different frequencies. By varying the mixing signals from synthesizer 126 to compensate for the difference in frequencies among signals entering the paths 105A . . . 105D, the frequency of the output signals of the mixers 106A . . . 106D can be within the same frequency range. This selection of mixing signals is not necessary, but is convenient because it allows filters 110A . . . 110D to be of similar construction.

The bandpass filters 110A . . . 110D limit the bandwidth of signals applied to analog to digital converters (A/Ds) 112A . . . 112D respectively. As described above, the frequency spectrum of the dechirped signal depends on the range to the object from which the signal has reflected. In viewing FIG. 4, it would seem as if the bandpass filters 110A . . . 110D would allow to pass only those signals allowed to pass by range gates 108A . . . 108D. However, there is a problem, called "interruption ambiguity", associated with using a pulsed waveform as in FIG. 3B for a SAR. To understand interruption ambiguities, FIG. 3B shows that after each of the pulses $50_0$ . . . $50_{N-1}$, there is an interval $T_{RX}$ during which reflection of a transmitted pulse are received. If the interval $T_{RX}$ were long enough to allow the immediately preceding pulse to travel to and from the patch $16_i$ (FIG. 1A), the pulse repetition interval $T_p$ would be so long that insufficient data would be collected to form a SAR map or image. To avoid such a problem, the reflections from a pulse are received in the interval $T_{RX}$ preceding the pulse transmitted q pulses later. For example, the reflections of pulse $50_o$ is received in the interval $T_{RX}$ preceding the transmission of pulse $50_q$. An ambiguity arises if any one of the pulses intervening pulse $50_o$ and $50_q$ were to reflect (totally or partially) from an object (e.g. rain or clutter) closer to the missile 10 than patch $16_i$ (FIG. 1A). The reflection, called a "spurious reflection", could reach the SAR 12 at the same time as the reflection from pulse $50_o$ striking the patch $16_i$ (FIG. 1A). The spurious reflection could pass through one of the range gates 108A . . . 108D. However, the range to the point where the spurious reflection occurred is different than the range to patch $16_i$. The frequency of the dechirped spurious reflection is, therefore, outside the bandpass of any one of the bandpass filters 110A . . . 110D.

It might seem, then, that only the filters 110A . . . 110D are sufficient to exclude spurious returns without the range gates 108A . . . 108D. The problem is more complicated, though, because the frequency spectrum associated with each pulse is not as simple as shown in FIG. 3B. Because the chirped signal of FIG. 3A has been modulated by a periodic signal (e.g. by the periodic opening and closing of switch 120) there are sidebands at integer multiples of the frequency of the periodic signal $T_p$ (i.e. at frequencies of $p/T_p$ where $p=1, 2, 3, 4 \ldots$). Thus, one of the pulses intervening pulse $50_o$ and pulse $50_q$ might have a $p_{th}$ sideband having the same frequency as the returns from pulse $50_o$ which could reflect from some intermediate object and impinge on the antenna 100 of the SAR 12 during the interval $T_{RX}$ preceding pulse $50_q$. The spurious return could then pass through one of the filters 110A . . . 110D with the reflection of pulse $50_o$, but by having range gates 108A . . . 108D in the path, there is a good chance the spurious reflection will not arrive at exactly the right time to pass through with reflections of pulses from patch $16_i$. It can be seen that the range gates 108A . . . 108D and filters 100A . . . 110D are set to pass returns from patch $16_i$ and to block spurious reflections such that spurious reflections do not interfere with the operation of the SAR 12.

It is important to note that several parameters of the transmitted signal must be appropriately set to enable filters 100A . . . 110D and range gates 108A . . . 108D to pass the desired reflections and exclude spurious reflections. The manner in which parameters are selected is described in greater detail below. Suffice it to say here that the required parameters depend on the range between the missile 10 and the patch $16_i$ (FIG. 1A). A set of parameters for each of numerous ranges are stored in parameter memory 130. Based on calculations made by inertial navigation system (INS) 132 of the range to the patch $16_i$, the timing and control unit 128 reads the values of those parameters from parameter memory 130 and sends control signals to other elements of the SAR 12 to have the SAR 12 operate with the appropriate parameters.

The output signal from each of the bandpass filters 100A . . . 110D are fed to mixers 111A . . . 111D, respectively, wherein each respective signal is mixed with a local oscillator signal from an oscillator 109. Each of the mixers 111A . . . 111D provide an output signal with a frequency within an operating frequency range of the respective one of the A/D's 112A . . . 112D. The output signal from each one of the mixers 111A . . . 111D are converted to digitized signals by analog to digital converters (A/D's) 112A . . . 112D. The digitized signals are fed to a digital signal processor (DSP) 140 which includes fast fourier transform (FFT) processors 114A . . . 114D and FFT processors $116_1 \ldots 116_M$ which operate in a manner to be described. The digitized signals are first fed to the FFT processors 114A . . . 114D. The FFT processors 114A . . . 114D are of known construction and can operate on a number, N, of samples. Here, N is 128. The digital signals provided to the FFT processors 114A . . . 114D are collected over a period of time equal to one sweep interval, $T_s$, (FIG. 3A) of the transmitted signal. Thus, the FFT processors 114A . . . 114D perform an FFT on the return signals from one chirp.

As described above, the frequency of the dechirped signal varies in relation to the range between the missile 10 and an object from which the transmitted signals reflected. As is known, an FFT processor acts as a bank of bandpass filters, with each output representing the components of the input signal in a particular frequency band. Therefore, the outputs of each of the FFT processors 114A . . . 114D represent a signal reflected from objects in different range bins. In other words, the FFT processors 114A . . . 114D act to divided the reflections into fine range bins. The frequency resolution of each of the FFT processors 114A . . . 114D depends on the number of samples, N, on which the FFT processor operates. Because of the relation between frequency and range bins, the value selected for N controls the resolution of the range bins.

As shown in FIG. 4, the coarse range bins of time gates 408A . . . 408D produced by range gates 108A . . . 108D, respectively, overlap. Only the portions 408A' . . . 408D' having a duration $t_{bank}$ are needed. A portion at each end of each time gate 408A . . . 408D having a duration $t_m$, as shown, is not required to produce a SAR map. Therefore, some of the fine range bins produced by FFT processors 114A . . . 114D will also overlap. The overlapping fine range bins do not need to be used in further processing to form a SAR map. For example, if FFT processors 114A . . . 114D each produce 128 outputs numbered sequentially, then only 20 of those outputs, say numbers 53 to 73, might be used.

As is known from the theory of FFT processing, the output of an FFT processor approximates the spectrum of the input signal. Using a fixed number of input samples means that only a portion of the signal is actually used as an input, and some error can occur. By using the samples of the signal collected during time $t_m$, the portion of the signal used is increased and the amount of error is reduced. Other techniques, such as one known as "cosine weighing" of the samples applied to FFT processors 114A . . . 114D, can also be used to reduce the error.

One set of outputs for each FFT processor 114A . . . 114D is produced for each sweep time, $T_s$ (FIG. 3B). The outputs of the FFT processor 114A . . . 114D define a time varying signal and well known theory about SARs tells us that these signals contain frequency components representing reflections from points within the patch $16_i$. The frequency of each component is related to the azimuthal angle of a corresponding reflecting point relative to the SAR 12. Briefly, the phase of a reflected signal from an object in patch $16_i$ is related to the to and from propagation time to the reflecting point. This phase changes as the missile 10 moves the SAR 12, since the range between the SAR 12 and the reflecting point changes. The rate of change of range, and hence phase, is proportional to the sine of the azimuthal angle between the direction of travel of the SAR 12 and the reflecting point (hereinafter "azimuth" or "azimuthal angle"). Since the frequency of a signal is actually the rate of change of the phase of the signal, changing phase at a rate proportional to azimuthal angle produces frequency components having frequencies proportional to the azimuthal angle. The FFT processors $116_1 \ldots 116_M$ act as filter banks to sort the frequency components into frequency bins. Here, each frequency bin corresponds to a band of azimuthal angles, or an "azimuthal bin".

The outputs of the FFT processors $116_1 \ldots 116_M$ represent pixels of the patch $16_i$. As described above, range gates 108A . . . 108D and FFT processors 114A . . . 114D produce signals depicting reflecting points in range bins. Each of the FFT processors $116_1 \ldots 116_M$ divides the signals of one range bin into a plurality of azimuthal bins. The outputs of all the FFT processors $116_1 \ldots 116_M$ define a grid in range and azimuth and each output represents the intensity of reflections from reflecting points in a particular range bin and a particular azimuth bin. Here, each FFT processor $116_1 \ldots 116_M$ are designed to operate on samples in groups of powers of two. For example, an FFT processor might be switched to handle 64, 128 or 256 samples. If FFT processors $116_1 \ldots 116_M$ are required to operate on a number of samples which is not a power of two, FFT processors $116_1 \ldots 116_M$ are set to operate on the next largest power of two and samples having a value of zero are added to the input. This process of adding zero samples is commonly called "zero filling" and is commonly used in digital signal processing. The selection of the number of samples FFT processors $116_1 \ldots 116_M$ operate on is described in greater detail below.

As described above, FFT processors 114A ... 114D provide one set of outputs for each sweep interval $T_s$ (FIG. 3B). The chirps are transmitted repetitively at intervals $T_r$ (FIG. 3A). At each interval $T_r$, one sample is applied to FFT processors $116_1 \ldots 116_M$. After a number $N_s$ of intervals $T_r$, FFT processors $116_1 \ldots 116_M$ produce signals representing the patch $16_i$. The time it takes to produce signals representing one patch $16_i$ is called a "dwell" or "coherent integration time". The output of each of the FFT processors $116_1 \ldots 116_M$ are fed to a map circuit 118 wherein output signals from the FFT processors $116_1 \ldots 116_M$ are stored.

At the end of each dwell, timing and control unit 128 steers the antenna 100 towards another one of the patches $16_1 \ldots 16_{45}$ (FIG. 1A). The SAR 12 operates in the manner described above to produce signals representing the second patch. Those signals are likewise applied to the map circuit 118. From dwell to dwell, signals representing the various patches in the mapping area 17 (FIG. 1A) are applied to the map circuit 118. The map circuit 118,, as described further hereinafter, combines the signals representing all the patches into one map. The map or digital image produced by the map circuit 118 can be used by the digital signal processor 20 of the missile 10 in any known fashion, such as described in U.S. Pat. No. 5,052,045. entitled "Confirmed Boundary Pattern Matching" or as described further hereinafter to guide the missile 10 (FIG. 1A) towards a target in the mapping area 17 (FIG. 1A).

As mentioned above, the timing and control unit 128 provides control signals which alter various parameters of the SAR 12 as the range changes. The range changes as the missile 10 (FIG. 1A) approaches a target and as the antenna 100 is steered towards different ones of the patches $16_1 \ldots 16_{45}$. The various parameters which are controlled include: the chirp slope S (FIG. 3A), the pulse repetition interval $T_p$ (FIG. 3B), the sweep time $T_s$ (FIG. 3A), the frequency and phase of the mixing signals produced by the synthesizer 126, the time when range gates 108A ... 108D are closed, and the number of samples on which the FFT processors $116_1 \ldots 116_M$ operate. A method in which values of these parameters is selected is now described.

It must be recognized that some of the parameters of the SAR 12 are constrained by physical laws, for example, the bandwidth of the chirped signal (FIG. 3A). As is known from the theory of SARs, for any desired range resolution, the bandwidth must be sufficiently large. In SAR 12, the required width of each range bin produced by FFT processors 114A ... 114D is determined based on the intended application. For example, in some applications, it may be sufficient to know that a target is located at a range R within ±10 ft. In that application, the range bins could be as wide as 20 ft. Having selected a desired range resolution, the bandwidth can be determined. Here, the bandwidth, BW, is the difference between $f_{max}$ and $f_o$ (FIG. 3A) and is constant regardless of range.

A second parameter constrained by physical laws is the duration of a dwell, $T_i$. One familiar with SAR technology will appreciate that the length of a dwell impacts the length of the synthetic aperture. The length of a dwell in turn dictates the smallest achievable azimuth resolution. As with range resolution, the required azimuth resolution is determined by the intended application. Based on the velocity V of the missile 10 (FIG. 1A), the nominal wavelength of the transmitted signal and the angle to the patch $16_i$ (FIG. 1A), the minimum dwell time yielding the desired azimuth resolution can be computed. Where, as here, the intended flight path of the missile 10 (FIG. 1A) is known, an appropriate length for a dwell time may be computed for various ranges and stored in parameter memory 130. Alternatively, the required dwell time can be computed from current position and velocity data relative to the target.

Figure 5:
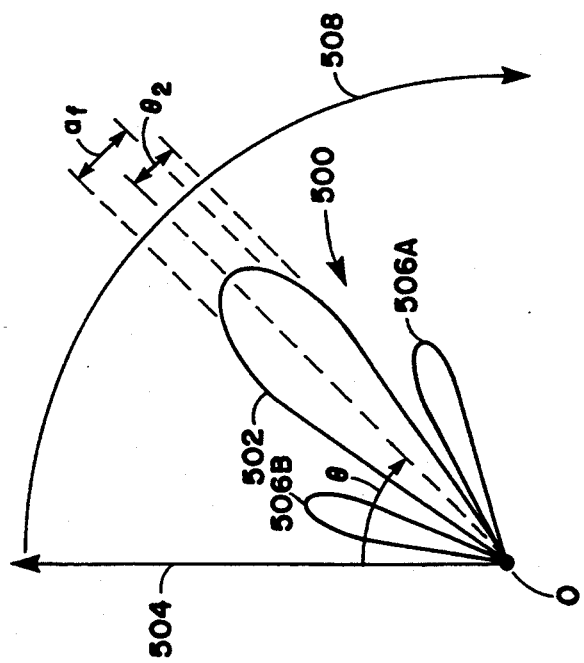
FIG. 5 is a sketch of a beam pattern useful in understanding how SAR ambiguities are avoided.

Another physical constraint on the parameters of the SAR 12 arises from consideration of sampling theory. Referring now also to FIG. 5, a beam pattern 500 including a main beam 502 and sidelobe beams 506A and 506B, is shown as would be produced by signals transmitted from the antenna 100. A line 504 indicates the direction of travel of the missile 10 (FIG. 1A) projected onto the plane of the ground 9 (FIG. 1A). A curve 508 shows the direction of increasing angle measured relative to the line 504. The distance between the origin O and any point on the beams 502, 506A or 506B indicates the relative strength of the transmitted beam in that direction.

The beam pattern 500 shows the main beam 502 in the direction $\theta$ from the line 504 and the two sidelobe beams 506A and 506B. One skilled in the art will appreciate there may be other sidelobes than those explicitly shown, however, those sidelobes have lower signal strengths and are of less concern than those shown. The distance between the origin O and any point on the beams 502, 506A or 506B indicates the relative strength of the transmitted beam in that direction. The main beam 502 has 3dB beam width $a_f$. The sidelobes 506A and 506B have substantially lower amplitudes than the main beam 502 such that objects in the direction out of the main beam 502 will produce radar reflections small enough to be ignored. For angles deviating from the center of the main beam 502 by more than an angle of $\theta_2$, the reflected signals will have amplitudes less than or equal to the amplitudes of sidelobes 506A and 506B and can be effectively ignored. Ignoring reflections from objects separated from the center of the beam by angles greater than $\theta_2$ is important when it is considered that a SAR can not unambiguously resolve reflections from objects at any angle.

Referring again to FIG. 2, it will be recalled, the FFT processors $116_1 \ldots 116_M$ resolved reflecting points into azimuthal bins based on phase changes, sometimes called the "Doppler frequency", of the reflections. From SAR technology, it is known that the frequency $f_d$ of each reflection is related to the azimuthal angle by the formula:

$$f_d = (2V/\lambda) \cos\theta_d \qquad \text{Eq. 1}$$

where,

V is the velocity of the missile 10 (FIG. 1A);

$\lambda$ is the wavelength of the transmitted signal; and $\theta_d$ is the azimuthal angle to the reflecting point.

However, it must be recalled that samples are supplied to FFT processors $116_1 \ldots 116_M$ every $T_r$ (FIG. 3A) seconds. From the sampling theorem, then, FFT processors $116_1 \ldots 116_M$ can only unambiguously resolve frequencies in a range $1/(2T_r)$.

Combining each of the foregoing considerations, it can be seen that the signals fed to FFT processors $116_1 \ldots 116_M$ are from reflecting points at angles $(\theta - \theta_2)$ to $(\theta + \theta_2)$. From EQ. 1, then, the frequencies will range from $(2V/\lambda)$ [Cos $(\theta - \theta_2)$ to $(2V/\lambda)$ Cos $(\theta + \theta_2)$.

To satisfy the sampling therein, $$\frac{1}{T_r} > (2V/\lambda)[\text{Cos}(\theta - \theta_2) - \text{Cos}(\theta + \theta_2)] \quad \text{Eq. 2}$$

After some simplification, an equation for electing $T_{r(max)}$, i.e. the maximum value of $T_r$, can be represented by:

$$T_{r(max)} \simeq \frac{\lambda}{4V \sin \theta \sin \theta_2} \quad \text{Eq. 3}$$

As can be seen in EQ. 3, the ramp repetition period $T_r$ depends on the angle $\theta$ which varies as the missile 10 (FIG. 1A) approaches a target. Here, the intended trajectory of missile 10 is known as priori. Estimates of the angle $\theta$ can be made for each range such that values of $T_r$ is longer than $T_s$. The difference is due to the fact that it takes time for the chirp generator 124 (FIG. 2) to reinitialize (sometimes called "flyback time" and designated $T_{FB}$). Also, as shown in FIG. 2, the chirp generator 124 is used to provide the transmitted chirp signals as well as to provide the chirp signal to dechirp the received signal. In this case, the chirp generator 124 cannot begin to provide a second chirp signal until the last pulse of the first chirp has been reflected from patch $16_i$ and received. This time is designated $T_{max}$. Thus, $$T_s < (T_{r(max)} - T_{FB} - T_{max}) \quad \text{Eq. 4}$$

Figure 6A:
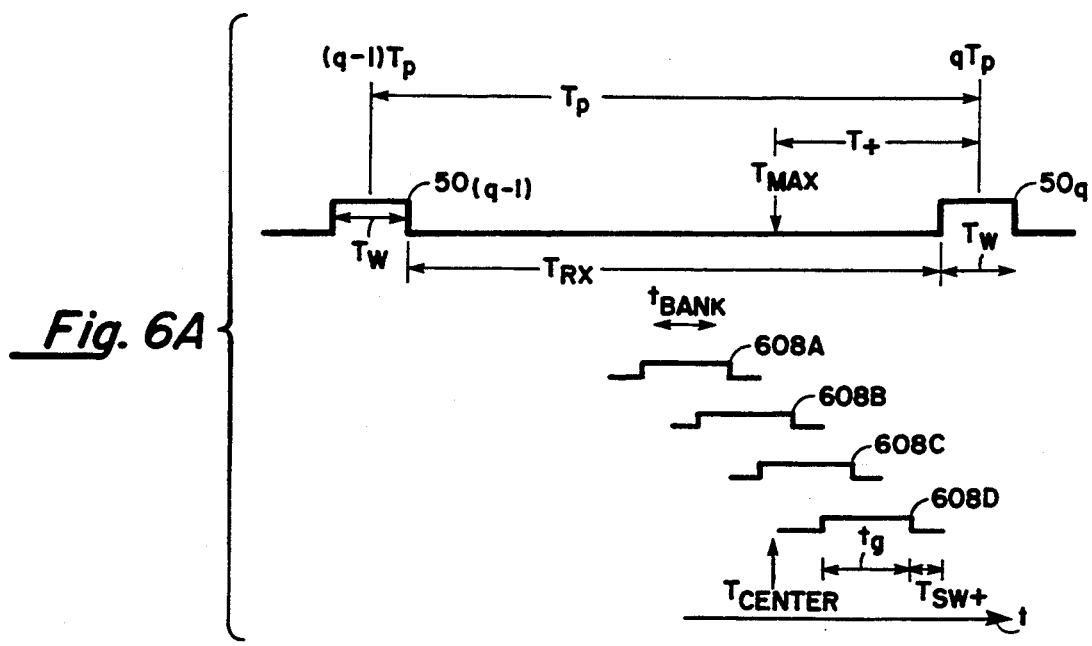
FIGS. 6A and 6B are sketches useful in understanding how eclipsing is avoided.
Figure 6B:
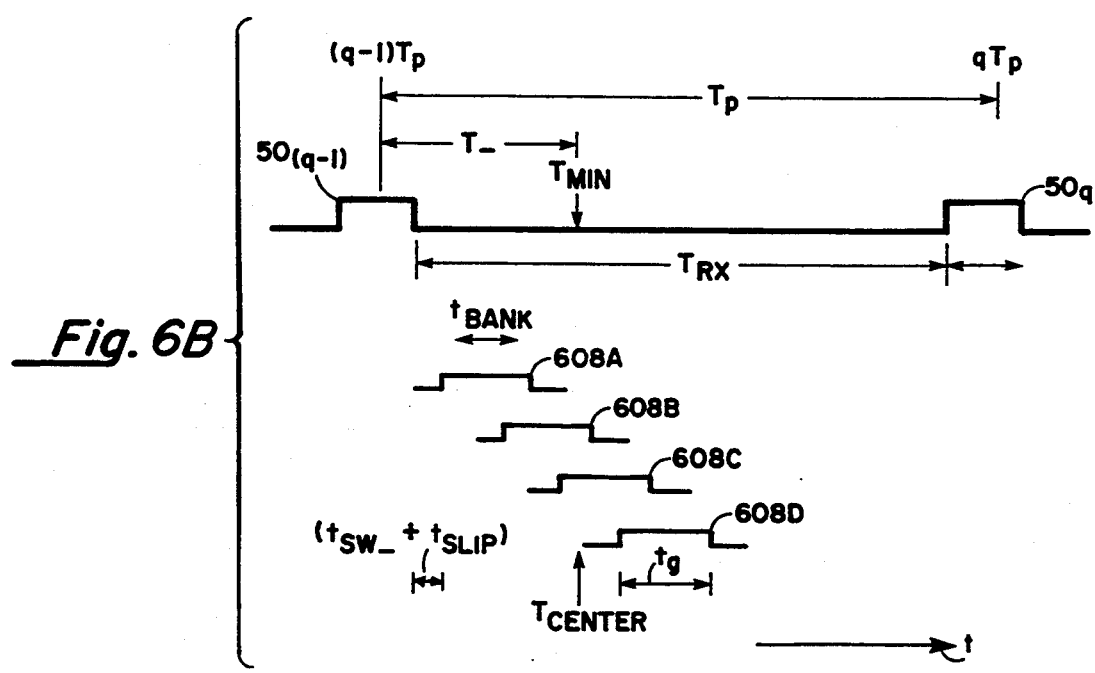

As described above, the parameters of the SAR 12 must also change with range to avoid "eclipsing". As noted in reference to FIG. 3B, the SAR 12 must be operated such that the reflections of any pulse from patch $16_i$ (FIG. 1A) reach the antenna 100 during an interval $T_{RX}$. Referring now also to FIGS. 6A and 6B, additional detail of the interval $T_{RX}$ between pulses $50_{(q-1)}$ and $50_q$ is shown. The reflections of pulse 500 reach the antenna 100 during the interval $T_{RX}$ as shown however, it can be generalized to show that the reflections from any one of the pulses $50_o \ldots 50_{(N-1)}$ are received during the interval $T_{RX}$ after "q" more pulses have been transmitted.

As the range to patch $16_i$ changes, the time for a reflection of a pulse to reach antenna 100 changes. Thus, the pulse repetition interval $T_p$ and the number of pulses q may need to change as the range to the target changes. As described above, the range gates 108A ... 108D close during the interval $T_{RX}$ to allow the received signals from patch $16_i$ to pass for further processing. FIG. 6A shows the latest times 608A ... 608D which the gates 108A ... 108D respectively can close and still receive reflections within the interval $T_{RX}$. As shown in FIG. 4, the range gates 408A ... 408D, taken together, allow reflections over an interval of time encompassing reflections from patch $16_i$. The center of this interval is shown as $T_{center}$. FIG. 6A shows that the center of the interval, $T_{center}$, must occur before $T_{max}$ to avoid any one of the time gates 408A ... 408D from overlapping with the transmission of pulse $50_q$.

As seen in FIG. 6A, the time $T_{max}$ precedes the time $qT_p$ by an amount $T_+$ such that:

$$T_{max} = qT_p - T_+ \quad \text{Eq. 5a}$$

$$T_+ = \tfrac{1}{2}[T_W + t_g + t_{bank}(N_g - 1)] + t_{SW+} \quad \text{Eq. 5b}$$

or alternatively $$T_p = (T_{max} + T_+)/q \quad \text{Eq. 5c}$$

where:

q is the numbered pulse in question;

$T_W$ is the pulse width;

$T_p$ is the interpulse interval;

$t_g$ is the time each of the gates 108A ... 108D is closed;

$t_{bank}$ is the portion of time each of the range gates 108A ... 108D is closed that is required without a time overlap as shown in FIG. 4;

$N_g$ is the number of range gates, here 4; and $t_{SW+}$ is a margin of time required to ensure for the range gates 108A ... 108D to switch from closed to open.

FIG. 6B shows that $T_{center}$ must occur after a time $T_{min}$ to avoid any one of the time gates 408A ... 408D from overlapping the transmission of pulse $50_{(q-1)}$. The time $T_{min}$ is displaced from a time $(q-1)T_p$ by an amount $T_-$ such that $$T_{min} = (q-1)T_p + T_- \quad \text{Eq. 6a}$$

or alternatively:

$$T_- = \tfrac{1}{2}[T_W + t_g + t_{bank}(N_g - 1)] + t_{SW-} + t_{slip} \quad \text{Eq. 6b}$$

where:

$T_W$, $T_p$, $t_g$, $t_{bank}$, and $N_g$ are as described above;

$t_{SW-}$ is a margin of time required to ensure for the range gates 108A ... 108D to switch from open to close; and $t_{slip}$ is the decrease in propagation time between the SAR 12 and the center of the patch $16_i$ (FIG. 1A) due to the missile 10 (FIG. 1A) getting closer to the patch $16_i$ during one dwell.

The factor $t_{slip}$ in Eq. 6B accounts for the situation wherein the parameters to avoid eclipsing are selected at the beginning of a dwell and are not changed until the beginning of the next dwell. Because range gets smaller during the dwell, the parameters selected at the beginning must also avoid eclipsing at the end of the dwell.

Of the parameters listed in Eqs. 5a and 6a, q and $T_p$ will be changed at each dwell, as necessary. The values for q and $T_p$ are selected such that gates 108A ... 108D are closed to receive reflections from patch $16_i$. Additionally, values for q and $T_p$ must be selected such that the center, $T_{center}$, of the time gates 408A ... 408D is between $T_{max}$ and $T_{min}$. Of course, $T_{max}$ must be greater than $T_{min}$, as described in Eq. 5a and Eq. 6a. Thus, a maximum value for q, $q_{max}$, can be calculated by combining Eq. 5a and Eq. 6a, wherein:

$$q_{max} = (T_{max} + T_+)/(T_+ + T_-) \quad \text{Eq. 7}$$

Numerous combinations of values could be selected for q and $T_p$ as long as q is less than $q_{max}$. However, the values selected must simultaneously prevent "interruption ambiguities" as to be described.

Interruption ambiguities arise, because the chirped signal produced by the chirp generator 124 is modulated by the switch 120 to provide a pulsed signal. For purposes of explanation, assume initially that the pulse width $T_W$ (FIG. 3B) is small enough to effectively ignore (i.e. the transmitted pulses are represented as impulses). If at any instant of time, $t_1$, the chirped signal has a frequency $f(t_1)$, the transmitted signal contains frequencies $f(t_1) + p(1/T_p)$ where $p = 1, 2, 3 \ldots$. The terms $p(1/T_p)$ are referred to as sidebands and arise because of the periodic sampling of the signal whereas $f(t_1)$ is called the central signal.

Figure 7B:
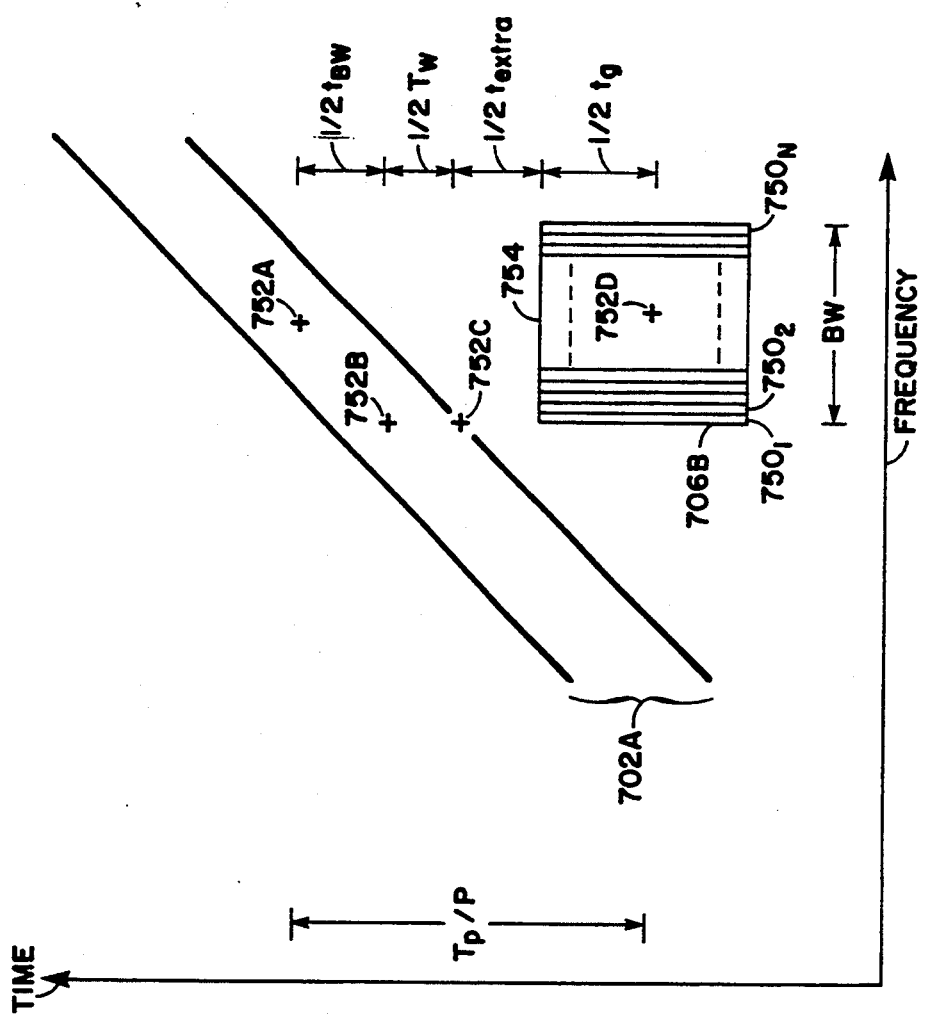
FIG. 7B is an expansion of one region of the sketch of FIG. 7A.
Figure 7A:
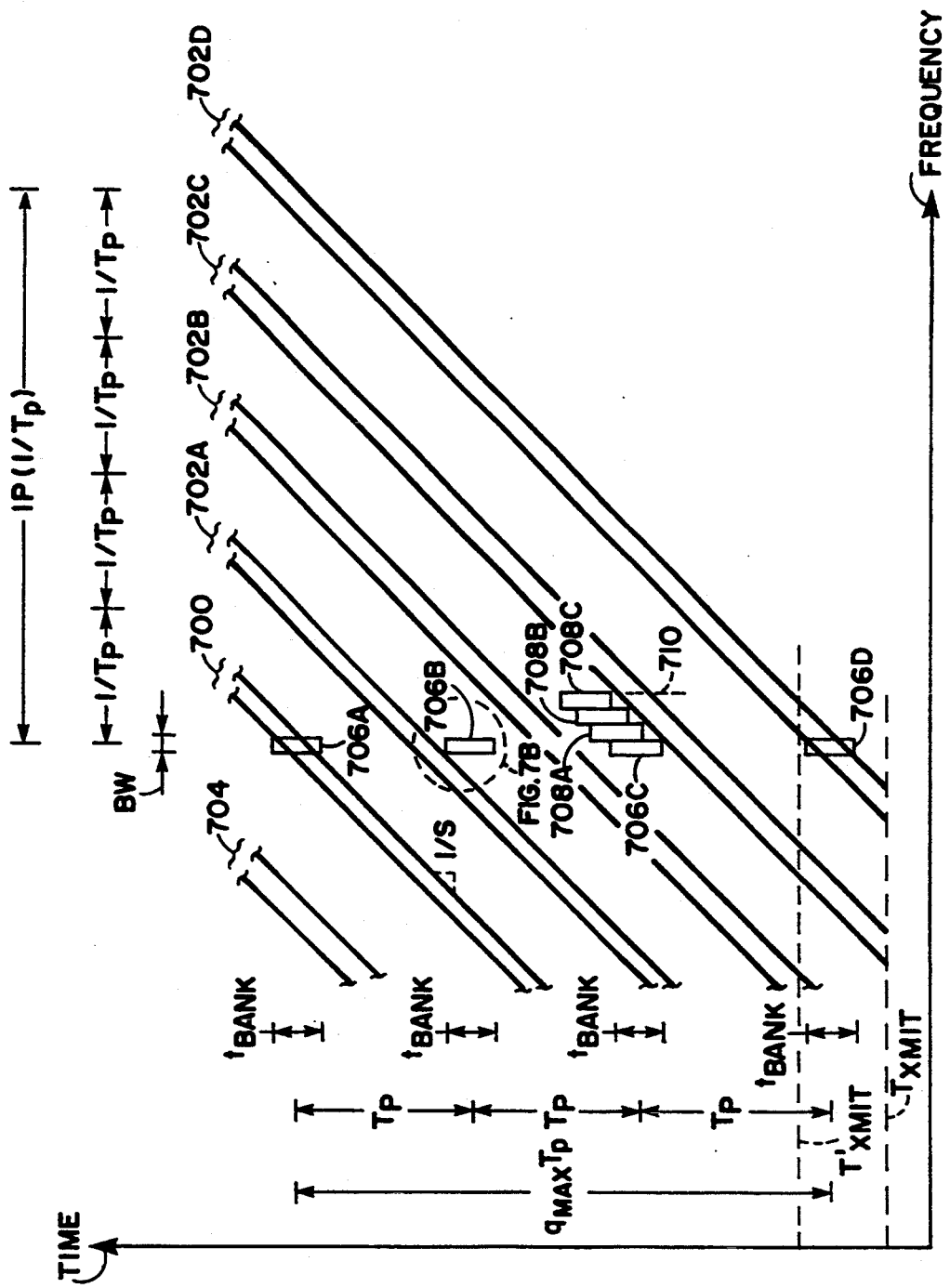
FIG. 7A is a sketch useful in understanding how interruption ambiguities are avoided.

Referring now to FIGS. 2 and 7A, a portion of a dechirped signal from mixer 104 as a function of time is illustrated. FIG. 7A shows spectral components of the dechirped signal resulting from the reflections of one transmitted pulse. The pulse is transmitted at time $T_{XMIT}$, as indicated. A bin 700 represents possible reflections of a central signal $f(t_1)$ received at the SAR 12 and dechirped. As described above, the dechirped frequency depends on the range to the object from which the pulse reflected. Thus, the frequency of the dechirped central signal increases as the time (i.e. range) increases. This increase in frequency is proportional to the chirp slope s as indicated. (Note, s has units of frequency/sec so the inverse of s is used where frequency is the ordinate).

FIG. 7A also indicates that sidebands from the transmitted pulse will be received. For illustration, four upper sidebands are depicted as bands 702A ... 702D and one lower sideband 704 is shown. Each sideband is offset in frequency from the central signal by a fixed amount, $1/T_p$. Thus, the sidebands appear as bands parallel to band 700.

As described above, gates 108A ... 108D in combination with filters 110A ... 110D operate to select reflected signals from patch $16_i$ (FIG. 1A). Here, window 706A depicts the time when one of the gates, say 108A, and one of the filters, say 110A, are allowing the reflection of the transmitted pulse to pass. As seen, band 700 passes through window 706A. The window 706A has a time width $t_{bank}$ representing the time when signals are allowed to pass in path 105A. The window 706A has a frequency width BW corresponding to the bandwidth of the filter 110A.

FIG. 7A also shows windows 706B ... 706D corresponding to the windows for passing the reflections from previously transmitted pulses. As depicted, windows 706B and 706C do not cover any of the bands 700, 702A ... 702D, or 704. Window 706D is shown centered over band 702D, implying that reflections of sideband 702D from the current pulse could be received at the same time and at the same frequency as the reflections from the central signal of a previously transmitted pulse. The reception of the sideband 702D thus represents an interruption ambiguity. Physically, the ambiguity shown means that a sideband from the pulse transmitted at time $T_{XMIT}$ is reflecting from an object closer to missile 10 than patch $16_i$ and its reflection is reaching antenna 100 at the same time as the reflection of a previously transmitted pulse from patch $16_i$.

The ambiguity occurs at the $p_{th}$ sideband, where here p is shown to be 4. The ambiguity occurs at the reception of q pulses before the reception of the desired pulse (i.e. a time $qT_p$ before the reception of the desired pulse). Here q is shown to have a value of 3. From geometrical considerations, it can be seen that the overlap of window 706D and band 702D occurs when the following relationship is satisfied:

$$\frac{1}{S} = q\, T_p/(p/T_p) \qquad \text{Eq. 8a}$$

or $$S = p/(qT_p^2) \qquad \text{Eq. 8b}$$

For the values of S and $T_p$ depicted in FIG. 7A, Eq. 8b is satisfied by values of $p = 4$ and $q = 3$. Eq. 8b is also satisfied by any integer multiples of $p = 4$ and $q = 3$, indicating there are other overlapping windows and bands. However, where q and p have no common factors, Eq. 8b predicts the overlap of the window closest in time and frequency to the desired sample. This represents the worst case overlap. The further away the overlap occurs in time and frequency, the weaker the spurious signal causing the interruption ambiguity will be. The longer the time it takes for the overlap to occur means that the spurious signal has travelled a longer range. From the radar equation, it is known that signal strength decreases as the range increases to the fourth power. Thus, if the number of pulses (i.e. q) between when a pulse is transmitted, $T_{XMIT}$, and when it first causes an interruption ambiguity can be increased, the strength of the interruption ambiguity can be small enough to be effectively ignored. Also, an antenna pattern will discriminate against ambiguities if proper geometry is maintained. Additionally, the strength of the sideband signal decreases as the frequency difference between the central signal and the sideband increases. Thus, as p takes on higher numbers, the impact of the interruption ambiguity can be ignored. Thus, interruption ambiguities other than as shown in FIG. 7A can be ignored.

The solution, then, is to manage the selection of system parameters to eliminate the effect of the overlap of the sideband 702D with the window 706D. As shown in FIG. 7A, the reflections of the transmitted pulse do not occur before the transmission of the pulse at time $T_{XMIT}$. Thus, the interruption ambiguity can be eliminated by transmitting the pulse at time $T_{XMIT}$ after the time of window 706D. In other words, when a pulse is transmitted, parameters $T_p$ and S should be selected such that reflections of the pulse from patch $16_i$ are received before the qth pulse is transmitted where q satisfies Eq. 8b as shown in FIGS. 6A and 6B.

Still referring to FIGS. 7A and 7B, further requirements of the system parameters may be observed. The window 706A is centered around band 700 indicating the central signal is received and processed. Windows 706B and 706C must not contact any of the band or else portions of a sideband would be erroneously received and processed. Thus, the extent of each of the windows 706A ... 706D must be considered. FIG. 7B shows the window 706B and the band 2A. For purposes of illustration, the window 706B is taken to be one of the windows 706A ... 706D closest to one of the bands 702A ... 702D exclusive of window 706A which is intended to be centered over band 700. The center 752D (FIG. 7B) of the window 706B is displaced along the time axis from the center 752A of the band 702A by an amount equal to $(T_p/p)$. This quantity can be derived from the situation shown in FIG. 7A. The windows 706A ... 706D also appear at periodic intervals, but it takes p periods (here p is 4) for the two periodic signals to align. Thus, the closest spacing of the bands and the windows can be shown to be $(T_p/p)$.

The time $T_p/p$ is shown to be the time between the point 752A at the center of band 702A and the point 752D at the center of window 706B. To avoid undesired overlap of window 706B and band 702A, that time must equal:

$$\frac{1}{2t_{BW}} + \frac{1}{2T_W} + \frac{1}{2t_{extra}} + \frac{1}{2t_g}$$

where, $t_{BW}$ is the time for the frequency of sideband 702A to decrease by the bandwidth BW of window 706B (i.e. BW/S);

$T_W$ is the time width of the transmitted pulse which is also the time width of band 702A;

$t_{extra}$ is additional time to prevent bleed through which could be as little as 0; and $t_g$ is the time width of window 706B as previously described.

Rearranging terms, it can be seen that $$T_p/p > \tfrac{1}{2}(T_W + t_g + t_{BW}) \quad \text{Eq. 9a}$$

or $$T_p > \tfrac{1}{2}p t_o \quad \text{Eq. 9b}$$

where $t_o$ represents the sum of $T_W$, $t_g$ and $t_{BW}$ which are fixed system parameters determined empirically when constructing the SAR 12 (FIG. 2).

To actually choose system parameters as a function of range, it is necessary to determine parameter values which simultaneously satisfy Eq. 4, Eq. 5c, Eq. 7, Eq. 8 and Eq. 9b. One way to determine parameters values which satisfy the equations is to calculate parameter values for various values of p and q and selecting values which satisfy all the above described conditions. A lower bound on the values of p and q can be determined from Eq. 9b in conjunction with Eq. 7, from which it can be determined that:

$$pq > (T_{max} + T_+)/t_o \quad \text{Eq. 10}$$

An upper bound on p and q can be determined from the requirement that the chirp signal sweeps in frequency $(f_{max} - f_o)$ in a time $T_s$ (FIG. 3) at a rate of S, which can be written as:

$$T_s = (f_{max} - f_o)/S$$

Using Eq. 8b to substitute for S and the relationship that $T_p = T_{max} + T_+$ observable in FIG. 6A, it can be seen $$T_S = (f_{max} - f_o)(T_{max} + T_+) 2/pq \quad \text{Eq. 11a}$$

or that $$pq > (f_{max} - f_o)(T_{max} + T_+) 2/T_{S(max)} \quad \text{Eq. 11b}$$

where $T_{S(max)}$ is the maximum value of $T_S$ and is derived from Eq. 4.

The way in which a plurality of time gates reduces ambiguities may be understood by reference to FIG. 7A. Window 706C shows the time when range gate 108A (FIG. 2) allows signals to pass. Windows 708A, 708B and 708C show the time when gates 108B, 108C and 108D, respectively, are allowing signals to pass. The time when each gate allows a signal to pass is staggered such that a line through the centers of windows 706C, 708A, 708B, and 708C is parallel to the bands 702B and 702C. Thus, if window 706C fits between bands 702B and 702C, the windows 708A, 708B and 708C will also fit. If on the other hand, one window passing all the frequencies at all the times as the four separate paths 105A . . . 105D (FIG. 2), an ambiguity might result. A window 710 shows the result of using one instead of four separate paths, wherein the window 710 overlaps the bands 702B and 702C such that ambiguities would result.

Consider now the following parameters which are selected or measured for the SAR 12 (FIG. 2):

$BW = (f_{max} - f_o) = 50 \times 10^6$ Hz;

$t_o = 0.81$ μsec;

$T_+ = \tfrac{1}{2}[T_w + t_g + t_{bank}(N_g - 1)] + t_{sw+} = 1.3$ μsec;

$T_- = \tfrac{1}{2}[T_w + t_g + t_{bank}(N_g - 1)] + t_{sw-} + t_{slip} = 1.5$ μsec; and $T_{FB} = 40$ μsec;

where $T_{FB}$ is the time allowed for flyback and reinitialization of the ramp. From Eqs. 10 and 11b, values of the product pq between 10 and 33 should be considered. Values predicted according to the foregoing equations are tabularized in Table I. Any set of parameters for values of p and q not satisfying all the foregoing conditions should not be included in the table.

TABLE I

| pq | q | p | $T_{max}$ (μsec) | $T_{min}$ (μsec) | $T_S$ (μsec) | $T_r$ (μsec) | $T_p$ (μsec) | S (HZ/ μsec) |
|---|---|---|---|---|---|---|---|---|
| 10 | 5 | 2 | 6.80 | 5.55 | 328 | 375 | 4.05 | 0.15 |
| 12 | 4 | 3 | 8.42 | 7.98 | 394 | 442 | 3.24 | 0.13 |
| 14 | 7 | 2 | 10.04 | 7.17 | 459 | 509 | 5.67 | 0.11 |
| 15 | 5 | 3 | 10.85 | 9.60 | 492 | 543 | 4.05 | 0.10 |
| 18 | 9 | 2 | 13.28 | 8.79 | 590 | 643 | 7.29 | 0.09 |
| 20 | 5 | 4 | 14.90 | 13.65 | 656 | 711 | 4.05 | 0.08 |
| 20 | 4 | 5 | 14.90 | 14.46 | 656 | 711 | 3.24 | 0.08 |
| 21 | 7 | 3 | 15.71 | 12.84 | 689 | 745 | 5.67 | 0.07 |
| 22 | 11 | 2 | 16.52 | 10.41 | 722 | 779 | 8.91 | 0.07 |
| 24 | 8 | 3 | 18.14 | 14.46 | 787 | 845 | 6.48 | 0.06 |
| 26 | 13 | 2 | 19.76 | 12.03 | 853 | 913 | 10.53 | 0.06 |
| 28 | 7 | 4 | 21.38 | 18.51 | 919 | 980 | 5.67 | 0.05 |
| 28 | 4 | 7 | 21.38 | 20.94 | 919 | 980 | 3.24 | 0.05 |
| 30 | 15 | 2 | 23.00 | 13.65 | 984 | 1047 | 12.15 | 0.05 |
| 30 | 10 | 3 | 23.00 | 17.70 | 984 | 1047 | 8.10 | 0.05 |
| 30 | 6 | 5 | 23.00 | 20.94 | 984 | 1047 | 4.86 | 0.05 |
| 30 | 5 | 6 | 23.00 | 21.75 | 984 | 1047 | 4.05 | 0.05 |
| 33 | 11 | 3 | 25.43 | 19.31 | 1083 | 1148 | 8.91 | 0.05 |

Figure 8:
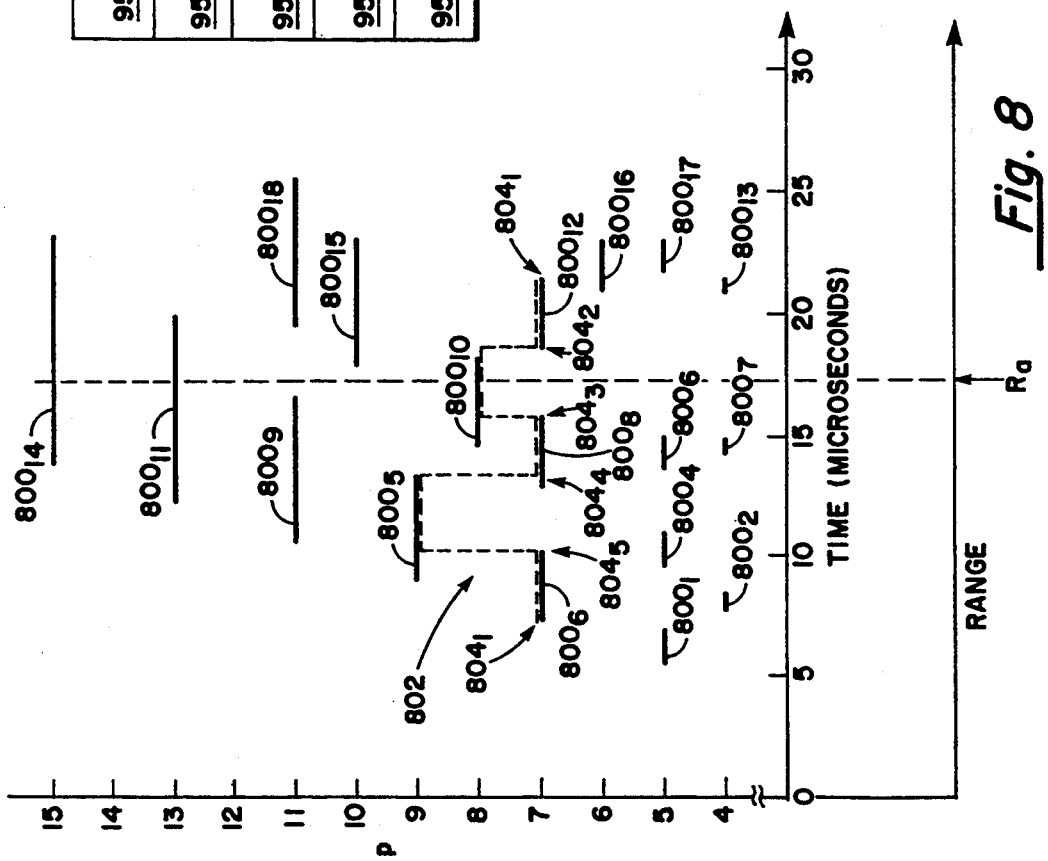
FIG. 8 shows Table I in a graphical form and is useful in selecting operating parameters for the SAR.

Referring now to FIG. 8, the results of Table I are shown graphically. The value of time is along the abscissa and p is along the ordinate. Because of the relationship among time, when a reflection is received and range to the object from which the pulse is reflected, the abscissa might also be considered to indicate range. Each of the lines $800_1 \ldots 800_{18}$ corresponds to one of the rows of the Table I. Considering, for example, the second row of the Table I, line $800_2$ in FIG. 8 can be seen to correspond to that row. The parameters in the second row of the Table I can be used to control the SAR 12 for ranges where the to and from propagation time is between a $T_{min}$ of 7.98 microseconds and a $T_{max}$ of 8.42 microseconds. Thus, line $800_2$ is drawn between times 7.98 and 8.42 on the time axis.

To select parameters for use in the SAR 12, the range, $R_a$, to the center of patch $16_i$ (FIG. 1A) is estimated as previously described. Any one of the lines $800_1 \ldots 800_{18}$ above that cross the range estimate corresponds to parameters which would satisfy all the criteria previously discussed. In this case, lines $800_{10}$, $800_{11}$, and $800_{14}$ satisfy the criteria. One of the sets of parameters corresponding to those lines can be selected depending upon which would be easiest to implement in the SAR 12 (FIG. 2).

Here, one set of appropriate parameters for each range (time) is selected in advance and stored in the parameter memory 130 (FIG. 2). A dotted line 802 indicates which of the lines $800_1 \ldots 800_{18}$ will be used at each range. Between ranges corresponding to points $804_1$ and $804_2$, parameters corresponding to line $800_{12}$ are used; between ranges corresponding to points $804_2$ and $804_3$, parameters corresponding to line $800_{10}$ will be used; and so on for each of the points $804_1 \ldots 804_6$.

Referring again to FIG. 2, it should be apparent that values of $T_p$, S, $T_r$ and $T_s$ may be calculated and stored in the parameter memory 130. As the missile approaches a target, the range will change in a way which can be predicted by timing and control unit 128. For each range, there is a set of the parameters in parameter memory 130 which allows the SAR 12 to be controlled to avoid SAR ambiguities, interruption ambiguities and eclipsing.

The signals fed to the FFT processors 114A . . . 114D have various frequency components. The frequency of these components represent the ranges to various points within patch $16_i$ from which transmitted pulses reflect. Thus, the FFT processors 114A . . . 114D can sort the components by range to the reflecting point. The phase of these components varies over time in proportion to the azimuthal angle of the reflecting point in reference to the direction of travel of missile 10 (FIG.1A). Thus, FFT processors $116_1 \ldots 116_M$ are able to sort the components based on azimuthal angle. To ensure the desired frequency and phase characteristics, the mixing signals produced by the synthesizer 126 must be appropriately selected to compensate for motion of the missile 10 (FIG. 1A). The need for motion compensation might be best understood by way of example. Referring now to FIGS. 2 and 4, the SAR map produced by SAR 12 is produced during a dwell lasting for a time $T_i$. During the dwell, the range and azimuthal angle between SAR 12 and any point, say point (i, j), will change. At the start of the dwell, point (i, j) will be at range $R_1$ and an angle $a_1$. At the end of the dwell, point (i, j) will be at a range $R_2$ and an angle $a_2$. This might be thought of as the point (i, j) moving during the dwell, even though it is really missile 10 which is moving. This motion would make the map produced by the SAR 12 appear blurred, much like motion of objects in a photograph makes the photograph appear blurry.

To reduce this problem, FFT processors 114A . . . 114D and FFT processors $116_1 \ldots 116_M$ produce a map reflecting range and azimuth relative to a reference point rather than relative to the missile 10 (FIG. 1A). FIG. 4 shows in the coarse range bin 402A, any point (i, j) is at range $R_{ij}$ and azimuthal angle $a_{ij}$ from the point $R_1$ at the center of the range bin. The values of $R_{ij}$ and $a_{ij}$ will change very little as missile 10 (FIG. 1A) approaches the patch $16_i$.

In each of the other coarse range bins 402B . . . 402D, the points in those coarse range bins can be referenced to points $R_2 \ldots R_4$ respectively. To reference the signals applied to FFT processors 114A . . . 114D to the points in the coarse range bins $R_1 \ldots R_4$, respectively, the frequency and phase of signals in the paths 105A . . . 105D must be adjusted. In particular, the frequency component reflected from any point (i, j) must be proportional to the distance $R_{ij}$ and the change in phase of the signal must be proportional to the angle $a_{ij}$ (FIG. 4). These frequency and phase characteristics are ensured by mixing the signal in each path 105A . . . 105D with a signal of appropriate frequency and phase produced by synthesizer 126.

Figure 9:
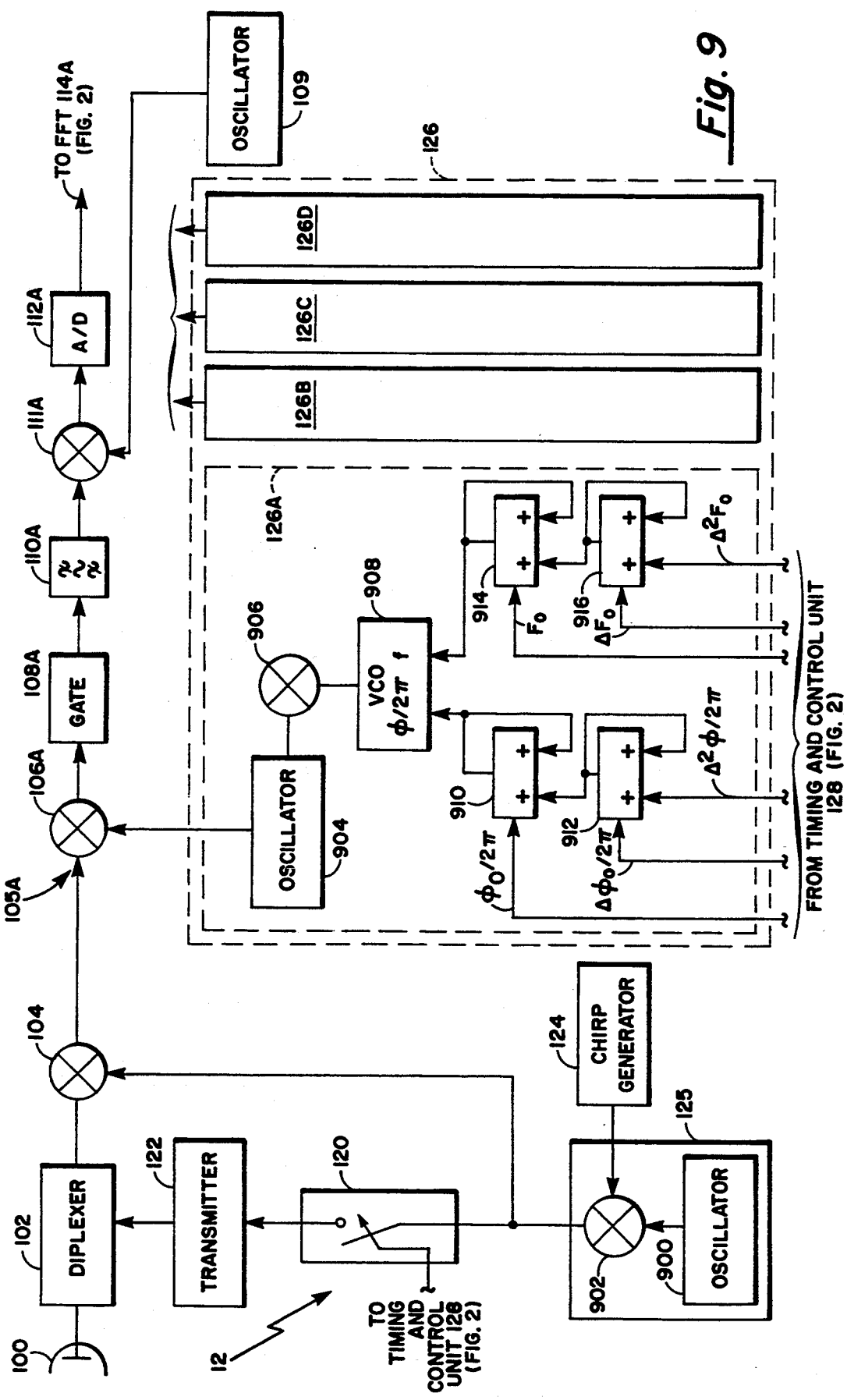
FIG. 9 is a block diagram, greatly simplified, showing a portion of FIG. 2 in greater detail.

Referring now also to FIG. 9, the manner in which the appropriate signals produced by the synthesizer 126 are selected can be better understood. FIG. 9 shows additional details of the synthesizer 126 as well as portions of the SAR 12 described earlier with FIG. 2. FIG. 9 shows several mixers and local oscillators used for frequency conversion. An oscillator 900 and a mixer 902 within the exciter 125 convert the chirped signal produced by chirp generator 124 to an appropriate output signal. The oscillator 900 produces an output signal having a frequency $f_{S1}$ and a phase $\Phi_{S1}$. One of skill in the art will realize typically it is easier to build a chirp generator 124 having an output signal at lower frequencies and mix the lower frequency signal with a local oscillator signal to produce an output signal with an appropriate higher frequency.

The output signal from the exciter 125 is fed, via the switch 120, to the transmitter 122. The output signal from the transmitter 122 is coupled, via the diplexer 102, to the antenna 100 wherein the transmitted signal is radiated.

A received signal is captured by the antenna 100 and coupled, via the diplexer 102, to the mixer 104 wherein the received signal is "dechirped". As described hereinabove, the dechirped signal includes a plurality of frequency components indicative of objects within the illuminated one of the patches $16_1 \ldots 16_{45}$ (FIG. 1A). The dechirped signal is fed to path 105A and paths 105B . . . 105D. As described hereinabove, a portion of the dechirped signal is fed to the mixer 106A wherein the dechirped signal is mixed with a signal from the synthesizer 126 to provide an output signal. The output signal of the mixer 106A is fed to the gate 108A and then passed through the bandpass filter (BPF) 110A having a center frequency $f_f$ to extract the desired signal of the receive spectrum from each received pulse. The output signal from the BPF 110A is fed to a mixer 111A wherein the input signal of the mixer 111A is mixed with a local oscillator signal from an oscillator 109 having a frequency equal to the center frequency of the BPF 110A minus the value of one-fourth of a frequency $f_S$ of the sampling rate of the A/D 112A and a phase $\Phi_{M1}$. The output signal of the mixer 111A is fed to the A/D 112A wherein said signal is converted from an analog signal to a digital signal. The A/D 112A has a sampling rate $f_S$ i.e. the rate at which A/D 112A produces samples. The digital output signals from the A/D 112A is fed to the digital signal processor 140. Within the digital signal processor (DSP) 140, the digital signal from the A/D 112A is processed for range by FFT processor 114A (here a 128 point FFT) to provide twenty-two range cells. Since there are four paths 105A . . . 105D, a total of 88 range cells are provided by DSP 140. The output of the FFT processor 114A is fed to each of the FFT processors $116_1 \ldots 116_M$ (here M is selected to provide an appropriate number of azimuthal cells. Thus, the DSP 140 provides a SAR map of 88 cells by the above mentioned number of azimuthal cells. It should be apparent, a combination of control by the synthesizer 126 and FFT processing adjusts the phase of the incoming samples as they will line up in phase for an echo in the center of the corresponding range-azimuth cell. Typically, the samples are in groups of 128 samples per chirp ramp and 200 ramps are processed to complete an array of range-azimuth cells.

The synthesizer 126 produces an output signal used for frequency conversion at the mixer 106A. The synthesizer 126 includes four similar sections 126A, 126B, 126C and 126D. Each section 126A . . . 126D of the synthesizer 126 must provide an output signal wherein the instantaneous frequency of sample signals at the middle of the data gathering interval of each ramp is matched, preferably within 1 Hz and the phase of the sample signals are matched, preferably within $2\pi/256$ radians so that coherent phase is maintained. Thus, section 126A of the synthesizer 126 can be adjusted in 1 Hz increments in frequency and $2\pi/256$ radians in phase. The section 126A produces the signal for the mixer 106A and is shown and will be described as representative. The sections 126B . . . 126D produce signals in a like manner for mixers 106B . . . 106D respectively.

Looking now more closely at the synthesizer 126, the section 126A includes a voltage controlled oscillator (VCO) 908 which provides an output signal with a frequency $f(n)$ and a phase $\Phi(n)$. The frequency can be adjusted for 1 Hz increments and the phase can be adjusted in $2\pi/256$ radian increments. The frequency $f(n)$ varies in accordance with a control signal fed to an input labeled f and the phase $\Phi(n)$ varies in accordance with a control signal fed to an input labeled $\Phi/2\pi$. These control signals, produced in a manner to be described below, can potentially change during each receive period $T_{RX}$ (FIG. 3A). The signal from VCO 908 is up-converted in frequency by an oscillator 904 and a mixer 906. The oscillator 904 has a frequency $f_{s2}$ and a phase $\Phi_{s2}$.

Digressing briefly here for a moment and referring to FIG. 1A, motion compensation commands, timing signals, and antenna pointing commands are based upon the inertially derived position vector from the seeker antenna to a beam reference point in the ground area to be searched. All compensation and timing signals are based upon this vector for a given coherent integration time or dwell. For other dwells this vector is changed to correspond to the beam reference points corresponding to those dwells. The position vector from the antenna sum pattern phase center to the $kl^{th}$ beam reference point ($\bar{R}_{kl}$) is given by, $$\bar{R}_{kl} = X_k \bar{i} + Y_k \bar{j} + Z_k \bar{k} \qquad \text{Eq. 12a}$$

wherein the range to this point can be written as, $$R_{k1} = \sqrt{X_{k1}^2 + Y_{k1}^2 + Z_{k1}^2} \qquad \text{Eq. 12b}$$

$$= R_{k1}(t_o) + \dot{R}_{k1}(t_o) + \ddot{R}_{k1}(t - t_o) + \int^t \int_{t_o} \ddot{R}_{k1}\, d\tau^2$$

where $t_o$ equals the starting time of a given dwell.

The form on the right hand side of equation 12b is more useful in obtaining the doppler gradient and other scaling information explicitly. The range difference to the $ij^{th}$ scatterer (FIG. 4) in the neighborhood of kl in terms of $R_{kl}$ is given by, $$\Delta R_{ij} = R_{ij}(T_o) - R_{k1}(t_o) + [\dot{R}_{ij}(t_o) - \dot{R}_{k1}(t_o)](t - t_o) + \int^t \int_{t_o} (\ddot{R}_{ij}(\tau) - \ddot{R}_{k1}(\tau))\, d\tau^2 \qquad \text{Eq. 12c}$$

The last term of equation 12c contains the quadratic focusing errors in the doppler or cross range filters. If the radial acceleration of the compensating signal ($R_{kl}$) matches that of the $ij^{th}$ scatterer in the illuminated area to sufficient accuracy the term may be neglected. If not, some variant of sub beam patching or polar formatting can be used. In the present application, the accuracy of the acceleration and velocity measurements used to calculate equation 12b are well within the tolerances required to neglect the last term of equation 12c in the vicinity of the $k,l^{th}$ point. As a result equation 12c reduces to, $$\Delta R_{ij} = R_{ij}(T_o) - R_{k1}(t_o) + [\dot{R}_{ij}(t_o) - \dot{R}_{k1}(t_o)](t - t_o) \qquad \text{Eq. 12d}$$

It should be appreciated that the range difference that appears in equation 12d contains both the fixed range difference and the fixed range rate difference of the $ij^{th}$ scatterer with respect to the $kl^{th}$ reference point at the dwell or coherent integration initialization time. That is, for the purposes of linking map segments or other related problems, these differences when measured by a subsequent transformation process are always determined by their values at the beginning of the dwell in question. The parameters of the waveform (s, $T_s$, $T_i$) have been selected so that the slip is negligible over the range sample collection time $T_s$, however, it must be taken into account from dwell ($T_i$) to dwell.

One more point should be made with regard to the range rate difference in equation 12d. This difference is related to the ground cross range position of the $ij^{th}$ point with respect to the kl point by the following expression, $$\Delta \dot{R}_{ij} = \dot{R}_{ij}(t_o) - \dot{R}_{k1}(t_o) = \dot{\gamma}_{kl} \cos\Psi_{kl} X_{ij} \qquad \text{Eq. 12e}$$

where:

$$\dot{\gamma}_{k1} = \frac{V\cos\delta \sin\psi_{k1}}{R_{k1}\cos\psi_{k1}} \text{ which equals the vertical component}$$

of the angular velocity of the line of sight to the kl point at $t=t_o$;

V is the seeker velocity at $t=t_o$;

$\delta$ is the depression angle of the velocity vector at $t=t_o$;

$\gamma_{kl}$ is the horizontal squint angle of $R_{kl}$ at $t=t_o$;

$\Psi_{kl}$ is the elevation angle of $R_{kl}$ at $t=t_o$; and $X_{ij}$ is the x component (azimuth) of the $ij^{th}$ point in a coordinate system whose origin is at k,l and axes are such that the z axes is up, the y axes is horizontal range and the x axes is horizontal cross range.

The position of the kl coordinate location is known exactly in the map reference coordinate system which is taken to be in the center of the mapping area 17. Just as the range rate difference in equation 12d is related to the x coordinate (equation 12e) of the $ij^{th}$ scatterer in the kl coordinate system, the range difference is related to the y coordinate, i.e., $$\Delta R_{ij} = R_{ij}(t_o) - R_{kl}(t_o) = Y_{ij}\cos\Psi_{kl} \quad \text{Eq. 12f}$$

Equation 12b represents the fundamental reference signal from which all timing and compensation signals are generated. It is provided by in the seeker timing and control unit 128 directly from IMU position and velocity data. A desired form of equation 12b is provided from an integral of range rate, i.e., $$R_{kl} = R_{kl}(t_o) + \int_{t_o}^{t} \dot{R}_{kl} d\tau \quad \text{Eq. 12g}$$

where $$\dot{R}_{kl} = \overline{V} \cdot \overline{i}_{Rkl} \quad \text{Eq. 12h}$$

The unit vector $\overline{i}_{Rkl}$ is generated from equation 12a. It is used to generate $R_{kl}$ in equation 12h for equation 12g and also used to generate the antenna beam pointing commands after being transformed to antenna coordinates.

With the latter in mind and referring to FIGS. 9, 1A, 2 and 4, the required values of $\Phi(n)$ and $f(n)$ can be calculated by deriving an expression for the signal applied to the FFT processor 114A. The signal transmitted by the chirp generator 124 can be represented by $\sin[2\pi(f_c t + st^2/2)]$. At a time $T_n$ when a reflection is received, the signal produced by the chirp generator 124 is represented by $\sin[2\pi(f_c(t-T_n) + s(t-T_n)^2/2]$. The reflected signal has components of the same form, but delayed a time $t_R$. The variable $t_R$ represents the time it takes a signal to travel to patch $16_i$, reflect from an object and travel back to antenna 100. Thus, $t_R$ equals $2R(t)/C$ where $R(t)$ indicates range, which changes as a function of time and C equals the speed of the travelling signal.

The signal applied to the FFT processor 114A is represented by:

$$\sin[2\pi[-(f_c + f_{s1}) - S(t - T_n) + St_R/2] t_R + \quad \text{Eq. 12}$$
$$2\pi(f_{s1} - f_{s2} - f_f)t + \phi_{s1} - \phi_{s2} - \phi_{M1} - \phi_{M2} -$$
$$[\phi_n(t - T_n) + 2\pi f_n(t - T_n)t] + 2\pi(f_s/4)t_n]$$

This signal can be altered by changing the frequency $f_n$ and the phase $\Phi_n$ of the signal produced by synthesizer 126. To reference various ranges to the point $R_1$ as shown in FIG. 4, the signal of Eq. 12 should have a frequency which is constant over a dwell for reflections from point $R_1$. The constant is here selected to be $f_s/4$. This value is selected because of the sampled nature of the signal applied to FFT processor 114A. FFT processor 114A can unambiguously resolve frequencies between 0 and $f_s/2$; $f_s/4$ is in the middle of this range. To reference the azimuthal angles to the point $R_1$ as shown in FIG. 4, the phase of the signal reflected from the center point should be constant over the dwell (i.e. no phase change which corresponds to an azimuthal angle of zero). The exact value at which the phase is constant is not important since it is only the change in phase which affects the SAR image.

A little thought reveals these conditions are satisfied with values:

$$f_n = [-(f_c + f_{s1}) - s(t - T_n) + st_R](dt_p/dt) - st_R \quad \text{Eq. 13a}$$

and

-continued $$\Delta\phi = \Delta[2\pi(-(f_c + f_{s1}) - s(t - T_n) + st_R/2] t_R -$$
$$\Delta[[-(f_c + f_{s1}) - s(t - T_n) + st_R] (dt_R/dt) - st_R] T_s/H -$$
$$\Delta[[-(f_c + f_{s1}) - s(t - T_n) + st_R] (dt_R/dt) - st_R] T_r + (f_s/4)T_r$$

where, $\Delta$ is a function indicating the change in the argument from the transmission of one chirp to the next, i.e. a time $T_r$; and $T_s/H$ is the time from the start of a chirp until A/D 114A makes a sample of the signal.

The VCO 908 is controlled to produce a signal with desired phase and frequency. The signal controlling the phase of the signal produced by VCO 908 is produced by adders 910 and 912. The adders 910 and 912 are configured to calculate the phase control signal using what are known as first and second difference equations. Adders 914 and calculate a frequency control signal also using first and second difference signals. The contents of each adder are updated at the start of each chirp. The adders 910 and are updated first. The adders 912 and 916 are updated second.

Difference equations represent a known way to compute discrete values approximating a continuous signal. The first and second difference equations are of the following form:

$$X_{n+1} = X_n + \Delta X_n \quad \text{Eq. 14a}$$

$$\Delta X_{n+1} = \Delta X_n + \Delta^2 X_o \quad \text{Eq. 14b}$$

where $X_n$ is a function, here either $\theta_n/2\pi$ or $f_n$, in the nth receive interval;

$X_{n+1}$ is the function in the (n+1)th receive interval;

$\Delta X_n$ is called the first difference of the function and is computed according to Eq. 14b; and $\Delta^2 X_o$ is a constant which equals $\Delta^2\Phi/2\pi$, when Eq. 14a and Eq. 14b are used to compute $\Phi_n/2\pi$, and equals $\Delta^2 F_o$, when Eqs. 14a and 14b are used to compute $f_n$.

To compute the required values of $\Phi_n/2\pi$ and $f_n$ using Eqs. 14a and 14b, the following parameters must be determined: $X_o$, $\Delta X_o$, and $\Delta^2 X_o$. Or for computing $\Phi_n/2\pi$ and $f_n$, the parameters are $\Phi_o/2\pi$, $\Delta\Phi_o/2\pi$ and $\Delta^2\Phi_o/2\pi$ and $F_o$, $\Delta F_o$ and $\Delta^2 F_o$, respectively. In FIG. 9, $\Delta^2\Phi_o/2\pi$ and $\Delta^2 F_o$ are shown as inputs to adders 912 and 916, respectively. $\Delta\Phi_o/2\pi$ and $\Delta F_o$ are the initial values stored in adders 912 and 916, which act as accumulators. $\Phi_o/2\pi$ and $F_o$ are the initial values stored in adders 910 and 914, which also act as accumulators.

Values for the parameters are determined from Eqs. 13a and 13b by rewriting them in the form of difference equations and solving for boundary conditions using known mathematical techniques. The results are as follows:

$\Phi_o/2\pi$ = arbitrary $\Delta\Phi_o/2\pi = sT_r[t_R(o)\dot{t}_R(o)T_s/H] + T_r f_s/4$ $\Delta^2\Phi_o/2\pi = st_R(o)T_r^2$ $F_o = -[(f_c + f_{s1}) + sT_sH]t_R(o) + st_R(o)\dot{t}_R(o) - st_R(o) + f_{s1} - f_{s2} - f_f$ $\Delta F_o = [-(f_c + f_{s1} + sT_sH)\dot{t}_R(o) - s\ddot{t}_R(o)]T_r$ $\Delta^2 F_o = -st_R(o)T_r^2$ where $f_c$ is the carrier frequency at the start of the frequency ramp;

$f_{s1}$ is the transmitter up-converter reference frequency;

s is the chirp slope;

$T_s$ is the sweep time;

$f_{s2}$ is the frequency in which the synthesizer frequency is added to form the second LO signal;

$f_f$ is the bandpass filter center frequency;

$T_r$ is the range repetition period;

$t_R(o)$ is the back and forth propagation time to the point $R_1$ at the start of a dwell;

$\dot{t}_R(o)$ is the first derivative of the to and from propagation time to the point $R_1$ at the start of a dwell; and $\ddot{t}_R(o)$ is the second derivative of the to and from propagation time to the point $R_1$ at the start of a dwell.

The value of $\Phi_o/2\pi$ is arbitrary because the exact phase of the signal applied to FFT 114A is irrelevant. Only the change in phase is important.

As described above and referring to FIGS. 1A and 2, the outputs of the FFT processors $116_1 \ldots 116_M$ represent an array of pixels characterizing objects in one patch, say patch $16_i$. A different set of pixels is produced each dwell time characterizing a different one of the patches $16_1 \ldots 16_{45}$. These sets of pixels are combined into a large map including the target area.

In combining the pixels formed in each patch $16_i \ldots 16_{45}$, the pixels must be properly aligned. Pixels representing adjacent objects must be adjacent in the map. Otherwise, an object appearing as a straight line, say a road, would be represented in the map by several groups of pixels forming discontinuous lines. In a system as shown in FIG. 2, map circuit 118 appropriately combines the pixels of individual patches $16_1 \ldots 16_{45}$.

Figure 10A:
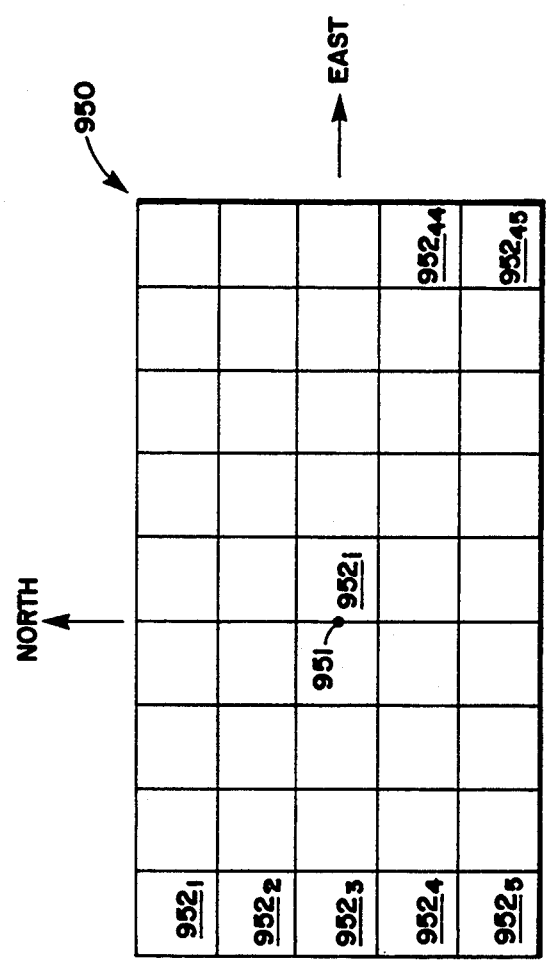
FIG. 10A is a sketch useful in understanding how a map is formed by a map circuit of FIG. 2.

FIG. 10A shows a map 950 including a plurality, here 45, of regions $952_1 \ldots 952_{45}$ (representative ones of which are numbered). The map 950 is oriented along an orthogonal coordinate system relative to the ground. Here, the direction north is one axis and the direction east is a second axis, much the same way a road map might be oriented. The center of the map 950 is at a point 951, which corresponds to a point on the ground. The map 950 when produced should thus be the same regardless of the orientation of the missile 10 (FIG. 1A). Each of the regions $952_1 \ldots 952_{45}$ represents a fixed dimension on the ground. The center of each region $952_1 \ldots 952_{45}$ can thus be determined.

Figure 10B:
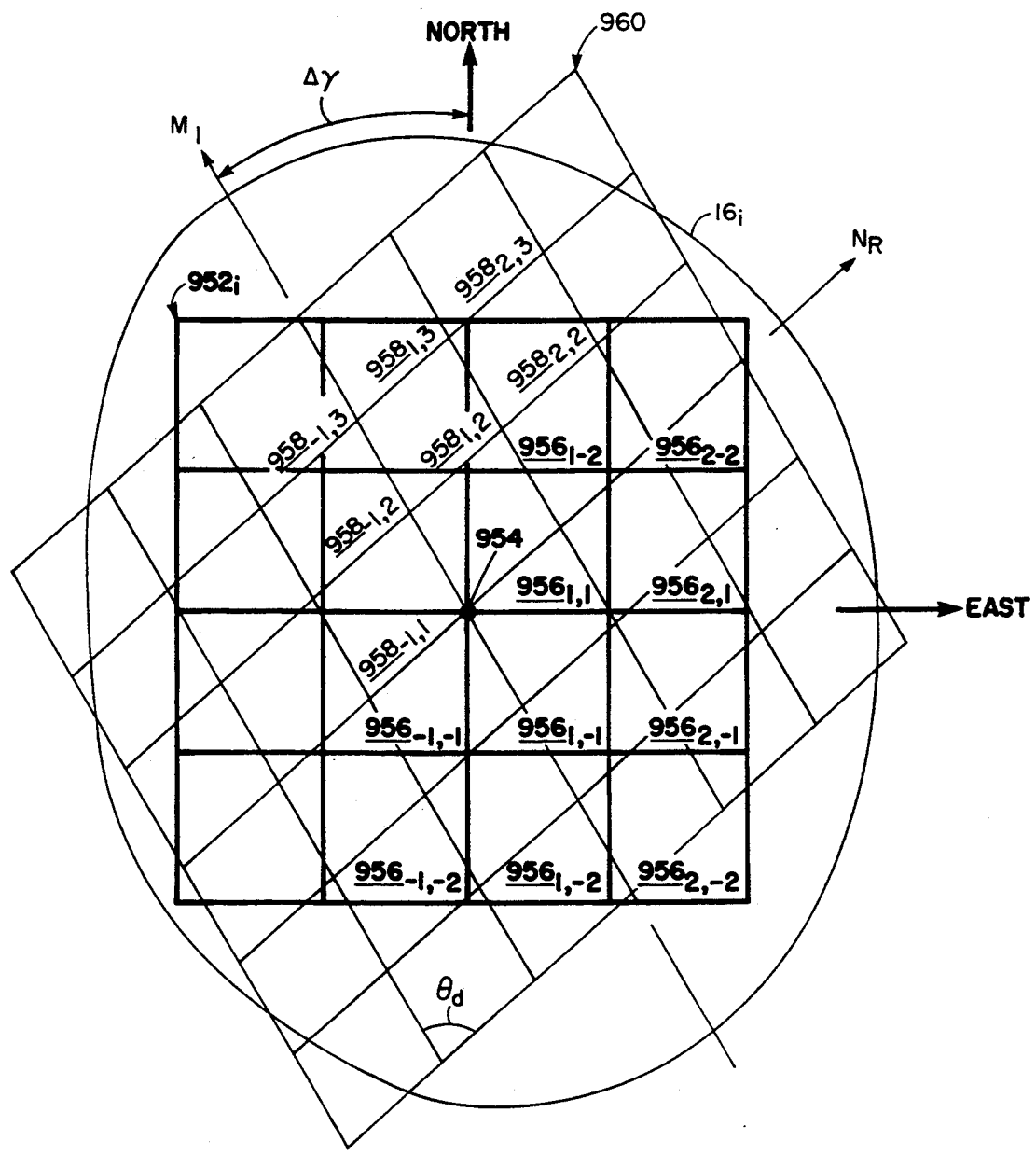
FIG. 10B is a sketch showing additional features of how a map is formed.

Comparing FIG. 1A and FIG. 10A shows that there is one region $952_1 \ldots 952_{45}$ (FIG. 10A) corresponding to each one of the patches $16_1 \ldots 16_{45}$ (FIG. 1A). One dwell is made with the center of one of the patches $16_1 \ldots 16_{45}$ aligned with the corresponding one of the regions $952_1 \ldots 952_{45}$. Timing and control unit 128 (FIG. 2) generates commands to antenna 100 to ensure one patch is formed in the required position. The array of pixels formed for each one of the patches $16_1 \ldots 16_{45}$ are the outputs of the FFT processors $116_1 \ldots 116_M$. These pixels are assigned to pixels in the map region. FIG. 10B shows this assignment in greater detail.

FIG. 10B shows a representative one of the map regions $952_i$. The center of region $952_i$ corresponds to a point 954 the ground 9. Region $952_i$ is in turn made up of a plurality, here 16, of map pixels numbered $956_{i,j}$, where $i=-2, -1, 1$ and 2 and $j=-2, -1, 1$ and 2. Shown superimposed on region $952_i$ is the array of pixels 960 in patch $16_i$. This superimposition results from the beam 15 (FIG. 1A) being pointed at the point 954 on the ground 9. The array of pixels 960 are a graphical representation of the outputs of the FFT processors $116_1 \ldots 116_M$. Each row of array 960 is, as described previously, one range bin and corresponds to the outputs of one of the FFT processors $116_1 \ldots 116_M$. The pixels in each row are azimuthal bins and correspond to a single one of the outputs of one of the FFT processors $116_1 \ldots 116_M$. The individual pixels in array 960 are numbered $958_{k,l}$ where $k=-3, -2, -1, 1, 2$ and 3 and $l=-3, -2, -1, 1, 2$ and 3. To assign values to each one of the pixels $956_{i,j}$ in region $952_i$, one of the pixels $958_{k,l}$ in array 960 is selected.

The map circuit 118 selects one pixel from array 960 to correspond to each pixel in map $952_i$. The map circuit 118 selects a pixel in array 960 to correspond to a pixel in map region $952_i$ by identifying the pixel in array 960 which is the "nearest neighbor". To identify the nearest neighbor, it must be recalled that each pixel in map region $952_i$ represents a region on the ground, as does each of the pixels in array 960. To select the nearest neighbor of a pixel in map region $952_i$, the pixel array 960 representing the region on the ground closets to the region represented by the pixel in map region $952_i$ is selected.

To select the nearest neighbor, the map circuit 118 implements an equation represented by:

$$\begin{bmatrix} k \\ l \end{bmatrix} = \left( \genfrac{}{}{0pt}{}{FFT}{MAP} \right) \begin{bmatrix} i \\ j \end{bmatrix}$$ Eq. 15a where $\left( \genfrac{}{}{0pt}{}{FFT}{MAP} \right)$ is a 2 × 2 matrix to be described below;

i, j are the coordinates, relative to point 954, of a pixel in map region $952_i$; and k,l are the coordinates, relative to point 954, of a pixel in array 960.

In evaluating Eq. 15a, the values computed for k and l may be non-integer, but to represent pixel coordinates, k and l must be integers, so their values are rounded to the nearest integer.

The matrix $\left( \genfrac{}{}{0pt}{}{FFT}{MAP} \right)$ is derived from considering several factors including the geometry of the trajectory of missile 10 relative to the map area 17, the size of the region on the ground represented by each pixel in map region $952_i$, and the same size of the region on the ground represented by each pixel in array 960. Considering all the factors results in a matrix as follows:

$$\left( \genfrac{}{}{0pt}{}{FFT}{MAP} \right) = \begin{bmatrix} k_{DOP} \cos(\Delta\gamma) & k(\sin(\Delta\gamma) - \tan(\theta_o)) \\ -\cos(\psi)\sin(\Delta\gamma) & \cos(\psi)\cos(\Delta\gamma) \end{bmatrix}$$ EQ. 16a where:

$\Delta\gamma$ is, as shown in FIG. 10B, the angle between the axis north of map region 952 and the axis $M_1$ in array 960, wherein $M_1$ is the direction in which beam 15 is pointed when patch $16_i$ is formed;

Ψ is, as shown in FIG. 1A, the angle between the center of beam 15 and the ground 9; and $\theta_o$ is a term which accounts for the situation that the pixels in array 960 may not be rectangular.

In particular, the angle 8a shown in FIG. 10B may not be 90°. $\theta_o$ is the difference between $\theta_d$ and 90°. If the missile is flown in the depression plane, as described above, $\theta_o$ is zero. Such a trajectory may not be possible, necessitating the term $\tan(\theta_o)$. One familiar with SAR technology will appreciate that $\theta_d$ is the angle between the range bins and the azimuth bins. This angle may be calculated according to the equation:

$$\tan(\theta_o) = \frac{-\dot{R}^2(X^2 + Y^2) + Y^2 V_y^2 + YhV_yV_z}{XYV_y^2 + hXV_yV_z}$$

where $\dot{R}$ is the first derivative of the range to point 954;

X and Y are cartesian coordinates of missile 10 relative to point 952 with the cartesian plane being parallel to the ground 9 (FIG. 1A);

h is the height of missile 10 above the level of the ground at point 954; and $V_x$, $V_y$ and $V_z$ are the components of the velocity vector $\overline{V}$ in the cartesian coordinate system with z being perpendicular to the ground.

The values of X, Y, h, $V_x$, $V_y$, $V_z$ and $\dot{R}$ are determined by timing and control unit 128 (FIG. 2) from measurements made by INS 132. The term $k_{DOP}$ corrects the situation wherein the pixels in the array 960 are a different size than the pixels in the map region $952_i$. In particular, the width of each pixel $958_{k,l}$ in the direction of axis $N_R$ is determined by the azimuthal resolution of the SAR 12 (FIG. 2). The equation for $k_{DOP}$ is as follows:

Eq. 18
$$k_{DOP} = \frac{\text{(azimuth resolution of map } 952_i\text{)(size of } FFT\text{ 116)}}{\text{(azimuth resolution of } SAR\text{ 12)(Number of Sweeps)}}$$

The azimuth resolution of the map region $952_i$ is how wide a region of ground, i.e. along the east axis, is represented by one of the pixels in map region $952_i$. This value is a constant value, say 10 feet. The azimuth resolution of the SAR 12 depends on parameters of the SAR 12 such as the dwell time $T_i$ and the angle of the velocity vector $\overline{V}$. The azimuth resolution is computed for each patch $16_1 \ldots 16_{45}$ using known formulas for SARs. The "number of sweeps" in Eq. 18 tells how many sweeps $49_1 \ldots 49_x$ (FIG. 3A) were transmitted during the dwell when patch $16_i$ was formed. This value may change for each dwell. The size of FFT 116 refers to the number of samples the FFT processors $116_1 \ldots 116_M$ operated on, as described above, the FFT processors $116_1 \ldots 116_M$ operate on numbers of samples which are a power of 2. If the number of samples collected is not exactly a power of two, samples with zero values are added to make a number of samples which is a power of two.

It might be noted, the $k_{DOP}$ corrects for difference between pixel sizes in the direction of the east axis and the direction of the axis $N_R$. A separate factor might be needed to correct for differences in size of pixels in the direction of the north axis and the axis $M_1$. However, as described previously, the sampling rate of A/Ds 112A . . . 112D are adjusted so that the same number of samples of each sweep $49_1 \ldots 49_x$ (FIG. 3A) are taken for all of the patches $16_1 \ldots 16_{45}$. This ensures that the extent of each pixel in array 960 along the $M_1$ axis (i.e. the range resolution) is a constant. This constant value is selected to provide a dimension to the pixels in array 960 in the direction of axis $M_1$ the same as the dimension of pixels in the map area $952_i$ in the direction of the north axis.

Referring again to FIGS. 1A and 2, the scan pattern of the antenna 100 will now be explained. The patches $16_1 \ldots 16_{45}$ are projections of the beam 15 3 dB two way contour on the ground 9. The beam 15 is directed at a point $P_{(k,l)}$ in the map pattern 17 for a coherent integration time and then moved to the next point in a vertical raster scan pattern. The scan starts at patch $16_1$, moves sequentially to patch $16_2$, $16_3$, $16_4$ and $16_5$. From patch $16_5$, the scan jumps to patch $16_6$ and continues until reaching patch $16_{45}$. Having completed a scan pattern, the scan starts again at patch $16_1$, which is always on the side closest to the velocity vector and at the furthest range. All of the points $P_{(k,l)}$ are on parallel ground lines approximately in the direction of the ground projection of the range vector.

The scan pattern is executed in such a manner to minimize range slip of one beam position relative to another in azimuth. It has been derived that the relative range slip (RS) for adjacent beams can be represented by:

$$RS = 0.7 \omega_{kl} R_k a_f N_{eb} [T_i + 23 T_{snap}]$$

where 0.7 is due to the situation that only 0.7 of the beam width is used between the parallel scan lines;

RS is the relative range slip in the beam pointed at the kl pattern point during a coherent integration time (This is twice the normal range slip because adjacent patches are rotating in the opposite direction);

$\omega_{kl}$ is the angular velocity of the line of sight to the kl point;

$a_f$ is the 3 dB two way beam width of the seeker antenna;

$N_{eb}$ is the number of elevation beam positions in the scan pattern;

$T_i$ is the coherent integration time; and $T_{snap}$ is the time to snap the antenna from one beam position to the next adjacent position.

For example, if $R_{kl}=10355$ ft, $\omega_{kl}=15$ mr/sec, $a_f=25$ mr, $N_{eb}=5$, $T_i=0.1$ sec, and $T_{snap}=10$ ms, then RS=1.65 ft. If the beamwidth were made significantly wider at a given range, either by decreasing frequency or decreasing antenna diameter, the range slip along the azimuthal patching boundary increases. It should be appreciated for a 10 ft. resolution, such a range slip of 1.65 ft/10 ft. resolution has a minimal effect when constructing the digital image of the mapping area 17.

Referring now to FIG. 1A with a map of the mapping area 17 constructed, data processing techniques can identify a target in the map. The latter is typically referred to as a "search" mode. Once a target has been selected, the missile 10 enters a "track" mode wherein the missile 10 is guided towards the target. In the track mode, the size of the mapping area 17 can be reduced, since the SAR 12 needs to process only that portion of the map about the target to track the target.

Figure 2A:
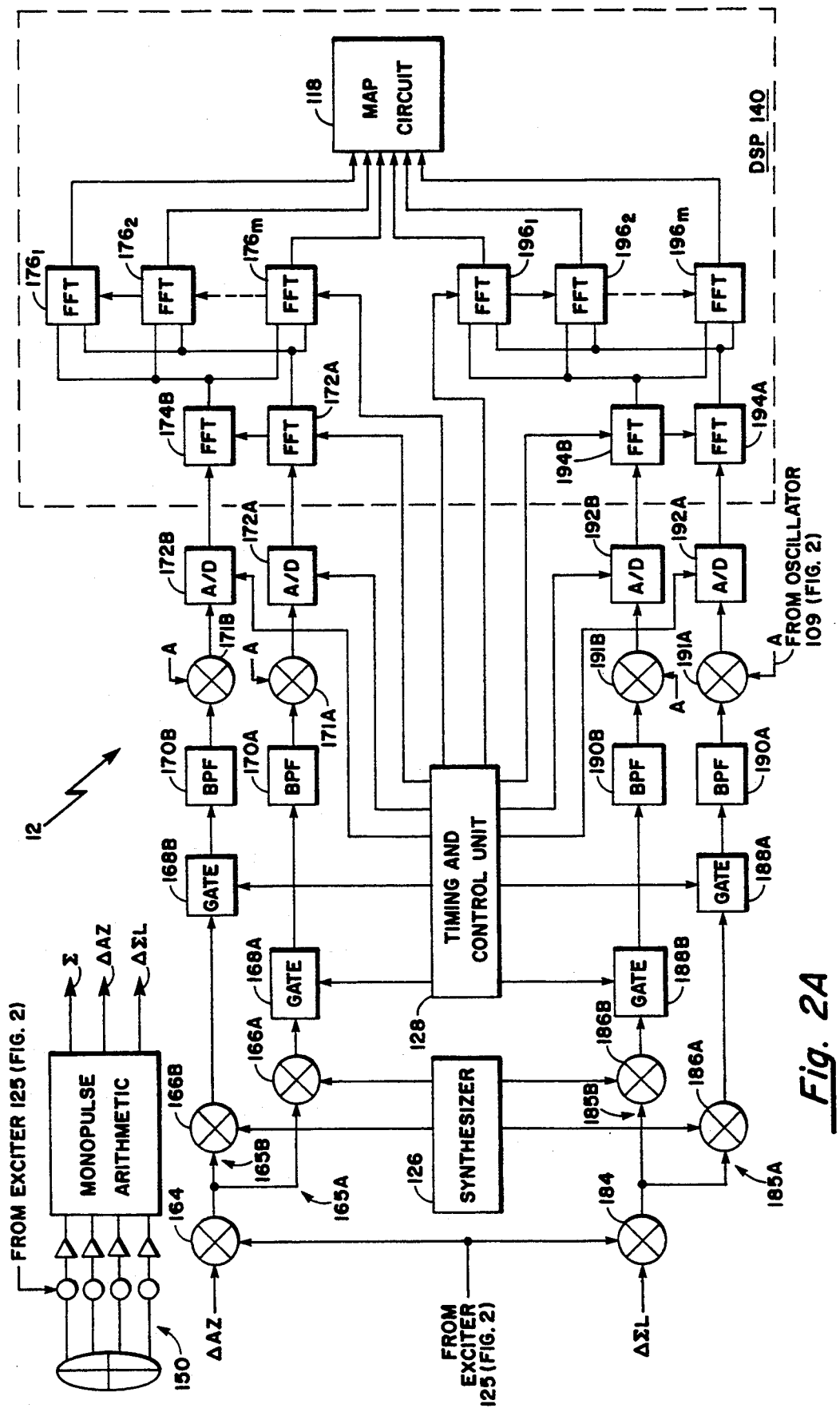
FIG. 2A is a block diagram, greatly simplified, of a portion of a SAR incorporating monopulse techniques within the present invention.

Referring now also to FIGS. 2 and 2A, in a separate mode, called an "initialization mode", the estimate of the position of the missile 10 (FIG. 1A) provided by INS 132 (FIG. 2) can be improved. In particular, the height of missile 10 above the mapping area 17 is determined. The height of the missile 10 above the ground directly below it might be measured with an altimeter. However, the height of the missile relative to the target area is important for such things as steering the antenna 100 to the correct point on the ground.

An estimate of the height, h, can be made if monopulse techniques are employed. As is known, a monopulse radar produces a sum signal and two difference signals, an azimuth difference signal and an elevation difference signal. FIG. 2 shows the processing performed on the sum signal. FIG. 2A shows similar processing which is performed on the two difference signals to produce an array of pixels representing an azimuth difference signal and an array of pixels representing an elevation difference signal. The pixels in the three arrays formed from the sum and two difference signals which correspond are then compared.

Referring now to FIG. 2A, a portion of the SAR 12 is shown to include a focal plane array 150 mounted within the diplexer 102 (FIG. 2). The focal plane array 150 is disposed in such a manner to provide four quadrants of a monopulse antenna. The focal plane array can be constructed in accordance with the teachings of U.S. Pat. No. 5,083,130. Alternatively, the diplexer 102 can be replaced with a circulator and the antenna 100 (FIG. 2) can be replaced with a monopulse antenna. Each of the four outputs of the focal plane array 150, after being mixed with a local oscillator signal and down converted to a first intermediate frequency signal and amplified, is fed to a monopulse arithmetic unit 152 where the four signals are summed and differenced using monopulse techniques to provide a sum signal, an azimuth difference signal and an elevation difference signal. The sum signal is fed to mixer 104 (FIG. 2) and processed as described hereinbefore. The azimuth difference signal is fed to a mixer 164 wherein the signal is dechirped. The output of mixer 164 is divided into two paths, path 165A and path 165B, wherein a first portion of the output signal from mixer 164 is fed to mixer 166A and a second portion of the output signal form mixer 164 is fed to mixer 166B. Unlike the sum signal wherein the sum signal was separated into four range bins corresponding to the four paths 105A . . . 105D, respectively, the azimuth difference signal is divided into two range bins corresponding to path 165A and path 165B. The output signal from the mixer 166A is fed to range gate 168A, which in response to a control signal from timing and control unit 128 is either open or closed. When closed, the range gate 168A allows the signal fed thereto to pass through and the signal is fed to a bandpass filter (BPF) 170A. The BPF 170A limits the frequency band width to a frequency range that falls within the band width of A/D 172A. The signal at the output of the BPF 170A is fed to a mixer 171A wherein the signal is mixed with a local oscillator signal from the oscillator 109 (FIG. 2) to provide an output signal within the frequency range of the A/D 172A. The output signal from the mixer 171A is converted to a digital signal by the A/D 172A and fed to a FFT processor 174A within the digital signal processor (DSP) 140. The FFT processor 174A sorts the input signal into various range bins. The output of the FFT processor 174A is fed to FFT processors $176_1$ . . . $716_M$ wherein the various range bins are further sorted into various azimuthal bins. The outputs of the FFT processors $176_1$ . . . $176_M$ are fed to the map circuit 118. The mixer 166B, a range gate 168B, a BPF 170B, a mixer 171B, an A/D 172B and a FFT processor 174B operate in a manner similar to the mixer 166A, the range gate 186A, the BPF 170A, the mixer 171A, the A/D 172A and the FFT processor 174A, respectively. Each of the above described elements have characteristics and operate similar to the manner as described earlier for path 105A. Thus, the timing commands and frequency ranges for the azimuth difference channel are similar to those for the sum channel. It should now be appreciated, an azimuth difference map is created, with each pixel in the azimuth difference map having a corresponding pixel in the map (sum map) formed as described hereinabove in connection with FIG. 2.

In a similar manner, the elevation difference signal is fed to a mixer 184 wherein the elevation difference signal is dechirped. The output of the mixer 184 is divided into two paths 185A and 185B wherein the signal is fed to a mixer 186A and 186B, respectively. Without providing a detailed description, it should be appreciated that the mixers 186A, 186B, range gates 188A, 188B, BPF's 190A, 190B, mixers 191A, 191B, A/D's 194A, 194B, FFT processors 194A 194B and FFT processors $196_1$ . . . $196_M$ process the input signal and sort the signal into various range bins and further sort the range bins into various azimuthal bins. With the latter, an elevation difference map is created, with each pixel in the elevation difference map having a corresponding pixel in the sum map. The sum map, the azimuth difference map, and the elevation difference map is now available for further processing.

It should be appreciated using parallel processing techniques, that signals to provide the sum map, the azimuth difference map and the elevation difference map are processed simultaneously to increase the speed of the processing.

In the initialization mode, a pixel representing a highly reflective object in the patch produced from the sum beam is selected. The corresponding pixels produced from the difference beams are selected and used to compute what are commonly called "monopulse ratios". These ratios tell the azimuthal and elevation angle to the point on the ground represented by the pixel. Referring now also to FIG. 1A, if one were to construct a right triangle between missile 10 and that point on the ground, these angles would specify one angle, $a_{10}$, of the triangle. The hypotenuse of the triangle is the range between the missile 10 and the point selected. This range is determined, as described above, by the FFT processors 114A . . . 114D. Knowing two angles and the length of one side of a triangle, the length of any other side, here the side h, can be calculated.

For each one of the patches $16_1$ . . . $16_{45}$, there is a different value of height. In the initialization mode, one value of height could be calculated for each of the patches. Alternatively, one value of h might be calculated for one patch and used for several adjacent patches. In this way, a few, say three or four, patches need only to be formed in the initialization mode.

Another advantage of such a technique is that boresight range rate error can be calculated. Knowing the altitude error and the range rate error of any reference point on the ground, velocity error can be reduced when providing for motion compensation thus improving the accuracy of the SAR 12.

Having described one embodiment of the SAR 12, numerous other embodiments will be apparent to one of skill in the art. For example, the number of gates 108A . . . 108D could be increased. Separate FFT processors $116_1$ . . . $116_M$ are not required. A small number of processors might be time multiplexed to produce the same result. In another embodiment, the SAR map produced could be used for purposes other than to guide a missile. For example the SAR 14 on the airplane 8 could provide a digital image to the DSP 21 for further processing such as terrain mapping.

Figure 11:
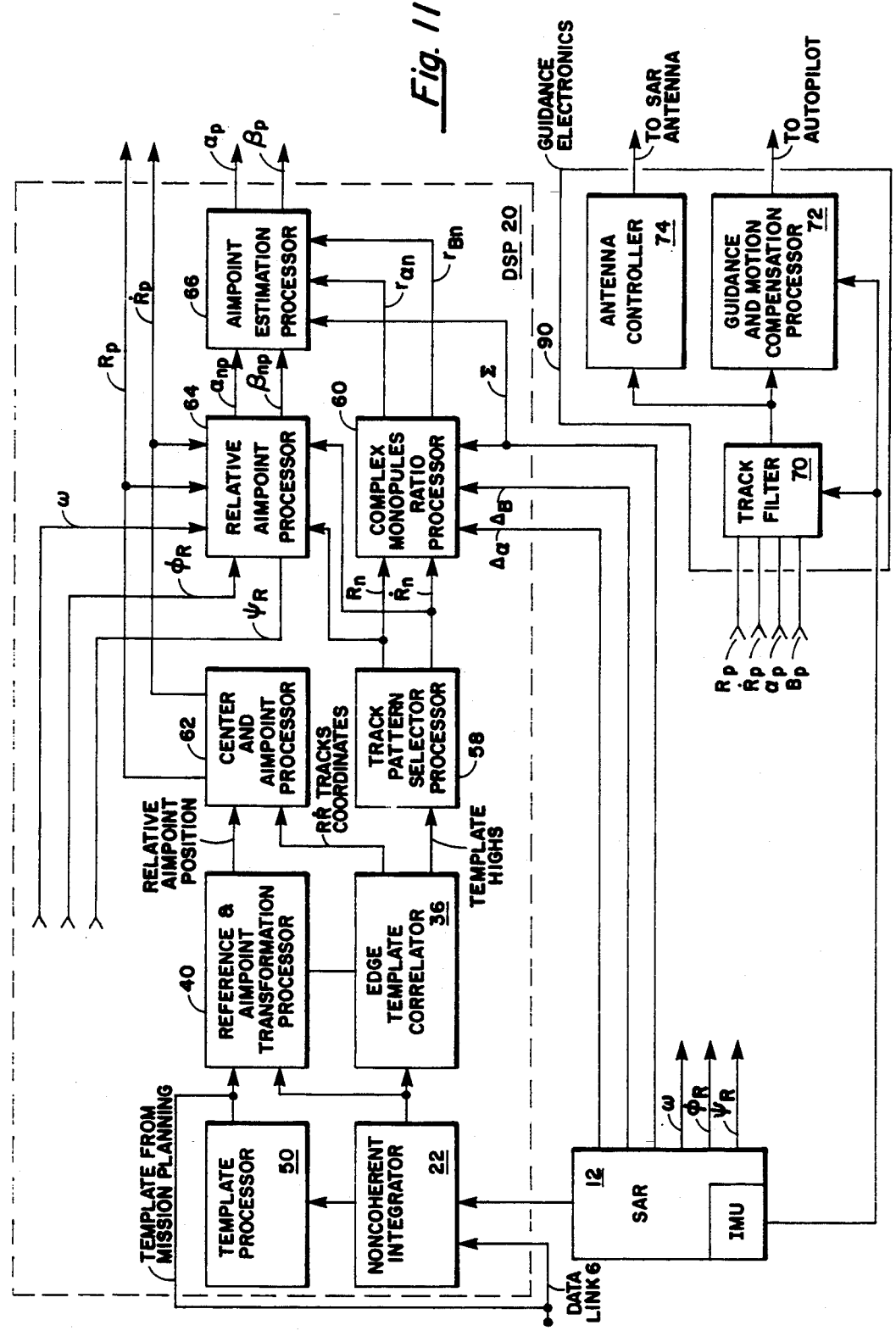
FIG. 11 is a simplified block diagram of the system according to the invention which produces target coordinates used in guiding a missile.

Referring now to FIGS. 1 and 11, the signal processing required for target selection is described. A digital image from the SAR 14 is fed to the digital signal processor 21 wherein the digital image is fed to the target designator 18 and to an input of the digital signal processor 20. A target is designated by the pilot by moving a window about the target area image and selecting an aimpoint on a target within the window. The location of the window and the coordinates of the aimpoint within the window are fed back to digital signal processor 20, via the digital signal processor 21 and the data link 6.

The digital signal processor 20 includes a plurality of processors as described further hereinafter and using parallel processing techniques processes data provided by the SAR 12 and the SAR 14 to provide guidance control signals to guidance electronics 90 to guide the missile 10 to a selected aimpoint on a target. It should be appreciated that a portion of the plurality of processors are implemented using distinct processors whereas a second different portion of the plurality of processors are implemented as subroutines within a common processor. Depending upon design requirements, such as cost and speed, the portions of the plurality of processors implemented as distinct processors and the portion of the plurality of processors implemented as subroutines within a common processor is determined as appropriate.

Figure 12:
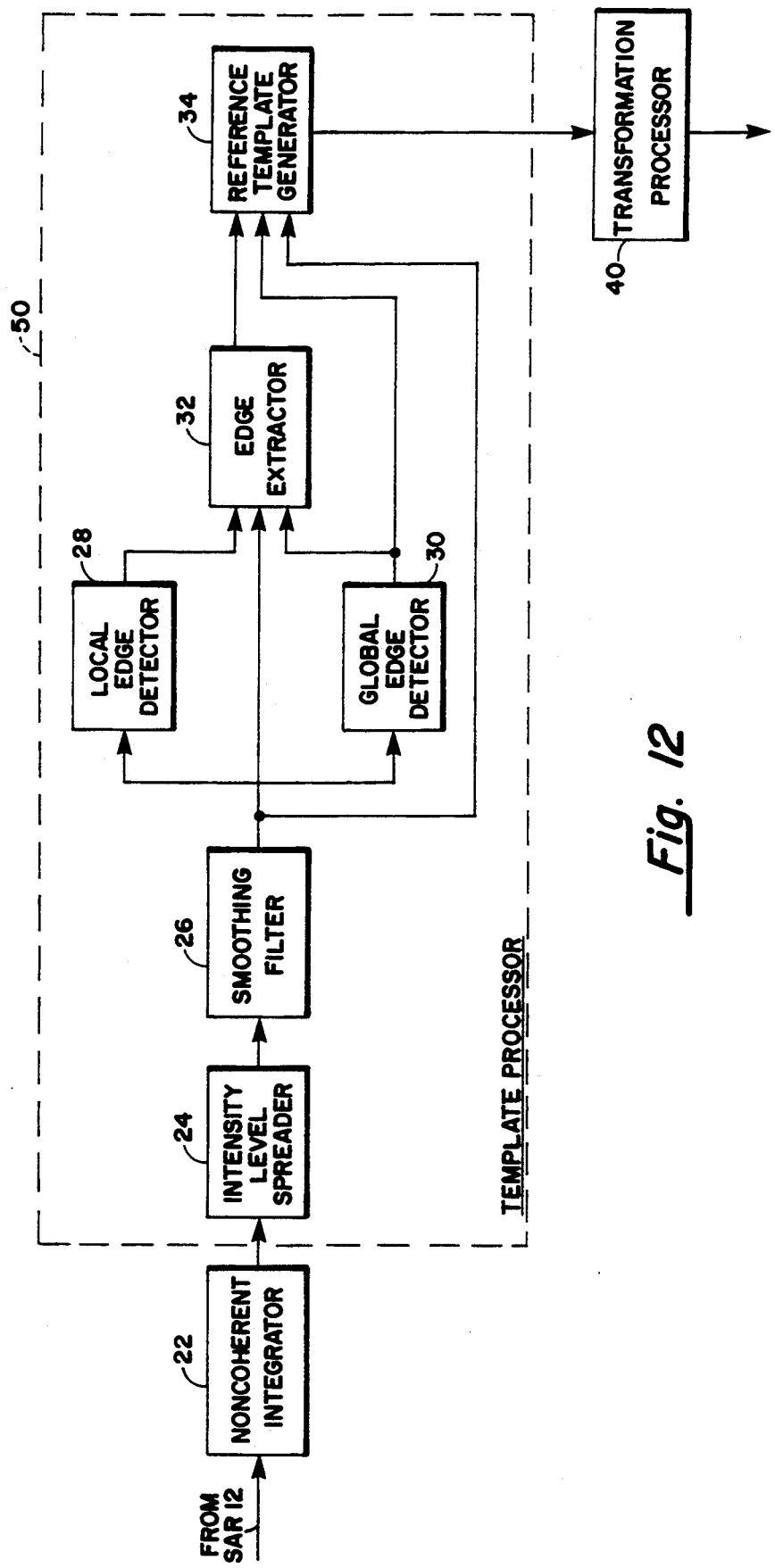
FIG. 12 is a block diagram in greater detail of a portion of a digital signal processor according to the invention.

The digital signal processor 20 may provide a reference template in a manner as described in connection with U.S. Pat. No. 5,027,422. Referring now also to FIG. 12, a non-coherent integrator 22 and a template processor 50 including an intensity level spreader 24 and a smoothing filter 26 enhance the features in the image prior to formulation of a template. One skilled in the art will recognize various other techniques of feature enhancement could be used also. Non-coherent integrator 22 forms an average of some number, say 4, of images made by the SAR 14 using different radar frequencies. The average is computed on a pixel by pixel basis (i.e. the corresponding pixels in the different images are averaged to produce the corresponding pixel in the output image). The output of the non-coherent integrator 22 when creating the reference image is fed to the template processor 50 wherein the intensity level spreader 24 changes the intensity of each pixel in the image to concentrate the distribution of the intensity levels in the image around two intensity levels. Here each pixel is represented by a sixteen bit digital word representing an intensity level. The input image has some arbitrary intensity distribution which is changed by the intensity level spreader 24. First the global median intensity of all pixels, here in a 68×68 image, is determined. Next the output image of intensity level spreader 24 is formed by operating on every possible group of nine pixels selected by sliding a 3×3 local window across the input image to correspond with the pixel at the center of the 3×3 local window image. The value of the pixel in the output image corresponding to the pixel at the center of the 3×3 local window is calculated from the nine pixels under the local window. For each position of the local window, i.e. each group of nine pixels, the local median of the pixels in the window is computed. If the local medial is less than the global median, the output pixel is set equal to the local minimum, i.e. it is assigned a value equal to the lowest intensity of all pixels in the window. Conversely, if the local median is not less than the global median, the output pixel is set equal to the local maximum. Since the local window cannot be centered over any pixel on the outer edge of the 68×68 array, the resulting image formed by sliding the local window over the entire input image produces a 66×66 output array. The output of the intensity level spreader is fed to the smoothing filter 26 which uses the 66×66 output array of the intensity level spreader 24 as its input array. First the global median of the input array is computed by finding the median of all pixel values in the input array. A 3×3 window is slid over the input image with the pixel in the output image corresponding to the pixel at the center of the window being computed at each window position. If the center cell of the local window is greater than or equal to the global median the pixel in the output image is set equal to the median of all pixels in the local window greater than or equal to the global median. Conversely, if the center cell in the local window is less than the global median, the pixel in the output image is set equal to the median of all pixels in the local window less than or equal to the global median. The resulting filtered image is described by a 64×64 array of pixels and will hereinafter also be described as the EPS image.

The EPS image is then processed by a local edge detector 28 and a global edge detector 30, each of which produces an edge map. The edge maps are represented as arrays of digital words. The value of each word is assigned by local edge detector 28 or global edge detector 30 to indicate whether or not the corresponding pixel in the EPS image depicts an edge between two objects in the image. Local edge detector 28 and global edge detector 30 use different processors to identify edges in the input image, thus, the resulting edge maps may differ.

As can be seen in FIG. 12, global edge detector 30 processes the filtered image created by smoothing filter 26. At the start of the processing, the image is represented by a 64×64 array of digital words, i.e. pixels. Global edge detector 30 converts the pixels in the image to one of two values (hereinafter called binarization), depending on whether the pixel intensity is above or below a threshold. An edge is indicated at every point in the image where a pixel of one value is adjacent to a pixel of the other value. An important aspect of global edge detector 30 is the selection of an appropriate threshold for binarization of the image. The global edge map at the output of global edge detector 30 is also called a binarized image.

It can be seen that local edge detector 28 operates on the same input image as global edge detector 30. The output of local edge detector 28 is used by edge extractor 32 just like the output of global edge detector 30. Using parallel processing techniques, the processing represented by local edge detector 28 is performed at the same time as the processing of global edge detector 30. If both processes are to be performed using one general purpose digital computer, the processes will likely be performed one after the other.

In local edge detector 28, a 7×7 local window is slid over the 64×64 pixel input array. An output edge map with 59×59 pixels is formed by assigning a value to the pixel in the edge map corresponding to the pixel in the center of the 7×7 local window. The pixel value in the edge map indicates whether that pixel corresponds to an edge in the input image and the orientation of that edge.

The local edge detector 28 eliminates from the local edge map any pixel indicating an edge but not adjacent to another pixel indicating an edge at an angle within 45° of the angle of the first pixel. Hereinafter, the output of local edge detector 28 will also be designated as an AED image. Edge extractor 32 combines both edge maps, using information from the filtered image (EPS image) into a confirmed edge map. The confirmed edge map contains edges likely to represent true edges.

Reference template generator 34 uses the confirmed edge map with the EPS image and the binarized image from the global edge detector to create a template which is to be used as the reference template. The local edge detector 28, the global edge detector 30, the edge extractor 32 and the reference template generator 34 operate in a manner as described in U.S. Pat. No. 5,027,422 with the 32×32 array of digital words as described in U.S. Pat. No. 5,027,422 being replaced with a 64×64 array of digital words in the present embodiment. Suffice it to say here, the reference template generator 34 creates a reference template with a two-dimensional array of 64×64 pixels and a correlation threshold K. The reference template generator 34 provides the reference template, the aimpoint provided earlier and the correlation threshold to a transformation processor 40.

The transformation processor 40 transforms each of the 64×64 pixels of the reference template in map reference coordinates (MRC) to range R and range rate R coordinates to correspond to range and range rate coordinates of the sensed image (the sensed image being the digital image provided by the SAR 12 as the missile 10 is in flight) with the resulting points interpolated to the nearest appropriate filters. Additionally, the range and range rate of the window center after transformation is stored.

Furthermore, the aimpoint is transformed from map reference coordinates to range and range rate coordinates and locked to the reference template, i.e., its range and range rate in sensed image space is subtracted from the range and range rate of the center of the reference template and the resulting difference components are saved. This relative position is used to define the aimpoint relative to the center of the reference template. The transformation equations are:

$$R_{in} = \sqrt{(X_{on} - X_i)^2 + (Y_{on} - Y_i)^2 + (Z_{on} - Z_i)^2}$$

$$\dot{R}_{in} = \overline{V}_{on} \left[ \frac{(X_{on} - X_i)\overline{i} + (Y_{on} - Y_i)\overline{j} + (Z_{on} - Z_i)\overline{k}}{R_{in}} \right]$$

where:

$R_{in}$, $\dot{R}_{in}$ is the range and range rate, respectively, of the transformed $i^{th}$ scatterer at the time of mapping the sensed image;

$\overline{V}_{ON}$ is the velocity of the antenna at the time of mapping the sensed image;

$X_{ON}$, $Y_{ON}$ and $Z_{ON}$ are the XYZ coordinates of the map reference point (center cell); and $X_i$, $Y_i$ and $Z_i$ are the XYZ coordinates of the $i^{th}$ scatterer.

The transformed reference template, the correlation threshold and the aimpoint are fed to an edge template correlator 36.

The details of the processing performed by the edge template (histomatch) correlator 36 to match the transformed reference template to a current target area image (sensed image) provided by the SAR 12 is described in U.S. Pat. No. 5,027,422. Suffice it to say here that the SAR 12 makes a target area image (sensed image) of objects within the field of view on the underlying ground as the missile 10 is flying toward a target, here the trestle T. The portion of the target area image matching the referenced template tells the direction of the target in relation to direction of travel of the missile 10. For example, if the designated target location in the matching portion were directly to the right of the center of the matching portion of the target area image, digital signal processor 20 would identify that the target was to the right of the line of travel of missile 10 and send a signal to the missile guidance electronics 90 to guide missile 10 towards the right. The digital signal processor 20 can provide additional information to the missile guidance electronics 90 on how much the line of travel should be adjusted as described hereinafter. The sensed image, here a 150 range×150 range rate array, is filtered to remove noise by non-coherent integrator 22 and the sensed image after being filtered is fed to the edge template correlator 36.

The reference template is compared to the sensed image with the center cell of the reference template overlaid cell by cell on the sensed image at each cell position of the sensed image. As the reference template is overlaid at each position, each pixel in the reference template is selected and considered. If the selected pixel is 0, the next pixel in the reference template is considered. If the selected pixel is non-zero, it is determined if the pixel is greater or less than 0.

If the pixel of the reference template is greater than 0, the value of the corresponding pixel in the sensed image is added to a variable, SUMP. A counter, NPOS, is also incremented by one. Conversely, if the pixel of the reference template is less than 0, the value of the corresponding pixel in the sensed image is added to a variable, SUMN, and increments a counter, NNEG, by one. Each pixel is processed sequentially until all pixels have been processed. Once all the pixels of the reference template have been processed, a positive threshold, THRP, is computed according to the formula:

THRP=(1/K) (SUMP/NPOS)

where K is the correlation threshold and SUMP and NPOS are the variables set as described hereinabove. Additionally, a negative threshold, THRN, is computed according to the formula:

THRN=K (SUMN/NNEG)

where SUMN and NNEG are the variables set as described hereinabove. A binarized array having the same dimensions as the reference template is created. All pixels in the binarized array, corresponding to pixels equal to zero in the referenced template are equal to zero. For each pixel in the reference template with a value greater than zero, the corresponding pixel in the local window selected is compared to the threshold THRM. For each pixel in the template with a value less than zero, the corresponding pixel in the local window is compared to the threshold THRP. For either value of threshold, if the pixel in the local window is above the threshold, the corresponding pixel in the binarized array equals +1. Otherwise, the pixel in the binarized array equals −1.

Thus, the average of the lows and the average of the highs for each edge zone feature is found for each position of the reference template. The correlation threshold K times the average of the lows is used to binarize the sensed image highs of each zone and $K^{-1}$ times the average of the highs is used to binarize the sensed image lows of each zone to generate a binarized zoned sensed image.

Each cell of the binarized sensed image and the reference image are compared using an algorithm hereinafter referred to as the Histomatch algorithm to compute a correlation map CM according to the equation:

$$CM = \frac{H_{00}^{kR_1} H_{11}^{kR_2}}{\left(A H_{01} + H_{00}\right)^{kR_2} \left(A H_{10} + H_{11}\right)^{kR_1}}$$

where, here, $R_1$ = number of pixels in template with values less than 0;

$R_2$ = number of pixels in template with values greater than 0;

$H_{00}$ = number of pixels in template with values less than 0 and with corresponding pixel in the binarized array less than 0;

$H_{01}$ = number of pixels in the template with values less than 0 and with the value of the corresponding pixel in the binarized array greater than 0;

$H_{10}$ = number of pixels in the template with values of greater than 0 and with the value of the corresponding pixel in the binarized array less than 0; and $H_{11}$ = number of pixels in the template with values greater than 0 and with the value of the corresponding pixel in the binarized array greater than 0.

A and k are constants empirically chosen to vary the enhancement of the correlation map, wherein $N = kR_1 = kR_2$ and, here, N is equal to 4 and A is equal to 7. Although other values of N are acceptable, for example 3.7, such a number greatly reduced the speed of the processor. To raise a base number to such an exponent is time consuming for a digital processor wherein letting N equal 4, the digital processor may square the base number twice to obtain a result. The latter is less time consuming.

The largest value of CM implies that the portion of the target area image used to compute the corresponding value of CM best matches the reference template. Thus, the center cell of the window of the sensed image having the largest value of CM most likely corresponds to the center cell of the reference template. The cells of the sensed image covered by the reference template with the largest value of CM is referred to hereinafter as a registered template. Thus, the registered template is the portion of the target area image that best matches the reference template.

Having located a selected cell within the sensed image that corresponds to the center cell of the reference template, the range R and range rate $\dot{R}$ of the selected cell and range R and range rate $\dot{R}$ of the cells that are covered by a 5×5 array mask centered over the selected cell are fed to the center and aimpoint processor 62. Furthermore, the relative position of the aimpoint as calculated by the reference and aimpoint transformation processor 40 is fed to the center and aimpoint processor 62. A mean of the range R and range rate $\dot{R}$ is calculated respectively from each cell of the 5×5 array about the selected cell of the sensed image. Having calculated a mean range and a mean range rate, the aimpoint offset is added to the mean range and mean range rate to estimate the range $R_p$ and range rate $\dot{R}_p$ of the aimpoint. The range $R_p$ and the range rate $\dot{R}_p$ of the aimpoint is fed to a relative aimpoint processor 64 and to a track filter 70 within the missile guidance electronics 90.

With the peak of the correlation function located and the aimpoint known relative to this peak in R, $\dot{R}$ coordinates, the next step is to select scatterers from which to extract monopulse data. The registered template is fed to a track pattern selector processor 58 wherein the highs of the registered reference template are compared with $K_T$ (where $K_T$ is a track data threshold and best found empirically) times the average of the lows of the registered template to obtain acceptable range and range rate cells for a track pattern. The scatterers that exceed the threshold form the initial set of candidates for monopulse calculations.

Next, the candidate scatterers are subjected to a scintillation and glint screening test. A given cell may be examined, over n adjacent "looks" or frequencies, for m out of n appearances. This can be done with or without reregistration. First the real part of the candidate's complex monopulse ratio is thresholded to eliminate extreme values. Then the glint test involves subjecting the imaginary parts of the complex monopulse ratio of each scatterer to a threshold to determine when a pointing angle, as calculated from the real part of the complex monopulse ratio, has too large an error bias over the looks or frequencies under consideration. Scatterers that pass this set of tests form the group of selected cells for subsequent monopulse processing. The value of range $R_n$ and range rate $\dot{R}_n$ of the selected set of scatterers are fed to a relative aimpoint processor 64 and a complex monopulse ratio processor 60.

Having been fed the range $R_n$ and range rate $\dot{R}_n$ coordinates of a selected set of scatterers and the total values of range $R_p$ and range rate $\dot{R}_p$ of the aimpoint, the relative aimpoint processor 64 calculates an azimuth angle $A_{np}$ and an elevation angle $E_{np}$ of the aimpoint relative to each of the $n^{th}$ selected scatterer, respectively, creating an array hereinafter referred to as an edited correlated array. The azimuth angle $A_{np}$ and the elevation angle $E_{np}$ is calculated, wherein:

$$A_{np} = (\dot{R}_n - \dot{R}_p)\frac{1}{\omega R_n}$$

$$E_{np} = (R_n - R_p)\frac{TAN\psi}{R_n}$$

and then the azimuth angle $A_{np}$ and the elevation angle $E_{np}$ are transformed to antenna coordinates via the antenna roll transformation, $\Phi_R$ i.e., $$\begin{pmatrix} \alpha_{np} \\ \beta_{np} \end{pmatrix} = \phi_R \begin{pmatrix} A_{np} \\ E_{np} \end{pmatrix}$$

where, $\alpha_{np}$ = azimuth estimate of the target aimpoint relative to the $n^{th}$ cell in the edited correlated array;

$\beta_{np}$ = elevation estimate of the target aimpoint relative to the n$^{th}$ cell in the edited correlated array;

$\omega$ = antenna elevation angle; and $\omega = \dot{\gamma} \cos \Psi$;

$\dot{\gamma}$ = vertical component of angular velocity of the line-of-sight of the map reference point in reference coordinates.

It should be appreciated that the above angles to the aimpoint are relative to selected scatterers, such that absolute errors are canceled. The azimuth estimate angle $\alpha_{np}$ and the elevation estimate angle $\beta_{np}$ of the target aimpoint relative to the n$^{th}$ cell of the edited correlated array is fed to an aimpoint estimation processor 66.

Having calculated the angles of the selected scatterers relative to the aimpoint, the real part of the complex monopulse ratio for each selected cell is calculated by the complex monopulse ratio processor 60. Having been fed a complex voltage array of cells, each cell of the array representing the complex sum voltage of the i$^{th}$ look/frequency of the n$^{th}$ selected scatterer, a complex azimuth difference array of cells, each cell representing the complex azimuth difference voltage of the i$^{th}$ look/frequency of the n$^{th}$ selected scatterer, and a complex elevation difference array of cells, each cell representing the complex elevation difference voltage of the i$^{th}$ look/frequency of the n$^{th}$ selected scatterer from the SAR 12 and the value of range $R_n$ and range rate $\dot{R}_n$ of the selected set of scatterers from the track pattern selector processor 58 an azimuth complex monopulse ratio $r_{\alpha n}$ and an elevation complex monopulse ratio $r_{\beta n}$ are calculated wherein:

$$r_{\alpha n} = \frac{R_e \sum_{i=1}^{p\,LOOKS/FREQ} \Delta\alpha_{in} S^*_{in}}{\sum_{i=1}^{p\,LOOKS/FREQ} S_{in} S^*_{in}}$$

$$r_{\beta n} = \frac{R_e \sum_{i=1}^{p\,LOOKS/FREQ} \Delta\beta_{in} S^*_{in}}{\sum_{i=1}^{p\,LOOKS/FREQ} S_{in} S^*_{in}}$$

where, $S_{in}$ = the complex sum voltage of the i$^{th}$ look/freq of the n$_{th}$ selected scatterer;

$\Delta\alpha_{in}$ = the complex azimuth difference voltage of the i$^{th}$ look/freq of the n$^{th}$ selected scatterer;

$\Delta\beta_{in}$ = the complex elevation difference voltage of the i$^{th}$ look/freq of the n$^{th}$ selected scatterer;

$r_{\alpha n}$ = real part of the azimuth complex monopulse ratio of the n$^{th}$ cell; and $r_{\beta n}$ = real part of the elevation complex monopulse ratio of the n$^{th}$ cell.

The azimuth complex monopulse ratio $r_{\alpha n}$ and the elevation complex monopulse ratio $r_{\beta n}$ are fed to the aimpoint estimation processor 66.

The aimpoint estimation processor 66 provides an azimuth angle $\alpha_p$ of the target aimpoint relative to the boresight and an elevation angle $\beta_p$ of the target aimpoint relative to the boresight wherein:

$$\alpha_p = \frac{1}{K_\alpha} \tan^{-1} \frac{\sum_n^N S_n \frac{r_{\alpha n} - \tan K_\alpha \alpha_{np}}{1 + r_{\alpha n} \tan K_\alpha \alpha_{np}}}{\sum_n^N S_n}$$

-continued $$\beta_p = \frac{1}{K_\beta} \tan^{-1} \frac{\sum_n^N S_n \frac{r_{\beta n} - \tan K_\beta \beta_{np}}{1 - r_{\beta n} \tan K_\beta \beta_{np}}}{\sum_n^N S_n}$$

where,

N = number of edited selected cells;

$\alpha_p$ = azimuth angle of the target aimpoint relative to the boresight;

$\beta_p$ = elevation angle of the target aimpoint relative to the boresight;

$K_\alpha$ = azimuth monopulse slope;

$K_\beta$ = elevation monopulse slope; and $S_n = \Sigma_i Sin^p\,LOOKS/FREQ$

It should be appreciated, with the $\alpha_p$ and $\beta_p$ equations described above, the absolute measurements relating target aimpoint to seeker IMU reference coordinates are the $r_{\alpha n}$, $r_{\beta n}$ monopulse measurements, respectively. The absolute inaccuracies associated with relating SAR range and range rate measurements to velocity vector information have been replaced by the relative $\alpha_{np}$ and $\beta_{np}$ measurements where absolute errors cancel each other.

The azimuth angle $\alpha_p$ and elevation angle $\beta_p$ of the target aimpoint relative to the boresight are fed to a track filter 70 and with the range $R_p$ and range rate $\dot{R}_p$ of the aimpoint, the requisite tracking signals are provided by the track filter 70. The tracking signals from the track filter 70 are fed to an antenna controller 74 wherein control signals are developed to control the SAR antenna. The tracking signals are also fed to a guidance and motion compensation processor 72 wherein guidance control signals are developed and fed to an autopilot (not shown) to control the course of the missile 10 in a known manner.

It should be noted, the vertical pointing angle expression ($\beta_p$) assumes that the aimpoint is at the same height as the average plane of scatterers. If the aimpoint is known, and deviates from an average plane by an amount $Z_{pav}$, the elevation angle and range of the aimpoint can be adjusted using the following equations:

$$\beta_p \beta_p + Z_{pav} \cos\Psi$$

$$R_p = R_p - Z_{pav} \sin\Psi$$

Most targets such as oil refineries, power generation plants, and industrial buildings have raised features which persist over a reasonably large area relative to the desired aimpoint. This minimizes the height differential effect. An exception is a smooth POL storage tank, where a dominant SAR image is formed by an effective corner reflector between the tank and the ground plane. Since it is desired to hit the POL tank, the aimpoint is raised using the above equations. The raising or lowering of the aimpoint using the above described equations does not handle all aspects of the vertical aimpoint adjustment. Each pixel indicates an altitude. The indication is a random variable whose distribution is centered at the vertical center-of-gravity of the cross-section, and has a standard deviation approximately equal to the radius of gyration of the vertical cross-section distribution. This distribution may also include the images of scatterers reflected in a smooth surface, such as water or pavement. It is also affected by the vertical antenna pattern.

If the scatterer distribution extends beyond the vertical extent of the beam, the mean altitude of all pixels will be determined by the local distribution within the beam. This may cause the estimate to wander up or down a tall building. In cases where this is a problem, it is desirable to seek the top of the building by using the 90 percentile (upper decile) of the pixel heights as the height estimate. For each track map, the heights of pixels selected by the editing process are ordered and the 90 percentile height is determined. In cases where there is a flat roof area, it was found that the 90th percentile tended to be about 10 feet above the actual roof height. This 10 foot bias is subtracted from the 90th percentile to give the roof height estimate. If a surface was smooth such as in cases of a truss bridge over smooth water, and a transformer yard over smooth pavement the maximum likelihood estimate tended to be at surface level. Thus, the lower decile is avoided, because it tended to be near the bottom of the image in the surface, and consequently below ground level.

A slab bridge would not necessarily give a complete image in the water, because some scatterers were on top of the slab, and their reflections in the water are masked. In these cases, the maximum likelihood estimate was above the water surface. Compensation for this scenario uses the upper decile height scatterers over a flat region of the bridge.

It should now be apparent, using the above described techniques, an aimpoint within a window of a target area image can be designated relative to the center of the window such that the missile 10 is guided toward the aimpoint.

Figure 13:
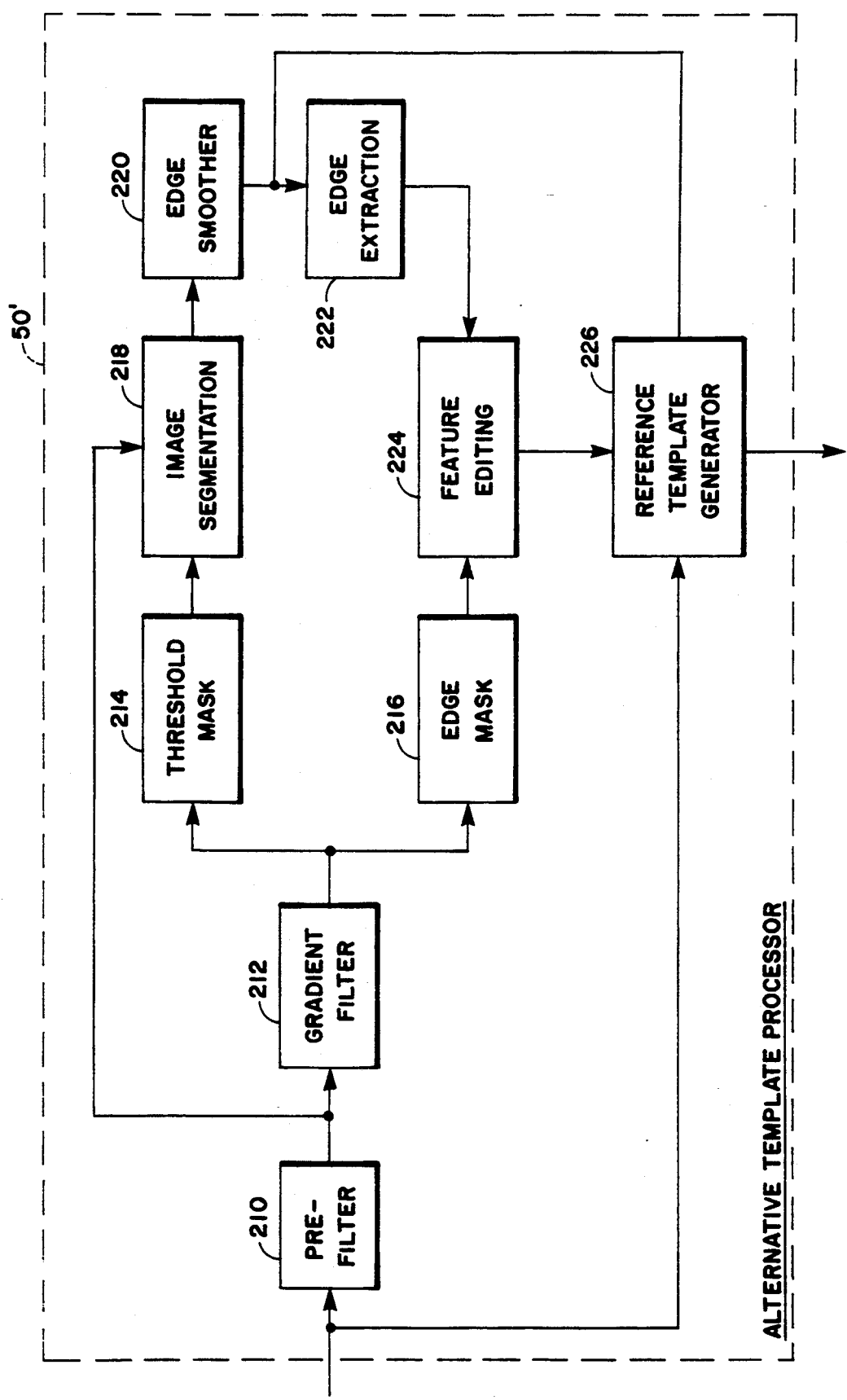
FIG. 13 is an alternative embodiment of the template processor of FIG. 12.

Referring now to FIG. 13, an alternative template processor 50' is shown which could be used in place of the template processor 50 (FIG. 12). The SAR image as described hereinbefore which was fed to the template processor 50 is now fed to the alternative template processor 50' wherein the SAR image is fed as in input image to a prefilter 210 and a reference template generator 226. Within the prefilter 210, the input image is processed by a N×N median filter (here N equals 3) to produce an output array. The output array of the prefilter 210 is provided by operating on every possible group of nine pixels selected by sliding a 3×3 local window across the input image to calculate a median value for the corresponding pixel at the center of the 3×3 local window image. The value of the pixel in the output array corresponding to the pixel at the center of the 3×3 local window is calculated from the nine pixels under the local window. For each position of the local window, i.e. each group of nine pixels, the median of the values of the pixels in the window is computed. The median value is then assigned to the corresponding pixel in the output array. Since the local window cannot be centered over any pixel on the outer edge of the 64×64 array of the input image, the resulting image formed by sliding the local window over the entire input image produces a 62×62 output array. The output array of the prefilter 210 is fed to a gradient filter 212 and an image segmentation processor 218.

Within the gradient filter 212, edge information is extracted from the output array from the prefilter 210. Using eight different M×M masks in a convolution process, the gradient filter 212 generates a single grey level gradient image. The gradient filter 212 provides an output array that includes the maximum strength value from eight different angles. Each of the eight masks contain 3 values: −1, 0 and +1. The averages of the pixels values underneath the −1 and +1 locations are calculated for each of the masks. The pixels underneath the 0 locations are not processed. A ratio is calculated between the average value under the +1 locations and of the average value under the −1 locations for each mask with the higher value average being the numerator. The center cell under the sliding mask is assigned the ratio of the mask having the maximum value.

Figure 14:
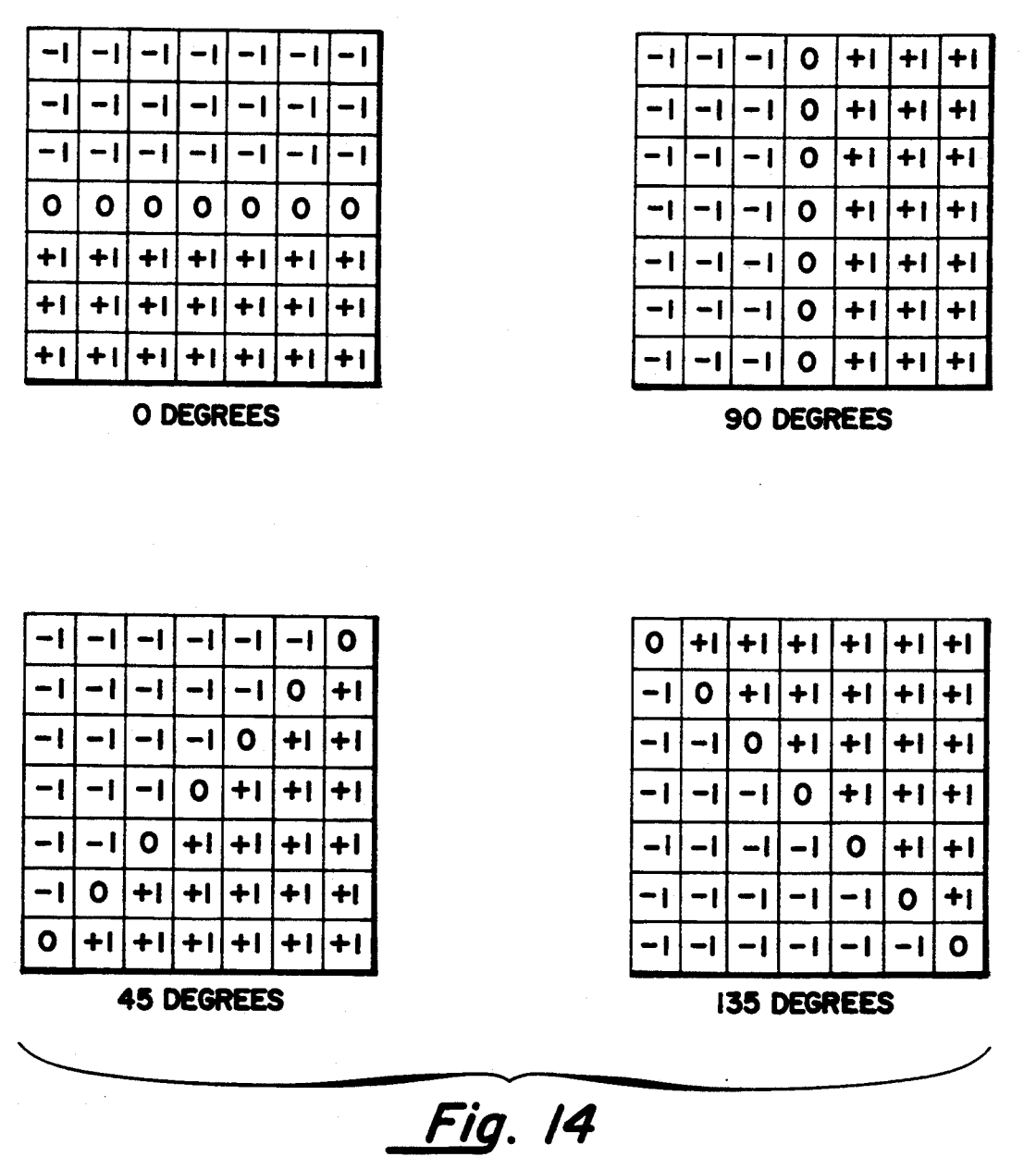

Referring momentarily to FIG. 14, an example of a 7 by 7 mask is shown with each one of the four masks shown corresponding to one of four angles. The other four angles required correspond to the four masks shown with the +1 and the −1 locations reversed. Alternatively, for a 5×5 mask, the center 5×5 region within the 7×7 mask would be used. Furthermore, if a 9×9 mask were to be used simply expand the +1, 0 and −1 values, one pixel in each direction as shown in the 7×7 mask. In the gradient filter 212, the 7×7 local window is slid over the 64×64 pixel input array. The output array with 59×59 pixels is formed by assigning the value of the highest ratio to the pixel in the output array corresponding to the pixel in the center of the 7×7 local window. The output array of the gradient filter 212 is fed to a threshold mask processor 214 and an edge mask processor 216.

The edge mask processor 216 processes the output array of the gradient filter 212 to provide a binary edge mask array that will be used later to edit features in the reference template. Each pixel of the output array of the gradient filter 212 is compared to a contrast ratio threshold value to provide the binary edge mask array. If the value of the pixel of the array exceeds the threshold value, the pixel value is set to 1. If the value of the pixel of the array does not exceed the threshold value, the pixel value is set to 0, thus providing the binary edge mask array. The threshold value is an empirical number which is selected a priori and is based on the sensor type, operational conditions and attack geometry of the missile.

In the threshold mask processor 214, each pixel of the output array of the gradient filter 212 is compared to a set of contrast threshold values to generate a binary threshold mask. The set of contrast threshold values include a lower threshold value and an upper threshold value. If the value of the pixel exceeds the lower threshold value but is less than the upper threshold value, the binary threshold mask pixel is set to 1. Otherwise, the binary threshold mask pixel is set to 0. The number of pixel crossings (meaning pixels with the value of 1) in the binary threshold mask is compared to a set of requirements. This set of requirements includes a lower percentage value, an upper percentage value and a minimum percentage value of the reference window size. If the number of pixel crossings exceed the upper percentage value, the binary threshold mask is reassigned with the pixels within the top upper percent of the gradient array set equal to 1 with all other pixel values set equal to 0. If the number of pixel crossings is less than the lower percentage value, the threshold mask is reassigned with the pixels within the top lower percent of the gradient array set equal to 1 with all other pixel values set equal to 0. If the number of pixel crossings falls below the minimum percentage value, then the selected reference image is no good and the selected reference image should be abandoned. The lower percentage value, the higher percentage value and the minimum percentage value are constants and are selected a priori. The output array from the threshold mask processor 214 is fed to an image segmentation processor 218.

Within the image segmentation processor 218, the output array from the prefilter 210 (hereinafter referred to as a prefilter array) and the output array from the threshold mask processor 214 (hereinafter referred to as a threshold mask array) are compared to calculate a threshold value to segment the prefilter array. The values of the pixels of the prefilter array underneath the pixels of the threshold mask array with a value of 1 are used to calculate an average value of the prefilter array. This average value is used as a threshold value to segment the prefilter array. The value of each pixel of the prefilter array is then compared to this average value and if the value exceeds the threshold value, the pixel of the output array is set to 1, otherwise the pixel of the output array is set to 0. An output array (hereinafter referred to as a binary segmented array) is provided at the output of the image segmentation processor 218 and fed to an edge smoother processor 220.

The edge smoother processor 220 smooths the edges of the binary segmented array by performing two operations on the array, dilation and erosion. Each operation is accomplished by sliding a 3×3 local window over the binary segmented array. At each pixel location, the sum of the values of the pixels under the local window is calculated. The sum is then compared to a minimum value and a maximum value. If the sum is greater than the minimum value and less than the maximum value, the pixel is set to 1, otherwise the pixel is set to 0. The dilation operation is performed first and the erosion operation is performed second. For the dilation operation, the minimum and maximum values are 8 and 10, respectively, and for the erosion operation the minimum and maximum values are 1 and 10, respectively. After these two operations have been performed, a binary smoothed segmented array is provided at the output of the edge smoother processor 220 which is fed to an edge extraction processor 222 and the reference template generator 226.

The edge extraction processor 222 performs edge extraction on the binary smoothed segmented array. Edge extraction is performed similar as edge smoothing. At each pixel location of the binary smoothed segmented array, the sum of the local 3 by 3 window value is compare to a minimum value and a maximum value, here 1 and 5, respectively. If the sum is greater than the minimum value and less than the maximum value, the value of the center pixel is set to 1, otherwise it is set to 0. The output of the edge extraction processor 222 is a binary edge map including zeros and ones which is fed to the feature editing processor 224.

In the feature editing processor 224, edge tracing is performed on the binary edge map. Edge tracing is a recursive search technique to find all contiguous pixels within an edge list. The technique starts by searching for a high pixel (pixel value of 1) in the binary edge map. Once a high pixel is found, the recursive search begins. The starting pixel is called a parent cell. A local 3×3 area around the parent cell is searched to determine if any other high pixels are present adjacent to the parent cell. If a high pixel is found, the high pixel assumes the role of the parent cell is subjected to the same type of recursive search. These high pixels are deleted from further consideration since they have already been "visited." However, the locations of these high pixels are stored in a stack-like manner. If there are no adjacent high pixels found adjacent the current parent cell, the technique continues searching around the previous parent cell. This process is continued until no more adjacent high pixels are found. All contiguous high pixels are then associated with a parent cell which corresponds to a single edge list. The search then continues until another different parent cell is found. The recursive search technique starts again searching around the different parent cell until all pixels have been searched and all high pixels in the binary edge map are accounted for with the coordinates of all the high pixels for each edge list saved.

After the high pixels of the binary edge map are grouped into their proper edge lists, feature editing is performed on these pixels to determine whether they are to be saved or deleted. During the feature editing process, a minimum contrast criterion and minimum edge length criterion is established. Minimum edge length is established empirically, for example, a value of 5. The minimum contrast criterion is established as described hereinbelow in connection with the binary edge mask. Each pixel of the binary edge map having a high pixel value is compared with a corresponding pixel in the binary edge mask array fed from the edge mask processor 216. These locations are found in the edge lists where the high pixel coordinates of the binary edge map are stored. If there is a corresponding high pixel value (pixel value of 1) in the binary edge mask array, then the pixel in the binary edge map is saved with a value of 1. Otherwise, the pixel is changed to a value of 0. This process is performed on each of the edge lists. The sum of the remaining pixels for each of the edge lists is then calculated. If the sum for each of the edge lists exceeds the minimum edge length criterion, the edge list is saved. Otherwise, the entire edge list is deleted. At the end of the feature editing process, a new set of edited edge lists are retained along with their respective edge coordinate locations and fed to the reference template generator 226.

In the reference template generator 226, the pixels from each of the edited edge lists are compared with corresponding pixels of the binary smoothed segmented array to provide positive edge points and negative edge points for the reference template. A local N×N window (here N is equal to 5) is centered around each pixel of the binary smoothed segmented array which corresponds with a pixel from the edge list from the feature editing processor 224. At each pixel location within this local window, the pixel value of the corresponding pixel in the binary smoothed segmented array is determined. A reference template is created such that, if the pixel value of a pixel of the binary smoothed segmented array under the window is 1, then the pixel in the reference template is labeled a positive edge point. Otherwise, the pixel in the reference template is labeled a negative edge point.

After each edge list is processed, a 3×3 local window is placed around each high pixel of the reference template corresponding with the pixels listed on the edited edge list. If a positive edge point or a negative edge point does not exist in a pixel within the local window, then the pixel is labeled a positive edge point. All the high pixels of each of the original edge lists are processed in this manner to form the final reference template.

For each edge list within the reference template, a contrast coefficient (K' value) is calculated and saved with the reference template. The contrast coefficient K' is a function of the contrast ratio CR. The contrast ratio CR is determined by first calculating the average of the values of the pixels of the original SAR image fed to the alternative template processor 50' under corresponding high (positive) pixels of the reference template and the average of the values of the pixels under corresponding low (negative) pixels of the reference template. The contrast ratio CR is then defined to be the ratio of the square of the positive average values and the square of the negative average values. The contrast coefficient (K' value) is calculated by the equation:

$$K' = \frac{CR * LN(CR)}{CR - 1}$$

where CR is the contrast ratio. A corresponding contrast coefficient (K' value) is calculated for each edge list. The reference template and corresponding contrast coefficient (K' value) is fed to the reference and aim point transformation processor 40.

Referring again to FIG. 11, a reference template from mission planning (not shown) can be provided to DSP 20 via data link 6 wherein the reference template is fed directly to the reference and aimpoint transformation processor 40. Such a reference template is generated from available reconnaissance data. The reference template is generated during preflight from basic target graphics data including vertical optical photographs, typically taken within 10 degrees of a vertical view, of targets and surrounding areas. Information about a target scene is included in accompanying description sheets such as location and size of buildings, latitude and longitude of measured points and orientation of the photograph. From the latter, a reference template is generated by a mission planner.

Figure 15D:
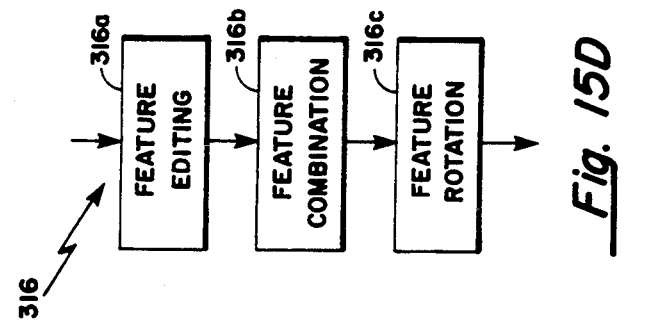
FIGS. 15A–15D are block diagrams showing a method of processing required to provide a reference template in accordance with the invention.
Figure 15C:
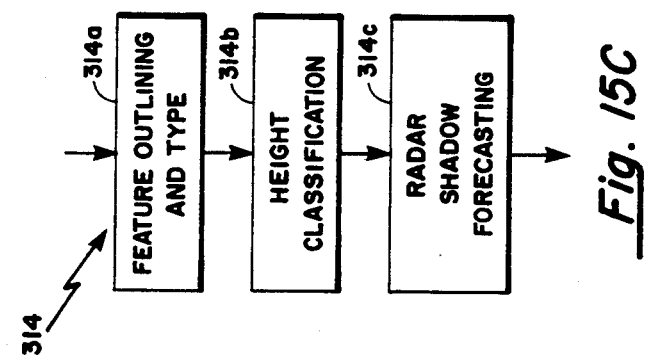
Figure 15A:
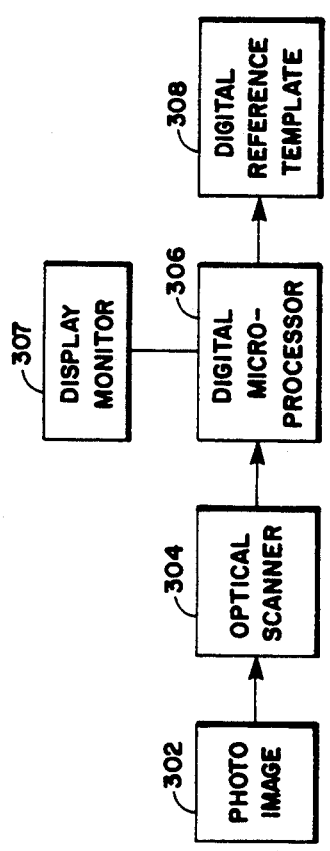
Figure 15B:
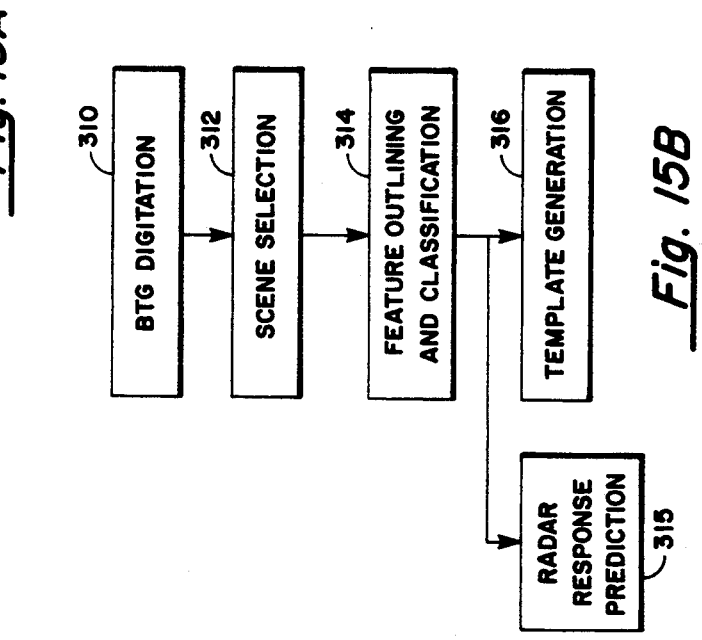

Referring now to FIG. 15a and 15b, a method of processing required to provide the reference template is described. A photo image 302 (sometimes also referred to as a photograph) of a designated target area is digitized by an optical scanner 304. A digital output signal from the optical scanner 304 is fed as a digital input signal to a digital microprocessor 306 wherein the digital input signal is processed as described further hereinafter to provide a digital reference template 308 which is provided as the reference template from mission planning to the DSP 20 (FIG. 11). The method of processing includes four main processes to provide the digital reference template 308. The four main processes include basic target graphics (BTG) digitation process 310, scene selection process 312, feature outlining and classification process 314 and template generation process 316. A radar response prediction process 315 is also performed as described further hereinafter. Suffice it to say here that a radar response prediction model simulates the radar reflectivity of the target scene including the effects of radar shadowing.

In the BTG digitation process 310, a photograph 302 of a designated target area is digitized to provide a digitized image by a scanning process using the optical scanner 304. In the scanning process, the photograph 302 is adjusted such that one pixel of the digitized image corresponds to the resolution of the SAR 12 (FIG. 11), here 10 feet. Alternatively, a higher or lower resolution can be used as long as the CRT display capability is not exceeded. Resolution adjustment is accomplished with known dimensional data of cultural features within the photograph 302 provided with the photograph 302. Each photograph 302 is typically oriented with North at the top as a common reference convention.

Once the BTG digitation process 310 is completed, the scene selection process 312 is accomplished. The digitized image is displayed on a display monitor 307 and an operator selects a region of the digitized image from which to create the digital reference template 308. The size of the region is here 640 feet × 640 feet. A window corresponding to the size of the region for the displayed digitized image is placed over the region where template features will be generated.

The operator selects a target aimpoint by placing a cursor at a proper pixel location. The accuracy of the target aimpoint placement is related to the resolution of the digitized image as seen on the display monitor 307. This is a coarse aimpoint placement mode. Once the coarse aimpoint is selected, a small section about this region is enlarged to adjust for a final aimpoint. This is a fine aimpoint adjustment mode and is typically five times more accurate than the coarse mode. For example, if the original optical resolution is 10 feet, the accuracy in placing the target aimpoint is typically within 5 feet. The fine aimpoint adjustment mode provides an accuracy typically within 1 foot.

The operator next establishes the azimuth direction to the target from which the attack will occur. The selected direction may be based upon a priori preferred missile approach direction determined by enemy defenses, or it may be chosen to avoid the screening of features of interest. The latter decision is based on nearness of trees or other buildings to dominant features in the reference template. Other considerations in selecting the approach direction are the sensitivity to angle of the leading edge effect from vertical structures and the desire to include features in orthogonal directions. Another consideration is weapon effectiveness, for example, the approach direction to a bunker target are azimuth angles that are near perpendicular to the door.

A default template region is centered around the target aimpoint. This is generally not an optimum template window location. The template region should always include sufficient features in orthogonal directions to provide an adequate correlation response. This is generally not the situation when the template window is centered on the aimpoint. The operator must then adjust the selected region to ensure adequate template features. When generating track templates, the center of the template region should be selected as close as possible to the target aimpoint to avoid large offset errors.

Figure 16A:
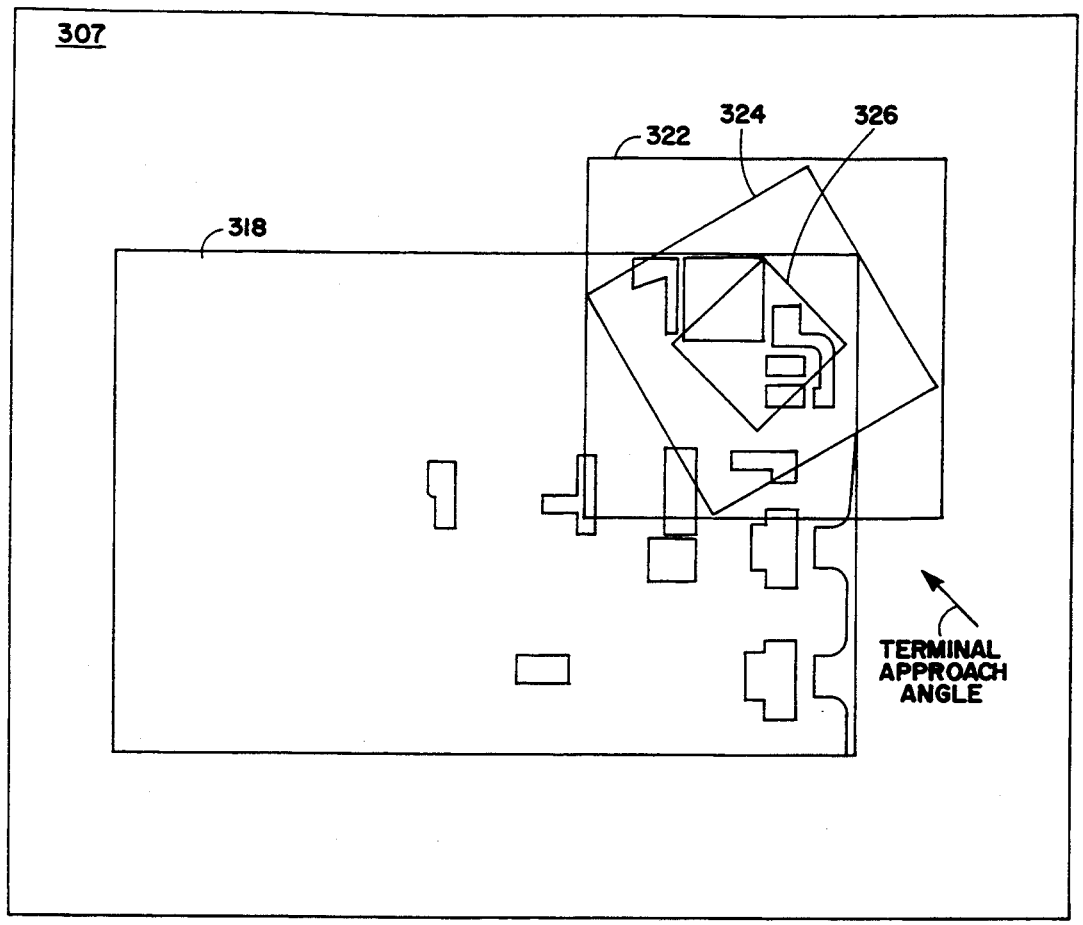
FIGS. 16A and 16B show portions of a computer generated window used by an operator to generate a reference template.

When in the search template generation mode, the size of the template area is 640 ft × 640 ft. The size of the track template area begins at 640 ft × 640 ft and reduces to 320 ft × 320 ft as the missile approaches a target. Referring now also to FIG. 16A, since the digitized photograph 318 is oriented North and other orientations may be required, the computer generated window is actually larger than the 640 ft template window such that it can encompass all the template windows as the template windows are rotated within the larger window as illustrated in FIG. 16a. The large displayed window 322 is the region where the computer operates. The medium window 324 represents the search and start of track template region. The small window 326 represents the 320 ft × 320 ft template region at the end of track mode at the terminal approach angle indicated. It should be appreciated that the template region should contain orthogonal features through the end of track mode.

After the template region has been selected in the scene selection process 312, the feature outlining and classification process 314 is accomplished wherein the operator outlines and classifies the features. As shown in FIG. 15C, the feature outlining and classification process 314 includes a feature outlining and type classification process 314a, a height classification process 314b and a radar shadow forecasting process 314c.

Figure 16B:
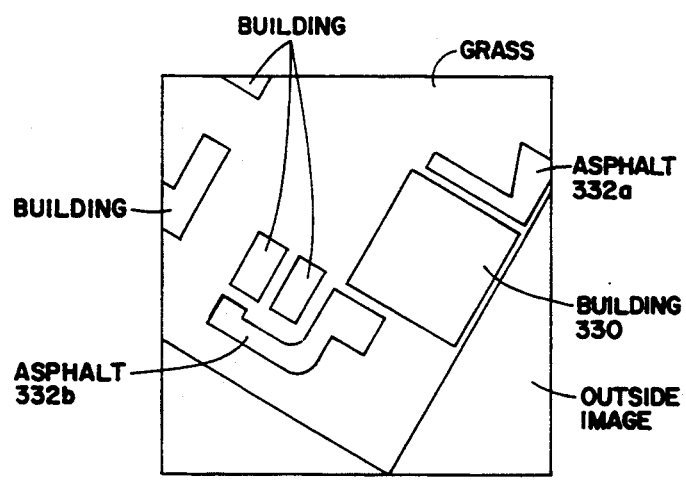

Referring now to FIG. 16b, the operator outlines and classifies the features and if these features have significant height differences associated with them, the operator assigns a height to each of them in order to predict radar shadowing and range layover. The operator outlines the target and other discernible features in the scene. The purpose of feature outlining is to separate the template scene into homogeneous regions of interest. Initial outlining should contain slightly more features than one might need. The primary features to outline are those with long extended edges such as land/water boundaries, bridge/water boundaries, pavement/grass boundaries and large buildings. Typically, small objects should not be used unless accompanied by other large features or by a number of other small features.

The final template feature outline should be selected to retain only a minimum number of predictable, quality, orthogonal features. The operator should eliminate those features which have a high probability of being screened by vertical structures based on line of sight obstruction. For example, a grass/pavement boundary that is obstructed by a building would not be retained such as asphalt feature 332a which is adjacent building 330. The operator should review the remaining features for template adequacy. If the template is not adequate (insufficient orthogonal features), more features must be included in the template. If orthogonal features do not exist in the template region at the desired angle, either the template region or the engagement angle must be altered.

The feature outlining and classification process 314 includes, in more detail, the operator classifying the features according to the typical feature types described in Table II.

TABLE II

| Natural | Man-Made Structures |
| --- | --- |
| Concrete | Simple Roof Building |
| Asphalt | Complex Face Structure |
| Grass | Complex Roof Structure |
| Trees | Complex Structure |
| Dirt/Gravel | Bridge |
| Water | Complex Volume |

The latter is done by selecting a feature type from Table II and placing the cursor inside each of the homogeneous regions thus labeling each pixel in the homogeneous region as such a feature. Natural features are classified based on texture, gray level and context. Man-made structures are identified from shadows and line of sight geometry and are classified based on texture and context. Man-made structures are classified as follows.

If a top of a structure has a feature which is smooth, it is classified as a simple roof building. Typically, the leading edge dihedral established by the vertical surface of the building and the ground provides the radar reflectivity. The radar cross section (RCS) of the top of the building, the trailing edge of the building and the ground is lower than the leading edge dihedral. Aircraft hangers and POL tanks with smooth tops also exhibit such radar reflectivity.

A complex face structure has a feature that has reflectivity along the entire side of the structure. An example of this type is a building having windows along the entire vertical face. In order to identify and classify a building as a complex face structure, it is necessary to have oblique photography.

If the top of a structure is rough in texture due to, for example, air conditioning and plumbing equipment fixtures, it is classified as a complex roof building. The entire roof top will exhibit a high RCS due to scattering effects from the fixtures. Power plants exhibit such radar reflectivity.

A feature is a complex structure when the feature exhibits reflectivity over the entire surface of the structure. This can be represented by a combination of a complex roof and a complex face structure. Refineries and metal pipelines typically have features with these characteristics.

A feature is classified as a bridge if it is a slab bridge or road bridge. In general, this category includes all bridge types except for truss bridges which exhibit a higher radar cross section.

Complex volume is a structure with features that exhibit reflectivity over the entire volume of the structure. Examples of this type of structure include truss bridges, transformer yards and substations.

Each pixel in each like region is coded to identify the feature type (i.e. here codes 513 through 524 are used which corresponds to the features of Table II). At a boundary, the code of each pixel on each side of the boundary indicates the type of feature pair (i.e. a code pair of 515/518 indicates a grass/water feature pair).

Once the operator has classified the features of the structures within the template, these regions are specially coded with respect to their class types. It is this coded image that is processed to generate the reference templates. For example, the same feature outline will result in different templates depending upon the feature classification. The template generation process considers the feature outline and classification and the line of sight geometry to generate the reference template.

After the feature outlining and type process 314a is completed, the height classification process 314b is completed. The initial height of all features or regions are set to 0. Height information is not needed to generate templates, but is included if relative feature heights are known and if the template is located in a region with a significant number of vertical structures. When height information is available, the height of each outlined feature is designated. After the height classification process 314b is completed, the radar shadow forecasting process 314c is completed in which a radar shadow forecasting scene is predicted that is used to calculate radar shadowing and range layover effects. Radar shadowing, as described further hereinafter, is a function of the feature type and the radar azimuth and depression angles and is caused by objects with different heights being obscured by one another along the radar line of sight (LOS) angle. The feature types that are typically most affected include simple roof buildings and grass/pavement boundaries. When height information is provided, templates are generated excluding those features which are likely to be shadowed.

After the template scene has been defined and the outlined features classified in the feature outlining and classification process 314, the template generation process 316 is completed to generate the digital reference template 308 (FIG. 15a). Using predictable radar contrast between the homogeneous regions, the digital reference template is created.

The reference template contains high values and low values as previously described. A high pixel value corresponds to the regions on the side of a boundary with a higher radar cross section, a low pixel value corresponds to the region on the side of a boundary with a lower radar cross section. However, not all of the boundaries or features are retained in the completed digital reference template 308. A set of rules is applied to delete non-useful features before the template is generated.

Referring now to FIGS. 15A, 15B and 15D, there are three main processes that occur in the template generation process 316 to include feature editing process 316a, feature combination process 316b and feature rotation 316c. The feature editing process 316a includes selecting those features that provide a predicted radar response and deleting those features that do not. The feature combination process 316b includes combining features that provide a like predicted radar response and separating features that provide a different predicted radar response. The feature rotation process 316c includes rotating the target region to correspond to the view of the angle of attack. The outlined features that the operator generated during the feature outlining and classification process 314 must satisfy the following conditions before they are included as features in the digital reference template 308. If the feature pair are natural terrain features, a contrast criterion must be satisfied. If the feature is a pure dihedral (i.e. simple roof building), only the leading edge boundaries are saved, the trailing edge boundaries are deleted. Features are also deleted depending upon radar contrast predictability between adjacent features and radar shadowing. For a boundary feature of a natural terrain feature (see Table II) to be part of the template, the two regions that it separates must have a minimum contrast ratio of 5 dB.

Figure 17A:
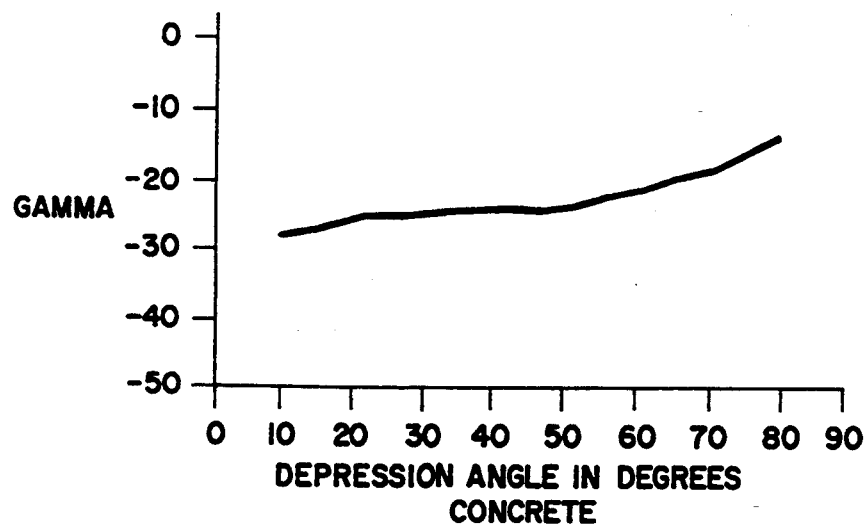
FIGS. 17A, 17B, 17C, 17D, 17E and 17F are charts of a gamma function of selected terrain features.
Figure 17B:
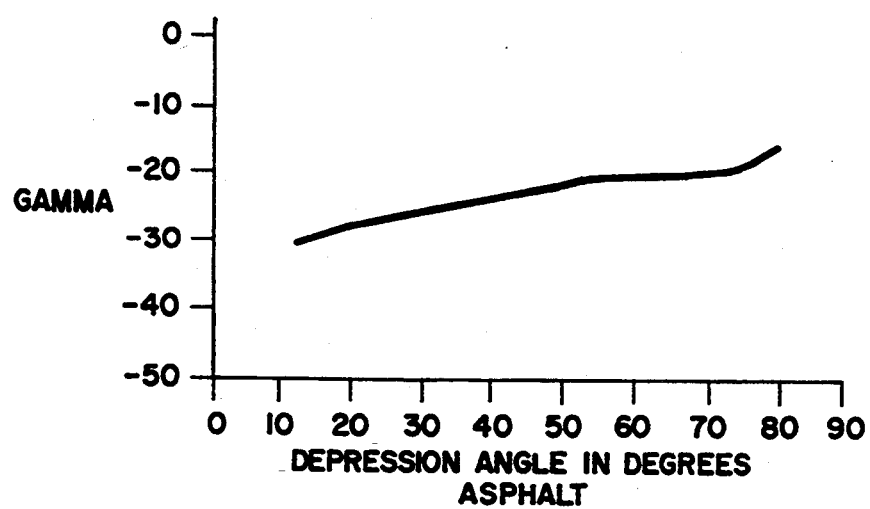
Figure 17C:
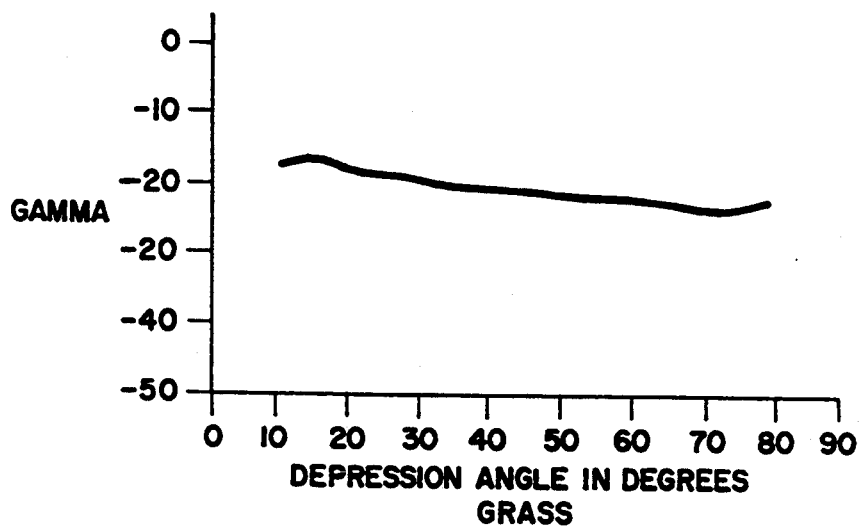
Figure 17D:
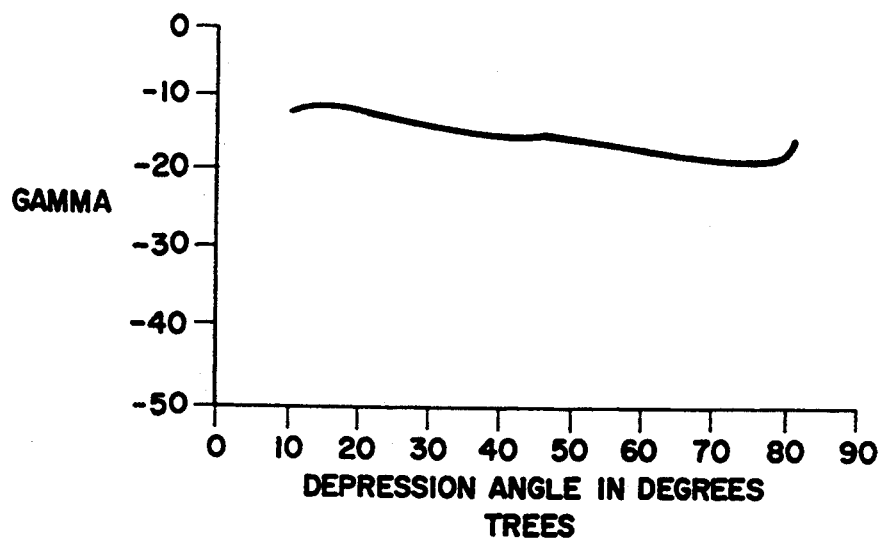
Figure 17E:
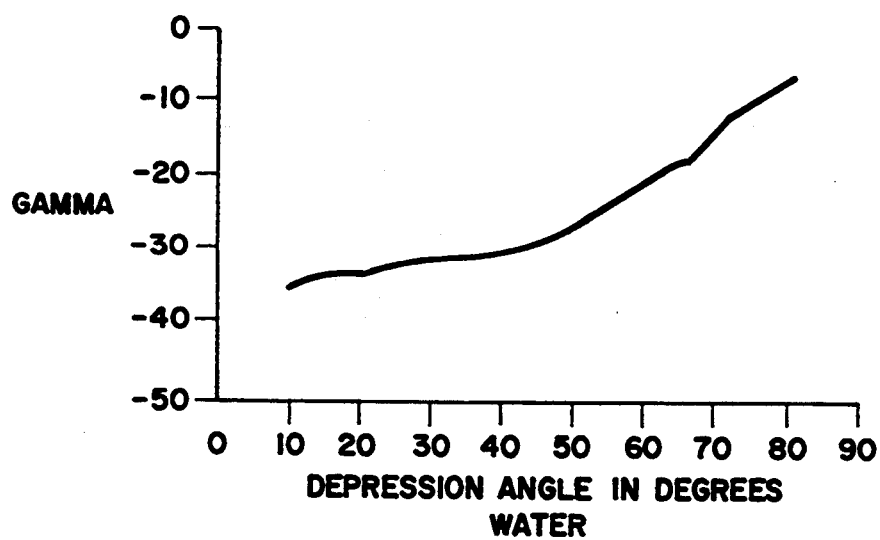
Figure 17F:
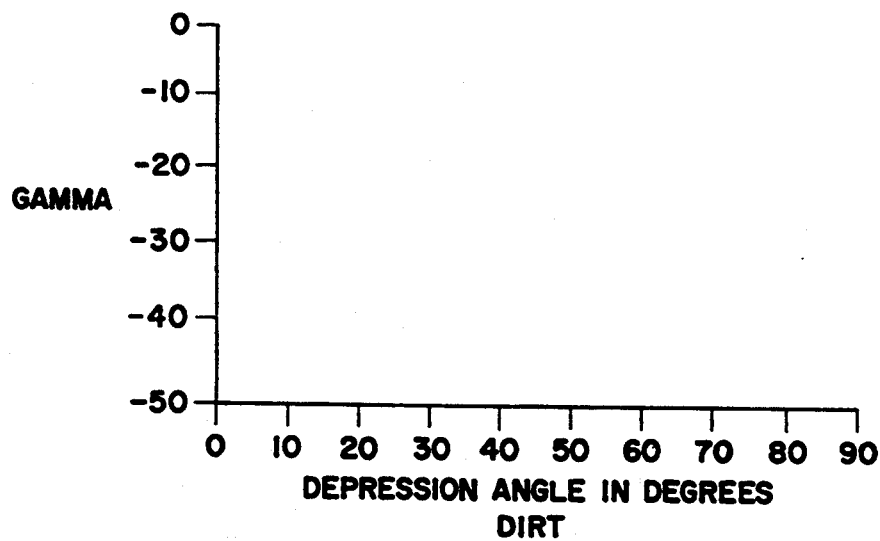

Terrain features are materials that are found in the natural environment. The reflectivity values of terrain features are determined from an Ohio State Handbook. This handbook contains tables and provides gamma values as a function of depression angle for circularly polarized Ka band signals. The gamma function is defined as the normalized echo area in dB as measured relative to a given transmitted signal. The values for these terrain features are shown on graphs in FIGS. 17A, 17B, 17C, 17D, 17E and 17F. The gamma value is a scattering coefficient and is proportional to the terrain surface roughness. Clutter radar cross section $a_c$ (in square feet) is calculated from the equation:

$$\sigma_c A_c 10^{\gamma/10} SIN\Phi$$

where, $A_c$ is the area of the resolution cell (here 100 square feet);

$\Phi$ is the depression angle, and $\gamma$ is the gamma value determined from stored tables in accordance with FIGS. 17a and 17b.

The contrast ratio CR between the two terrain types is calculated by:

$$CR = 10 \log_{10} (\sigma_{c1} \sigma_{c2})$$

where, $\sigma_{c1}$ is the clutter RCS of the terrain feature with the higher RCS and $\sigma_{c2}$ is the clutter RCS of the other terrain feature.

For simple roof building features, most of the reflectivity is returned from a leading edge dihedral which is established by the vertical surface of the building and the ground. Therefore, only the leading edge boundary features are considered as template features. All trailing edge features are deleted because of a predicted small radar contrast.

Figure 18:
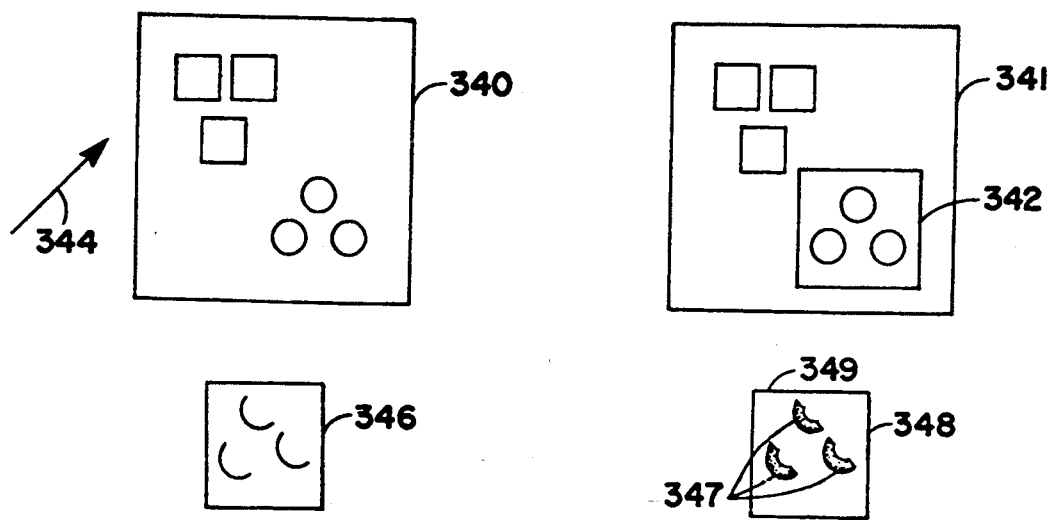

FIG. 18 illustrates the template generation process for simple roof buildings and the like. A window 340 shows outlines of key features for a scene including simple roof buildings and petroleum, oil, lubricant storage tanks (POLs). A window 341 shows the same outlines with a reference template window 342 overlaid on the target region of interest, the three POLs. The desired angle of attack 344 of the missile seeker is also shown. A window 346 shows that the leading edge boundaries caused by the dihedral effect are retained and the trailing edge boundaries are deleted. A window 348 shows the resulting binary reference template. The high pixels 347 are located on the POL side of the scene, and the low pixels 349 are located on the ground plane.

In some instances, it is difficult to predict the radar cross section of two regions along a boundary. For example, in a land/water boundary feature pair, land and water will exhibit different radar cross sections and the boundary between the land and water regions will provide a useful template feature depending on the viewing geometry. If the land/water boundary is viewed from the water, the boundary is a predictable and useful feature. The embankment of land will result in an enhanced radar cross section, since the reflecting surface is tilted more towards the radar line of sight. If the boundary is viewed from the land, the radar contrast of the boundary is less, since the reflecting surface is tilted away from the radar. Therefore, it is desirable to only retain land/water features if the land is viewed from the water.

Another example is a bridge/land feature pair. A slab or road bridge will have sufficient contrast over water but not on land where the clutter radar cross section is normally higher than water. Thus, typically, a bridge over land feature is not retained as a template feature. The above described contrast predictability is based upon empirical observations of known flight test SAR images.

Figure 19:
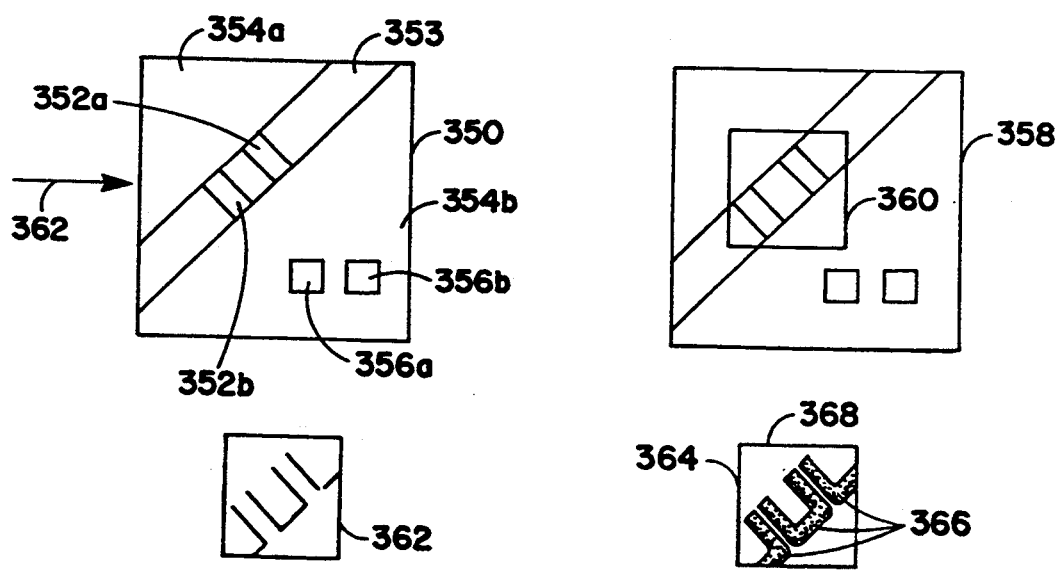
FIG. 19 is a window illustrating the template generation process for a land/water boundary feature.

Referring now to FIG. 19, an example of a land/water boundary feature is shown. A window 350 shows a target scene with feature outlines for two bridges 352a, 352b over water 353. Two land regions 354a, 354b are classified as grass features. Also shown in the window 350 are two buildings 356a, 356b. A window 358 shows the target scene with a template window 360 overlaid on the two bridges 352a, 352b. Assuming that the viewing angle is from the west as indicated by an arrow 362, the boundary edge features that are used to generate the reference template are shown in a window 362. It should be appreciated that the boundary that separates the bridge and land features are not used, since these boundaries are difficult to predict. A reference template is shown in window 364. The high pixels 366 are located on the region with the higher RCS and the low pixels 368 are located in the remainder of the scene.

As described hereinabove, radar shadowing is caused by objects with different heights being obscured by one another along the radar line of sight (LOS) angle. The amount of radar shadowing is determined by the azimuth and depression angle of the radar, the height of the objects and the feature types of the objects.

Figure 20A:
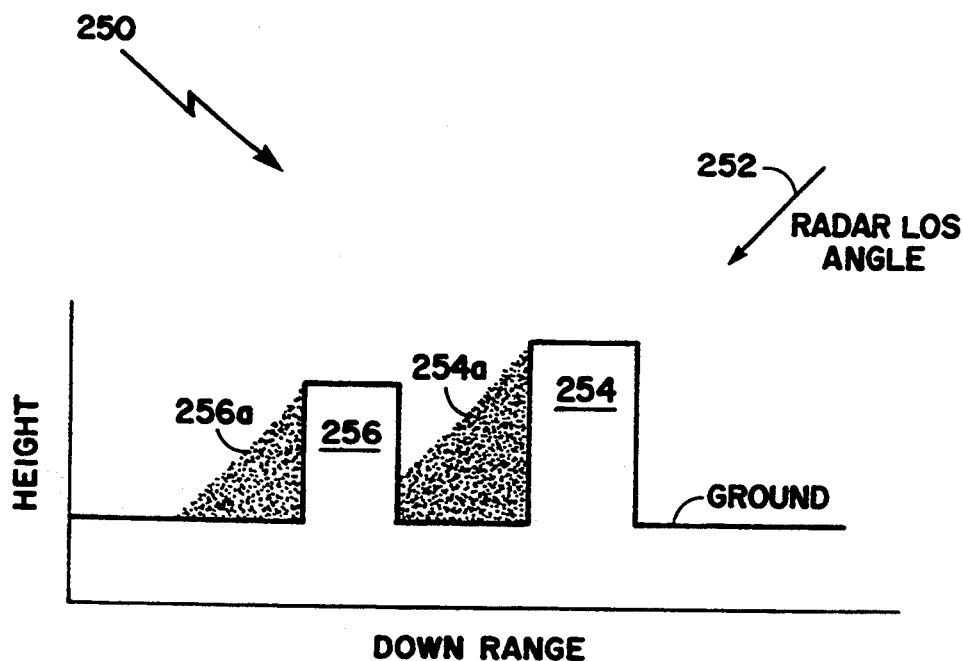
FIG. 20A is an illustration showing the effects of radar shadowing.

Referring now to FIG. 20A, a side view of a target scene 250 of two buildings 254, 256 is shown. With a radar LOS angle 252 as indicated, a radar shadow region 254a is caused by building 254 and a radar shadow region 256a is caused by building 256. The ground region being shadowed will effectively have no radar cross section. Furthermore, building 256, which is partially obscured by building 254 may or may not have significant radar reflectivity depending upon the feature type of the building 256. The features that fall within the radar shadowing region are typically deleted from the final template. Although, there are certain features that are not affected based on the nature of their reflectivity characteristics. Examples of features that are affected by radar shadowing include grass/pavement boundaries and simple roof buildings.

As described hereinabove, all significant features within a target scene are classified by the operator. Target types are separated into two categories: ground plane features and vertical features. Ground plane features are target types that can be divided into homogeneous areas with potentially different average radar cross sections. Such target types include grass, dirt, asphalt, concrete and water. Vertical features are target types that have a height associated with them and include trees, simple roof buildings and complex roof buildings. The above lists are representative and further target types typically are added. The height of each feature is specified as well as the radar LOS angles (depression angle and azimuth attack angle). Next, each feature in the target scene is coded according to the feature's class type. Each feature which is subjected to radar shadowing is analyzed based on feature classification to determine if the affected feature should be retained or deleted. From the specified feature height information and the LOS depression angle and azimuth attack angle information, the radar shadow forecasting scene is predicted.

Figure 20B:
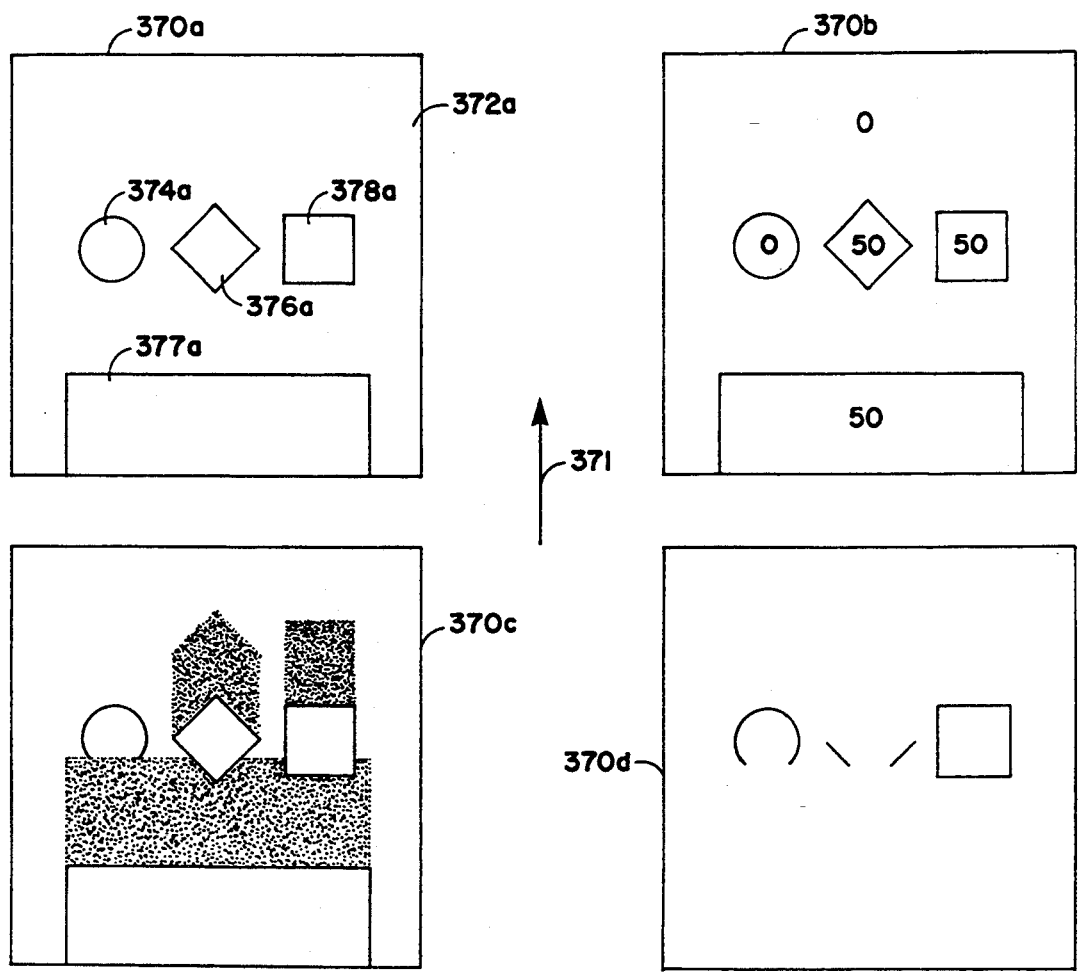
FIG. 20B is an illustration showing the effects of radar shadowing in the template generation process.

FIG. 20B illustrates the effects of radar shadowing in the template generation process. A window 370a includes a target scene with an asphalt region 372a, a grass region 374a, simple roof buildings 376a, 377a and a complex roof building 378a. A window 370b includes the target scene with each of the features outlined, classified and a height assigned to each of the buildings (here 50 ft) relative to the background height as shown. The missile depression angle is here assumed to be 10 degrees. At the indicated radar LOS attack angle 371, a radar shadow forecast prediction scene is generated and is shown in window 370c with the shadow regions indicated by the gray regions. A window 370d shows the resultant template feature boundaries that are retained after the effects of radar shadowing are accounted for. The features that are deleted from the final template result from template feature selection criteria.

It should be appreciated that part of the grass/asphalt boundary between the grass 374a and the asphalt 372a and part of the leading edge of the simple roof building 376a are deleted because of radar shadowing. The leading edge feature of the simple roof building 377a is deleted because its reflectivity is effectively located along the base of the building which is being shadowed as shown. The complex roof building 378a is not affected since it exhibits reflectivity not only along its leading edge but also from the entire roof structure.

Other features that are deleted are trailing edge features from the simple roof buildings 376a, 377a.

FIG. 20C illustrates an example of template feature selection and editing and also radar response prediction which will be described further hereinafter. A window 260a shows a vertical optical photograph of a target area including simple and complex roof buildings. A window 260b shows a corresponding target scene wherein each of the designated target features have been outlined. A template window 262a is shown to enclose a large square building 264a and two smaller buildings 265a, 266a. A window 260c shows a predicted radar shadow SAR response for the target scene of window 260a. A window 262b shows the predicted radar shadow SAR response for the area of the target scene of window 262a. A window 260d shows an actual SAR image of the target scene of window 260a with the area within window 262c corresponding to the area within window 262a. A window 262d shows the resultant template with feature boundaries that are retained after the effects of radar shadowing are considered. The window 262b showing the predicted radar shadow SAR response illustrates the effect of radar shadowing on simple roof buildings. The window 262b shows that the shadow cast by building 266a obscures a side dihedral of the building 265a. The shadow cast by building 265a obscures part of both of the dihedrals of the building 264a. Looking at window 262c in the actual SAR image, it is apparent that the low reflectivity of buildings 264a, 264b and 264c is as predicted.

During actual flight of a missile (not shown), the SAR image of window 260d is correlated against the reference template 262d until the reference template is overlaid at an optimum target acquisition location as shown by window 262c. FIG. 20D shows a 3-D acquisition surface plot wherein the correct target location peaks with minimal ambiguity.

When generating useful edge features for a reference template, the process searches for all of the boundaries that the operator has outlined. These boundaries are then traced until all boundary points are accounted for. Normally, when a break occurs in the tracing process, a new edge feature is declared. The window 362 in FIG. 19 shows examples of edge features that might be caused by breaks in the trace.

Figure 21:
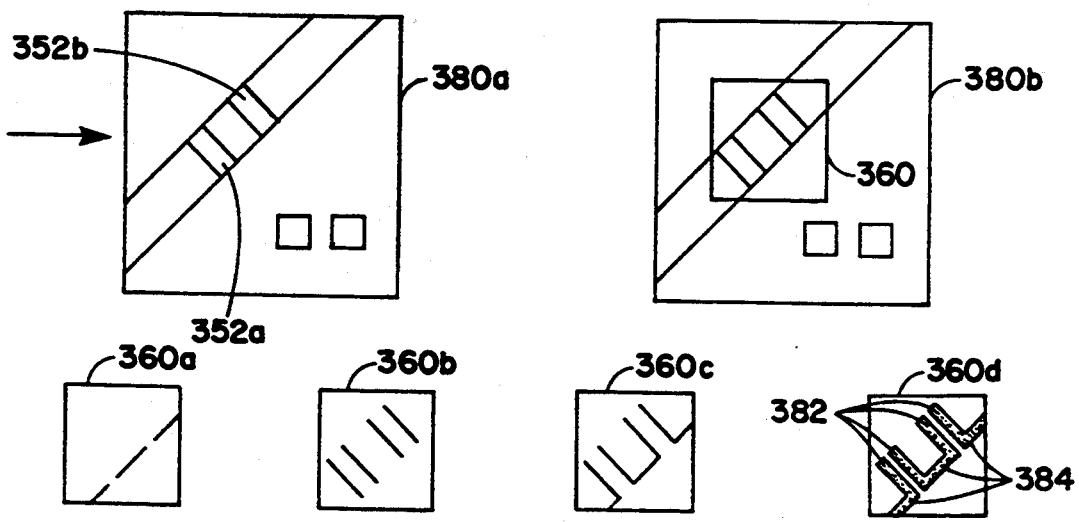
FIG. 21 is an illustration a process of creating feature edge lists in accordance with the invention.

Since each edge feature is processed individually before calculating the correlation value, the feature edge lists must be properly combined or in some instances separated in feature combination process 316b to optimize target acquisition. FIG. 21 illustrates this process. A window 380a shows the outline of the two bridges 352a, 352b as shown in FIG. 19. As described earlier with FIG. 19, boundary features are outlined as shown in window 380a. A template window 360 is overlaid the two bridges 352a, 352b and here separated into two feature edges. The first feature edge as shown in window 360a includes only the land/water boundary features. The second feature edge as shown in window 360b includes only the bridge/water boundary features. The reference template as shown in window 360c is saved with the total edge features shown.

All template features are combined in such a way that each feature edge list includes only those boundary features that include the same feature pairs. For the bridge scene in FIG. 21, the single edge feature including all boundaries are separated into two feature edges: land/water feature and bridge/water feature. If the feature edges are not separated, then in further processing, some pixel values of the bridge will be used to process the pixels under the land/water region and vice versa. By separating the feature edges as shown in window 360d, the bridge pixel values 382 are used to process only the bridge/water boundary and the land pixel values 384 are used to process only the land/water boundary.

Figure 22:
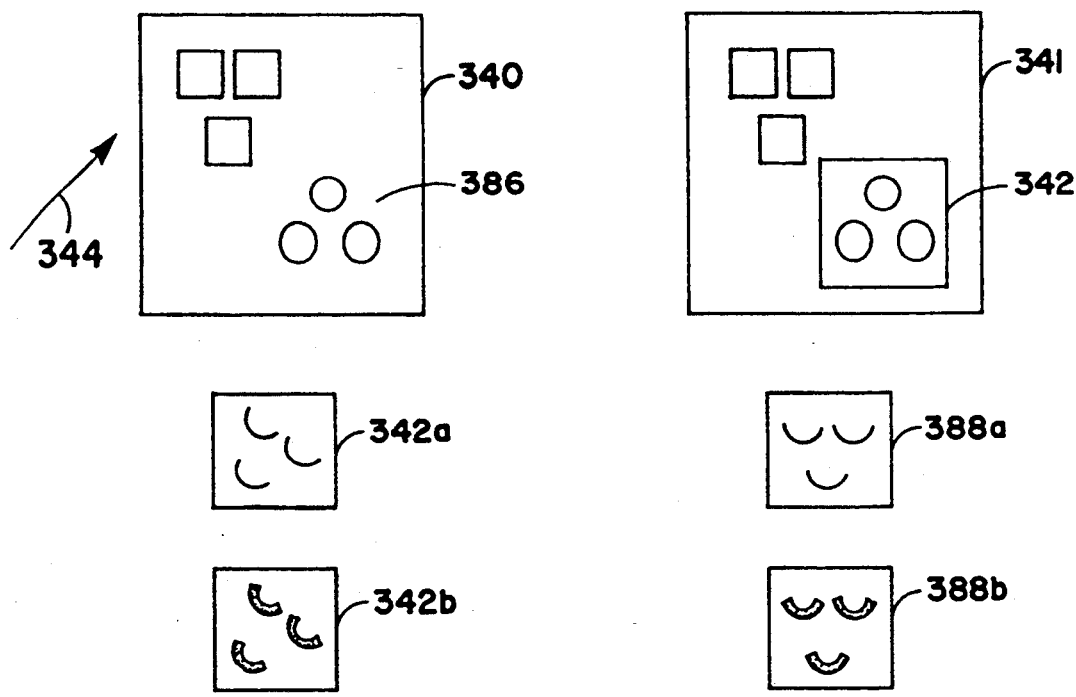
FIG. 22 is an illustration of a feature rotation process in accordance with the invention.

Before a reference template is saved, the template features are rotated in the feature rotation process 316c to correspond with a desired angle of attack. FIG. 22 illustrates this process. A window 340 shows a typical target scene including POLs 386, and the desired azimuth angle of attack indicated by arrow 344. The POLs are outlined to show their relative locations. As described hereinabove in reference to FIG. 18, a reference window 342 is overlaid the POLs 386 as shown in window 341. A window 342a shows the leading edge boundaries that are retained and the trailing edge boundaries that are deleted. A window 342b shows the resulting binary reference template before rotation. With a desired angle of attack indicated by arrow 344 as shown, the target scene is rotated to correspond with the desired angle of attack. A window 388a shows the target scene rotated with the leading edge boundaries that are retained and the trailing edge boundaries that are deleted. A window 388b shows the resulting binary reference template after rotation.

Mission planning must consider two missile system processes: target acquisition and aimpoint tracking. The important difference between acquisition and track is that acquisition is concerned with uniquely acquiring the target and eliminating ambiguities whereas track is concerned with accuracy. For this reason, separate search and track templates are implemented.

During target acquisition, the missile 10 (FIG. 1A) searches a relatively large target area on the ground 9 (FIG. 1A). A search template used for this target area must have sufficient detail to acquire a reference location relative to the desired target. The search template is provided primarily to eliminate ambiguities, not for aimpoint accuracy. After the missile has acquired the target, it searches a much smaller region around a target using a track template for aimpoint accuracy. Although search and track templates may be identical, track templates will typically include fewer features.

In general, both search templates and track templates should be kept as simple as possible. Search templates should include only enough features sufficient to avoid ambiguities. Although track templates are generally more simple (include less features), some targets, such as runways, utilize search templates and track templates which are the same.

When a template is generated, the operator has the option to verify its quality and to compensate for potential biasing. If a search template is being validated, the ability of the template to uniquely designate a desired target in a large clutter scene is evaluated. Quantitative measures such as probability of false alarm, along with a 3-D plot of the predicted correlation surface, are displayed to the operator. If a track template is being validated, the ability of the template to accurately track a target is evaluated. A good track template typically exhibits a low variance, indicating track stability. When the reference template is correlated against a SAR map in the correlation process as described earlier in connection with FIG. 11, there is a potential for a bias between the peak of the correlation response and the designated aimpoint location. The radar response prediction process 315 (FIG. 15B) which evaluates the template quality also estimates the expected template bias. When a template bias is indicated, the aimpoint is adjusted to compensate for the bias. If either a search or track template does not provide a high probability of success, the operator should change the template. Based on the diagnosed deficiency, there are three techniques for correcting the template: add or delete features to the template, select a different approach angle or effect an aimpoint offset. The operator can modify the current template or create a new template and repeat the verification procedure over again.

During flight of the missile 10 (FIG. 1A), an input array representing the ground return is processed through the reference template array. Template matching functions generally exhibit bias error characteristics which vary with template and target environments. There are several potential sources for bias error which can be readily identified and corrected.

As described hereinbefore, templates are generated using vertical optical photography. SAR radar measurement may not correspond to the optical target area in an identical manner. The radar edges may not be sharp, and may "ramp up" in radar cross section as an edge feature is traversed. Thus, digital processing during the correlation process may register the edge feature along the ramp and not at the true position of the edge. Furthermore, the height of a feature may induce an overlay in the range direction creating a perceived shift in down range. Thus, even with ideal signals, the correlation peak may not coincide with the designated track point.

It should be appreciated that all post processing based on the histomatch result is referenced with respect to the cell containing the histomatch peak. The following discussion provides analysis supporting the technique of predicting probability density of the histomatch peak.

First, we represent the histomatch response to a stimulus statistically by the moments arrays:

$\mu_N(x,y)$ = expected histomatch response at cell; and
$v_N(x,y)$ = unbiased variance of the histomatch response at cell. Now represent the marginal probability function as:
$P(\mu_1,v_1,\mu_2,v_2)$ = probability of a histomatch cell with statistics $(\mu_1,v_1)$ exceeding the response with statistics $(\mu_2,v_2)$. Now approximate the peak probability density by:

$$D(x,y) = G\pi P(\mu_H(x,y), v_H(x,y), \mu_H(u,v), v_H(u,v))$$
$$(u,v) \neq (x,y)$$

where G is set to satisfy the normality requirement $$\sum_{(x,y)} D(x,y) = 1.$$

This expression for the density is still not practical because of the large number of operations required. To reduce the computational workload, a reduced number of candidate points are generated with all other probabilities set to zero. This prefiltering method is described as follows.

Define $(x_p,y_p)$ = location of the peak of the expected histomatch response, $\mu_{Hp}$ = expected histomatch response at $(x_p,u_p)$, the expected histomatch response maximum, $v_{Hp}$ = histomatch variance at the peak response and $T_{pF}$ = prefilter probability threshold. Now the reduced set of candidate points is the set defined as:

$$X=(x,y) \ [N_x \times N_y]{:}P(\mu_H(x,y), \nu_H(x,y), \mu_{Hp}, \nu_{Np}) \geq T_{pF}$$

Now for each point in the set X, the probability density has the representation:

$$D(x,y) = \begin{cases} \prod\limits_{\substack{(u,v) \neq (x,y) \\ (u,v) \in X}} P(\mu_H(x,y), \nu_H(x,y), \mu_H(u,v), \nu_H(u,v)) : \\ \phi.\phi : (x,y) \in X \end{cases}$$

The prefilter threshold value is the subject of a trade. Raising the prefilter threshold increases throughput and decreases the accuracy of the density estimate.

The area of greatest difficulty involves the marginal probability postulated in the equation for $P(\mu_1 \nu_1 \mu_2, \nu_2)$. A closed form expression of this density is not feasible and, due to the large number of degrees of freedom (one for each template node), a complete statistical characterization is not practical.

To overcome these problems, a two parameter distribution was developed which should have similar characteristics to the histomatch response. The latter formed the base for constructing a table for representing the marginal probability function.

The two parameter distribution is constructed by the following method. For the initial base, a binomial distribution is selected because the distributions of $H_{++}$ and $H_{--}$ as described hereinafter are multinomials. The two free parameters are the degrees of freedom, N and the single sample probability P.

The histomatch algorithm maps its multinomial distribution through a highly nonlinear function. To maintain an analog to this, the binomial is mapped through the function $$Z = \frac{b^{E1}}{b^{E2} + C(1-b)^{E3}}$$

Where b is the binomial distribution random number with the density $$f_b(K/N) = \frac{N!}{(N-K)!K!} P^K (1-P)^{N-K}$$

and $E_1$, $E_2$, $E_3$ and C are constants.

Now tables of the histomatch mean and unbiased variance can be generated for combinations of the binomial parameters and $(N_1 P)$ by the formulae given below:

$$\mu_H(P,N) = \sum_{K=0}^{N} \frac{N!}{(N-K)!K!} P^K (1-P)^{N-K} \left( \frac{K^{E1}}{K^{E2} + C(N-K)^{E3}} \right)$$

$$\nu_H(P,N) = \sum_{K=0}^{N} \frac{N!}{(N-K)!K!} P^K (1-P)^{N-K} \left( \frac{K^{E1}}{K^{E2} + C(N-K)^{E3}} - \mu_H(P,N) \right)^2$$

Now the marginal probability function for the mapped binomial is given below as:

$$P(N_1, P_1, N_2, P_2) = \text{Prob}\left[ \frac{b_1^{E1}}{b_1^{E2} + C(1-b_1)^{E3}} > \frac{b_2^{E1}}{b_2^{E2} + C(1-b_2)^{E3}} \right]$$

The histomatch mapping function is strictly increasing, therefore $$P(N_1, P_1, N_2, P_2) = \text{Prob}[b_1 > b_2] =$$

$$\sum_{K=0}^{N_1} \frac{(N_1)! P_1^K (1-P_1)^{N_1-K}}{(N_1-K)!K!} \sum_{l=0}^{M(K,N_1,N_2)} \frac{(N_2)! P_2^l (1-P_2)^{N_2-l}}{(N_2-l)!l!}$$

where $M(K,N_1,N_2) = \left[ \dfrac{KN_2}{N_1} \right]$

Now the marginal probability table for the histomatch process is generated from the above intermediate tables in the following fashion. The ordinates of interest, $\mu_1 \nu_1 \mu_2$, $\nu_2$, are generated. Then, via an inverse table lookup on tables constructed from the equations for $\mu_H(P,N)$ and $\nu_H(P,N)$, the associated binomial parameters $N_1$, $P_1$, $N_2$, $P_2$ are generated.

Now the marginal probability is computed by applying a table lookup procedure on data generated by the equation for $p(N_1, P_1, N_2, P_2)$ providing tables of marginal probabilities based on the histomatch moments.

The following discussion will present the analysis for estimating the mean and variance of the histomatch response to a given SAR scene represented as a Rayleigh distributed process. If we define the SAR response cell $\overline{X}$ by:

$$\text{Prob}[SAR(\overline{X}) < T] = \frac{2}{\overline{P(X)}} \int_0^T u \, \text{Exp}\left(\frac{-u^2}{\overline{P(X)}}\right) du$$

where $\overline{P(X)}$ = expected power return from cell.

The histomatch algorithm is based on a given fixed template which is subdivided into features. Represent the template as follows:

$N_f$ = number of features in the template;
$C_R(f)$ = contrast ratio of the $f^{th}$ feature;
$N_p(f)$ = number of positive nodes in the $f^{th}$ feature;
$N_n(f)$ = number of negative nodes in the $f^{th}$ feature;
$\overline{X}_p(K_1 f)$ = the $K^{th}$ positive node of the $f^{th}$ feature; and
$\overline{X}_n(K_1 f)$ = the $K^{th}$ negative node of the $f^{th}$ feature.

The first stage of the histomatch algorithm is to determine the binarization thresholds for each feature by the formulae:

$$T_p(f) = \frac{C_R(f)}{N_n(f)} \sum_{K=1}^{N_n(f)} SAR(\overline{X}_n(K_1 f))$$

$$T_n(f) = \frac{1}{C_R(f) N_p(f)} \sum_{K=1}^{N_p(f)} SAR(\overline{X}_p(K_1 f))$$

Since both $T_p(f)$ and $T_n(f)$ depend on the SAR response, they are subject to random variation. Applying the law of large numbers, approximate the threshold statistics as gaussian. Thus, computing the mean and unbiased variance completely characterizes the thresholds statistically. This produces:

$$\mu_p(f) = \frac{C_R(f)}{N_n(f)} \sum_{K=1}^{N_n(f)} E[SAR(\overline{X}_n(K,f))]$$

$$\mu_n(f) = \frac{1}{C_R(f) N_p(f)} \sum_{K=1}^{N_p(f)} E[SAR(\overline{X}_p(K,f))]$$

$$v_p(f) = \frac{C_{R2}(f)}{N_{n2}(f)} \sum_{K=1}^{N_n(f)} E[(SAR(\overline{X}_n(K,f)) - \mu_p(f))^2]$$

$$v_n(f) = \frac{1}{C_{R2}(f) N_{p2}(f)} \sum_{K=1}^{N_p(f)} E[(SAR(\overline{X}_p(K,f)) \mu_n(f))^2]$$

where each SAR cell has been assumed to be statistically independent. Now by construction of the Rayleigh representation:

$E[SAR^2(\overline{X})] = \overline{P}(\overline{X})$ while evaluating the integral produces:

$$E[SAR(X)] = \frac{2}{\overline{P}(X)} \int_0^\infty u^2 \, \text{Exp}\left(-\frac{u^2}{\overline{P}(X)}\right) du =$$

$$\int_0^\infty \text{Exp}\left(-\frac{u^2}{\overline{P}(X)}\right) du =$$

$$\frac{1}{2}\left(\frac{\overline{P}(X)}{2}\right)^{\frac{1}{2}} \int_{-\infty}^\infty \text{Exp}\left(-\frac{t^2}{2}\right) dt = \left[\frac{\pi}{4} \overline{P}(X)\right]^{\frac{1}{2}}$$

Applying like terms from the last six equations produces:

$$\mu_p(f) = \sqrt{\frac{\pi}{4}} \frac{C_R(f)}{N_n(f)} \sum_{K=1}^{N_n(f)} [\overline{P}(\overline{X}_n(k,f))]^{\frac{1}{2}}$$

$$\mu_n(f) = \sqrt{\frac{\pi}{4}} \frac{1}{C_R(f) N_p(f)} \sum_{K=1}^{N_p(f)} [\overline{P}(\overline{X}_p(k,f))]^{\frac{1}{2}}$$

$$v_p(f) = \frac{4-\pi}{4} \frac{C_{R2}(f)}{N_{n2}(f)} \sum_{K=1}^{N_n(f)} \overline{P}(\overline{X}_p(k,f))$$

$$v_n(f) = \frac{4-\pi}{4} \frac{1}{C_{R2}(f) N_{p2}(f)} \sum_{K=1}^{N_p(f)} \overline{P}(\overline{X}_p(k,f))$$

and each of the threshold variables is characterized by:

$$\text{Prob}(T_p(f) < T) = \frac{1}{\sqrt{2\pi v_p(f)}} \int_{-\infty}^T \text{Exp}\left(-\frac{(t - \mu_p(f))^2}{2v_p(f)}\right) dt$$

$$\text{Prob}(T_n(f) < T) = \frac{1}{\sqrt{2\pi v_n(f)}} \int_{-\infty}^T \text{Exp}\left(-\frac{(t - \mu_n(f))^2}{2v_n(f)}\right) dt$$

Once the thresholds have been established, the pixels in the template are binarized by comparison with the threshold. This is represented by the equations:

$$h_{pp}(k,f) = \begin{array}{l} 1 : SAR(\overline{X}_n(k,f)) > T_p(f) \\ 0 : SAR(\overline{X}_p(k,f)) \geq T_p(f) \end{array}$$

$$h_{nn}(k,f) = \begin{array}{l} 1 : SAR(\overline{X}_n(k,f)) > T_p(f) \\ 0 : SAR(\overline{X}_p(k,f)) \geq T_p(f) \end{array}$$

Now the probability functions for each pixel have the form:

$$\text{Prob}[h_{pp}(k,f) = 1] = \int_{-\infty}^\infty \frac{1}{\sqrt{2\pi v_p(f)}} \text{Exp}\left(-\frac{(t-\mu_p(f))^2}{2v_p(f)}\right) \int_t^\infty \frac{2\mu}{\overline{P}(\overline{X}_p(k,f))} \text{Exp}\left(-\frac{\mu^2}{\overline{P}(\overline{X}_p(k,f))}\right) dt$$

$$\text{Prob}[H_{nn}(k,f) = 1] = \int_{-\infty}^\infty \frac{1}{\sqrt{2\pi v_n(f)}} \text{Exp}\left(-\frac{(t-\mu_n(f))^2}{2v_n(f)}\right) \int_t^\infty \frac{2\mu}{\overline{P}(\overline{X}_n(k,f))} \text{Exp}\left(-\frac{\mu^2}{\overline{P}(\overline{X}_n(k,f))}\right) dt$$

Evaluating the inner integral produces:

$$\text{Prob}[h_{pp}(k,f) = 1] = \frac{1}{\sqrt{2\pi v_p(f)}} \int_{-\infty}^\infty \text{Exp}\left(-\frac{(t-\mu_p(f))^2}{2v_p(f)}\right) \text{Exp}\left(-\frac{t^2}{\overline{P}(\overline{X}_p(k,f))}\right) dt$$

$$\text{Prob}[h_{nn}(k,f) = 1] = \frac{1}{\sqrt{2\pi v_n(f)}} \int_{-\infty}^\infty \text{Exp}\left(-\frac{(t-\mu_n(f))^2}{2v_n(f)}\right) \text{Exp}\left(-\frac{t^2}{\overline{P}(\overline{X}_n(k,f))}\right) dt$$

These expressions can be written as:

$$\text{Prob}[h_{pp}(k,f) = 1] = \frac{1}{\sqrt{2\pi v_p(f)}} \text{Exp}\left[-\frac{\mu^2(f)}{(\overline{P}(\overline{X}_p(k,f)) + 2v_p(f))}\right] \cdot$$

$$\int_{-\infty}^\infty \text{Exp}\left[-\frac{(\overline{P}(\overline{X}_p(k,f)) + 2v_p(f))}{2\overline{P}(\overline{X}_p(k,f))v_p(f)}\left(t - \frac{\overline{P}(\overline{X}_p(k,f))\mu_p(f)}{\overline{P}(\overline{X}_p(k,f)) + 2v_p(f)}\right)^2\right] dt$$

$$\text{Prob}[h_{nn}(k,f) = 1] = 1.0 - \frac{1}{\sqrt{2\pi\nu_n(f)}} \text{Exp}\left[-\frac{\mu_n^2(f)}{(\bar{P}(X_n(k,f)) + 2\nu_n(f))}\right].$$

$$\int_{-\infty}^{\infty} \text{Exp}\left[-\frac{(\bar{P}(X_n(k,f)) + 2\nu_n(f))}{2\bar{P}(X_n(k,f))\nu_n(f)}\left(t - \frac{\bar{P}(X_n(k,f))\mu_n(f)}{\bar{P}(X_n(k,f)) + 2\nu_n(f)}\right)^2\right]dt$$

Evaluating the final integrals produces:

$$\text{Prob}(h_{pp}(k,f) = 1) =$$

$$\left[\frac{\bar{P}(X_p(k,f))}{\bar{P}(X_p(k,f)) + 2\nu_p(f)}\right]^{\frac{1}{2}} \text{Exp}\left[-\frac{\mu_p^2(f)}{\bar{P}(X^p(k,f)) + 2\nu_p}\right]$$

$$\text{Prob}(h_{nn}(k,f) = 1) =$$

$$1 - \left[\frac{\bar{P}(X_n(k,f))}{\bar{P}(X_n(k,f)) + 2\nu_n(f)}\right]^{\frac{1}{2}} \text{Exp}\left[-\frac{\mu_n^2(f)}{\bar{P}(\bar{X}^n(k,f)) + 2}\right]$$

Now the histomatch function value is computed by the formula:

$$Z = \left(\frac{H^{E1}_{++}}{H^{E2}_{++} + CH^{E3}_{+-}}\right)\left(\frac{H^{E1}_{-+}}{H^{E2}_{--} + CH^{E3}_{-+}}\right)$$

where $$H_{++} = \sum_{f=1}^{N_f} \sum_{k=1}^{N_p(f)} h_{pp}(k,f)$$

$$H_{--} = \sum_{f=1}^{N_f} \sum_{k=1}^{N_n(f)} h_{nn}(k,f)$$

$$H_{+-} = \sum_{f=1}^{N_f} N_p(f) - H_{++}$$

$$H_{-+} = \sum_{f=1}^{N_f} N_n(f) - H_{--}$$

To simplify notation, order the arrays $h_{pp}(k,f)$ and $h_{nn}(k,f)$ linearly so that we can write:

$$N_{pt} = \sum_{f=1}^{N_p} N_p(f)$$

$$N_{nt} = \sum_{f=1}^{N_f} N_n(f)$$

$$H_{++} = \sum_{k=1}^{N_{pt}} h_{pp}(f)$$

$$H_{--} = \sum_{k=1}^{N_{nt}} h_{nn}(k)$$

$$H_{+-} = N_{pt} - H_{++}$$

$$H_{-+} = N_{nt} - H_{--}$$

Now the distribution of $H_{++}$ and $H_{--}$ can be computed recursively in the following fashion. Define:

$$G_{++}(N) = \sum_{k=1}^{N} h_{pp}(k)$$

$$G_{--}(N) = \sum_{k=1}^{N} h_{nn}(k)$$

$Q_{++}(N, k) = \text{Prob}(G_{++}(N) = k): k=0, \ldots, N$
$Q_{--}(N, k) = \text{Prob}(G_{--}(N) = k): k=0, \ldots, N$ Clearly, the distribution after adding the next element becomes:

$Q_{++}(N+1,k) = \text{Prob}[h_{pp}(N+1) = 1]Q_{++}(N,k-1) + (1 - \text{Prob}[h_{pp}(N+1) = 1])Q_{++}(N,1$ $Q_{--}(N+1,k) = \text{Prob}[h_{nn}(N+1) = 1]Q_{--}(N,k) + (1 - \text{Prob}[h_{nn}(N+1) = 1])Q_{--}(N,1$ The initial conditions for the recursion are defined as:

$$Q_{++}(0,k) = \begin{matrix} 1.0 : k = 0 \\ 0.0 : k \neq 0 \end{matrix}$$

$$Q_{--}(0,k) = \begin{matrix} 1.0 : k = 0 \\ 0.0 : k \neq 0 \end{matrix}$$

With this construction, $Q_{++}(N_{pT},k):k=1, \ldots, N_{pT}$ is the density of $H_{++}$ and $Q_{--}(N_{nT},k):k=1, \ldots, N_{nT}$ is the density of $H_{--}$.

To compute the moments of Z, the objective of this analysis, assume Z can be statistically decomposed into the product:

$$Z = Z_p \cdot Z_n$$

where $$Z_p = \frac{H^{E1}_{++}}{H^{E2}_{++} + CH^{E3}_{+-}}$$

$$Z_n = \frac{H^{E1}_{--}}{H^{E2}_{--} + CH^{E3}_{+-}}$$

Further, assume $Z_p$ and $Z_n$ are statistically independent. This is reasonable since there are no SAR cells common to both $H_{++}$ and $H_{--}$. Now the moments can be computed by:

$$\mu_Z = E(Z) = E(Z_p)E(Z_n) = \mu_{zp}\mu_{zn}$$

$$\nu_Z = E[(z-\mu_z)^2] = \nu_{zp}\nu_{zn} + \mu_{zp}^2\nu_{zn} = \mu_{zn}^2\nu_{zp}$$

where $$\mu_{zp} = E\left[\frac{H^{E1}_{++}}{H^{E2}_{++} + CH^{E3}_{+-}}\right]$$

-continued $$\mu_{zn} = E\left[\frac{H^{E1}_{--}}{H^{E2}_{--} + CH^{E3}_{-+}}\right]$$

$$v_{zp} = E\left[\left(\frac{H^{E1}_{++}}{H^{E2}_{++} + CH^{E3}_{+-}} - \mu_{zp}\right)^2\right]$$

$$v_{zn} = E\left[\left(\frac{H^{E1}_{--}}{H^{E2}_{--} + CH^{E3}_{-+}} - \mu_{zn}\right)^2\right]$$

Now the moments $\mu_{zp}$, $\mu_{zn}$, $v_{zp}v_{zn}$ can be computed directly from the distributions $Q_{++}$, $Q_{--}$ with the following formulae:

$$\mu_{zp} = \sum_{k=0}^{N_{pt}} Q_{++}(N_{pt},k) \cdot \frac{k^{E1}}{k^{E2} + C(N_{pt}-k)^{E3}}$$

$$\mu_{zn} = \sum_{k=0}^{N_{nt}} Q_{--}(N_{nt},k) \cdot \frac{k^{E1}}{k^{E2} + C(N_{nt}-k)^{E3}}$$

$$v_{zp} = \sum_{k=0}^{N_{pt}} Q_{++}(N_{pt},k) \cdot \left[\frac{k^{E1}}{k^{E2} + C(N_{pt}-k)^{E3}} - \mu_{zp}\right]^2$$

$$v_{zn} = \sum_{k=0}^{N_{nt}} Q_{--}(N_{nt},k) \cdot \left[\frac{k^{E1}}{k^{E2} + C(N_{nt}-k)^{E3}} - \mu_{zn}\right]^2$$

The following discussion describes the analytic representation of the statistical radar response model for template verification. This process provides an expected power map representing the radar's response to the modeled background.

To produce a measure which is independent of specific flight geometry, each SAR map cell is processed as if it were a stationary point of the motion compensation. For points near the center of the field of view, the effect of the pattern on the sum-beam map can be approximated by a fixed gain matrix. Let $$\overline{P}_{SAR}(p,q) = \frac{C^2 P_T G_E}{64\pi^3 f_{RF}^2 R_C^4} \sum_{k=1}^{n} G_k \left(\sum_{n=-N_o}^{N_o} w_o(n)\mathrm{sinc}\left(\pi\left[\frac{X_k - X_c(p,q)T_u}{\Delta_o} - n\right]\right)\right)^2$$

$$\left(\sum_{m=-N_R}^{N_R} W_R(m)\mathrm{sinc}\left(\pi\left[\frac{X_k - X_c(p,q)T_R}{\Delta_r} - m\right]\right)\right)^2$$

where $G_E$=effective antenna pattern gain matrix. Now represent the stimulus cross section in the SAR x Doppler line of sight frame by:

$$X_{k,l} = X_c + \left(K - \frac{M_x}{2}\right)\Delta_o u + \left(1 - \frac{M_y}{2}\right)\Delta_r R$$

$\sigma_{k,l}$=cross section at the cell
where
$X_c$=center of the field of view
$M_x$=cross range size of the SAR map
$M_y$=down range size of SAR map
Define the control center for sample $X_c(p,q)$ by:

$$X_c(p,q) = X_c + \left(p - \frac{M_x}{2}\right)\Delta_o u + \left(q - \frac{M_y}{2}\right)\Delta_r R$$

Thus, $$\overline{P}_{SAR}(p,q) =$$

$$\frac{C^2 P_T G_E}{64\pi^3 f_{RF}^2 R_C^4} \sum_{n=-N_o}^{N_o} \sum_{m=-N_R}^{N_R} \sigma(p+n, q+m)W_o^2(n)W_R^2(m)$$

Since the histomatch is amplitude insensitive, the leading constant is of only marginal importance.

Figure 23:
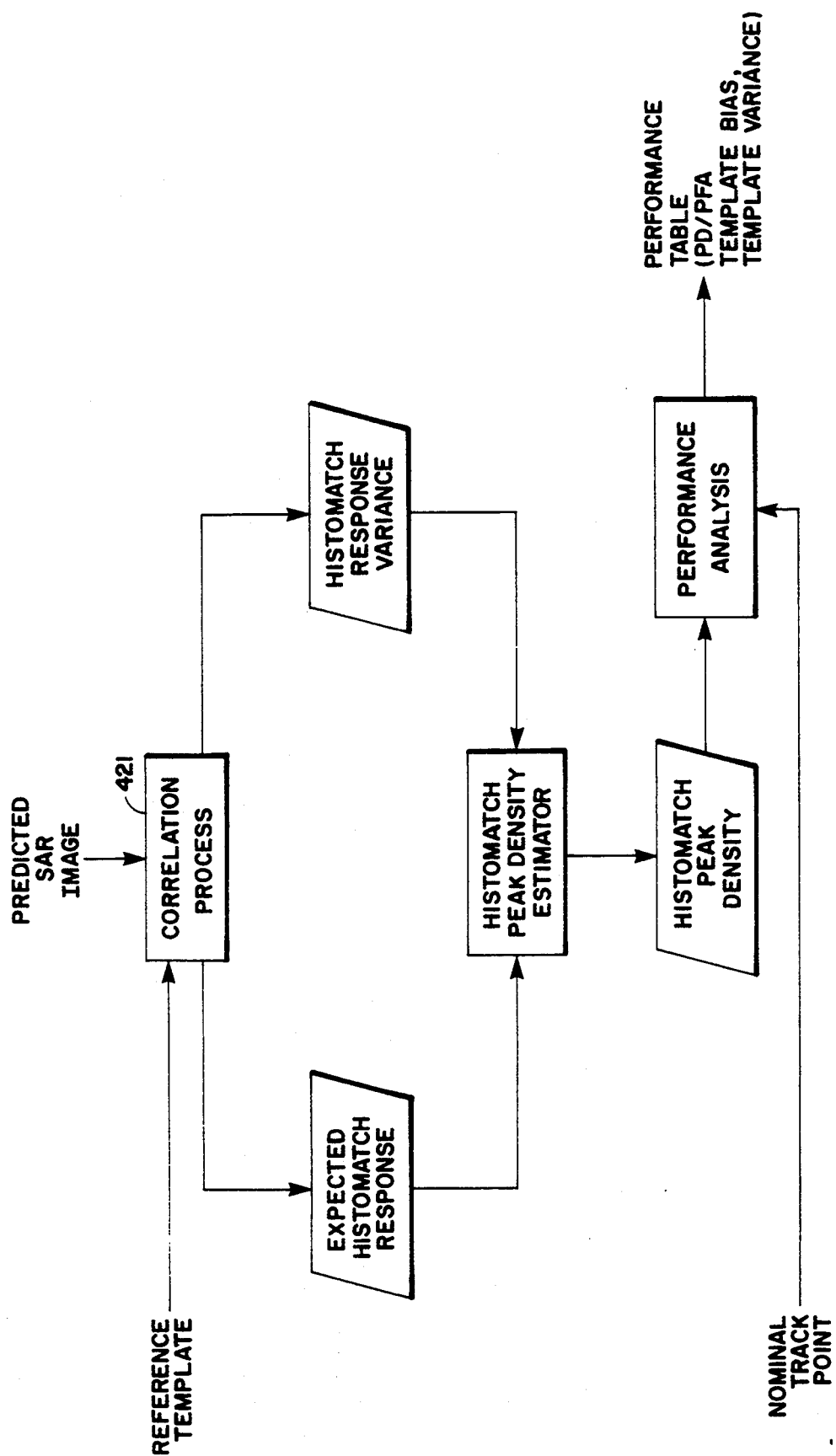
FIG. 23 is an illustration of a template verification and bias estimation process.

Referring now to FIG. 23, template verification and bias estimation processes are illustrated. An operator outlines all significant boundaries and classifies the homogeneous regions in the target area of the digitized image and a reference template and a predicted SAR image is generated. A correlation process is then performed to correlate the reference template against the predicted SAR image (predicted radar response) to provide probability of detection, template bias and track variance data. The performance model requires the reference template, the predicted SAR image and a track point. The template generation process has already been described in detail.

A generation process to provide the predicted SAR image is very similar to the reference template generation process. There are four main processes to generate the predicted SAR image to include a digitization process, a scene selection process, a feature outlining and classification process and a radar response prediction process. The first three processes have been described hereinabove in reference to the reference template generation process in connection with FIG. 15B. The window size during the reference template generation mode is large enough such that a 640 ft × 640 ft template can be generated as already described. The window size during the predicted SAR image generation mode depends on whether the operator is performing verification on search or track templates. If a search template is being verified, the window size is equal to the acquisition uncertainty area. The search template is evaluated over this uncertainty area. If a track template is being verified, the window size is only slightly larger than the track template window. The predicted SAR image is generated at the same time as the reference template.

Once the predicted SAR image and reference template have been produced, the latter are subjected to a correlation process similar to the correlation process as described in connection with the edge template correlator 36 (FIG. 11). A mathematical development for generating the predicted SAR image and the histomatch correlation response was presented hereinabove.

As described hereinabove, during the feature classification process, a radar cross section value is assigned to each of the pixels. For natural terrain features, the RCS is directly calculated from the Ohio State reflectivity tables. For man-made features, the RCS is calculated based upon empirical data acquired from flight test SAR images.

All vertical features affect the RCS of the scene stimulus radar model due to range layover. Range layover is caused by reflection of high objects occupying the same range cell on the ground. For simple roof buildings where the roof structure has a low reflectivity, there is minimal range layover. However, for complex roof structures or trees, range layover has a significant effect on the stimulus model. Assuming subpixel range layover, the RCS of a pixel is calculated from the following equations:

$$Y = H \sin \Phi$$

$$\sigma_i(R-Y)\sigma_i$$

$$\sigma_{i+1} = Y\sigma_i + \sigma_{i+1}$$

where,
$\Phi$ is the depression angle,
H is the feature height,
Y is the range layover,
R is the optical resolution,
$\sigma_i$ is the RCS of the current pixel and
$\sigma_{i+1}$ is the RCS of the next pixel.

Radar sidelobes can also change the RCS of the scene stimulus radar model. Radar sidelobes have the effect of smoothing the RCS over the entire image. Therefore, high reflectivity values will be integrated into neighboring low reflectivity values. This causes apparent pixel broadening. Both range layover and radar sidelobes may cause the template to correlate on a pixel other than the one that it was intended.

Three examples will demonstrate and explain causes of template bias. In each example, the target feature used is a square outline when viewed from above.

Figure 24:
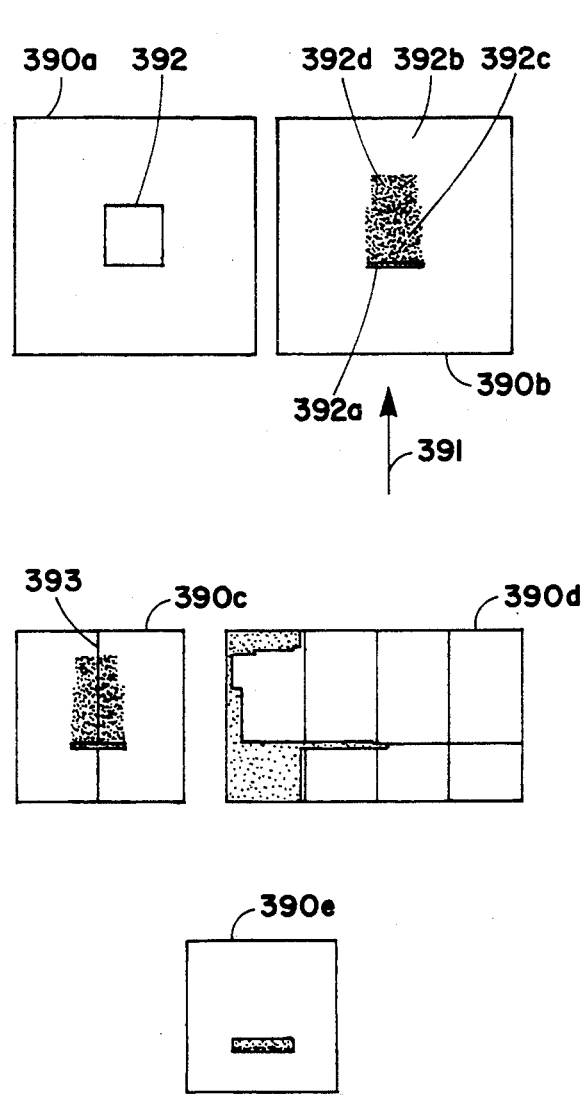
FIGS. 24, 24A, 25, 25A, 26, 26A illustrate the effects of template bias for various target features.
Figure 24A:
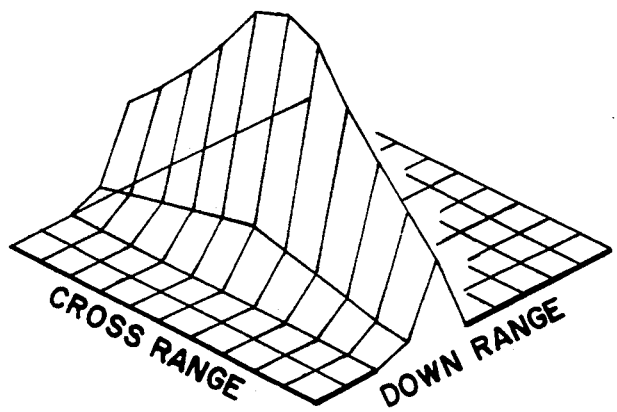

Referring now to FIG. 24, a window 390a includes a target 392 which is modeled as a simple roof building with a height of 40 feet. A window 390b shows a target feature which includes a leading edge dihedral 392a established by the vertical face of a building and a ground plane, ground clutter 392b which is modeled as grass, a roof top 392c and ground area 392d which is radar shadowed. The radar is looking at an angle as indicated by arrow 391. A window 390c shows the radar response to the target feature 392. A window 390d shows the effective processed radar cross section at one cross range filter corresponding to the vertical line 393 in window 390c. A measurement of amplitude is shown along the abscissa and a measurement of down range is shown along the ordinate. It is apparent that the radar response is dominated by the dihedral plus the range sidelobes on both sides of the peak dihedral response. A window 390e shows the template for the target feature 392. A plot of a three-dimensional track correlation surface resulting from the correlation of the template with the radar response is shown in FIG. 24A. It should be appreciated that the template correlation is performed over a region ±5 pixels relative to a correct match point in both cross range and down range. It is observed that the cross range peak of the correlation surface is in cross range cell 6, which is the correct location. The down range peak is in range cell 5, as compared with the correct range cell 6. The bias correction is 10 feet, or one range cell. The digital correlation process was triggered by the range sidelobe of the radar response, causing a one range cell bias. It should be appreciated that bias is caused by range layover and sidelobing effects.

Figure 25:
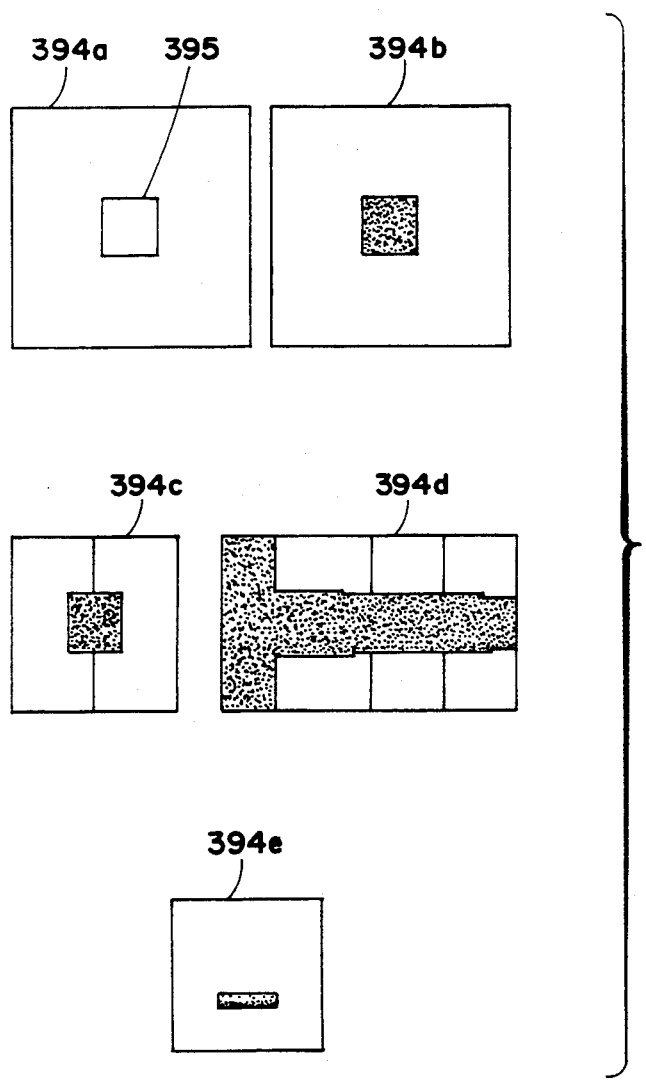
Figure 25A:
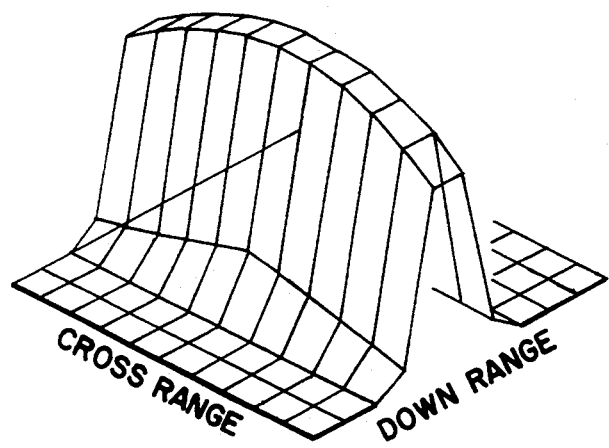

Referring now to FIG. 25, a target 395 is modeled as a complex roof building with a height of zero. A window 394b shows a target feature which results in a high RCS within the bounds of the building relative to the clutter background. A window 394c shows the radar response to the target feature 395. A window 394d shows the radar cross section response including range sidelobes for a row of cross range pixels corresponding to the vertical line in window 394c. The radar cross section (RCS) retains its peak value over the range extent of the building. A window 394e shows the template for the target feature 395 which is the same as that employed in window 390e (FIG. 24). A plot of a three-dimensional track correlation surface resulting from the correlation of the template with the radar response is shown in FIG. 25A. It should be appreciated that the cross range peak of the correlation surface is in cross range cell 6, which is the correct location. The down range peak is in both down range cells 5 and 6. The predicted down range bias is 6 feet, which corresponds to the correlation surface. The different down range bias, when compared with the simple roof building, results from the range extent of the high RCS response and the interaction with the Histomatch correlation.

Figure 26:
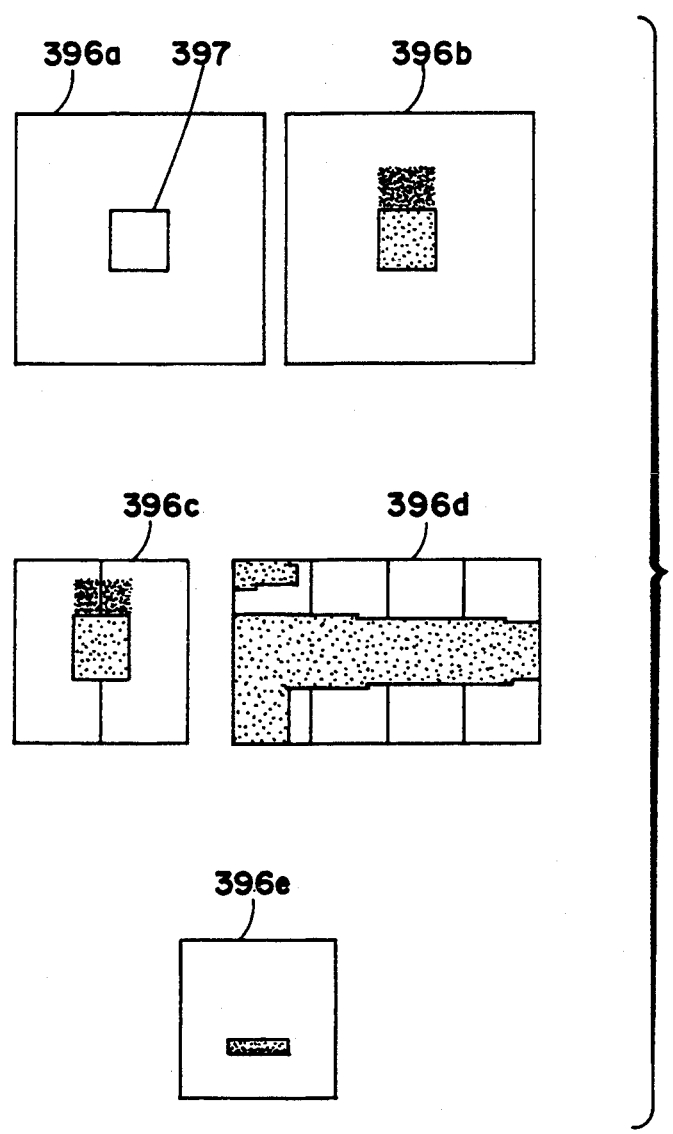
Figure 26A:
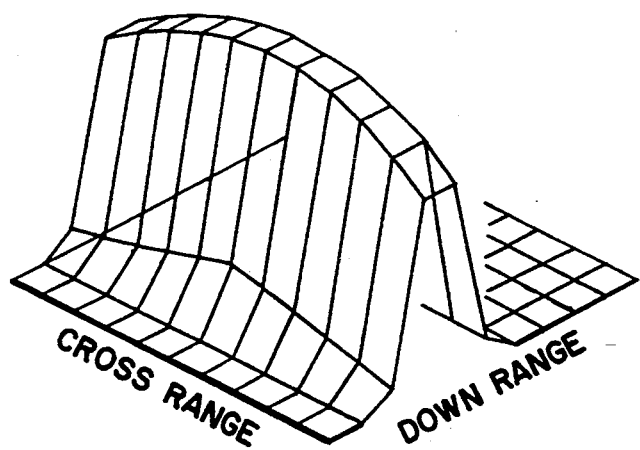

Referring now to FIG. 26, a window 396a includes a target 397 which is modeled as a complex roof building with a height of 40 ft. Radar line of sight is modeled here with a 15 degrees depression angle. A window 396b shows a target feature which results in a high RCS within the bounds of the building relative to the clutter background as in the previous example. A shadow region exists beyond the building as shown. A window 396c shows the radar response to the target feature 397. A window 396d shows the radar cross section response including range sidelobes for a row of cross range pixels corresponding to the vertical line in window 396c. It should be appreciated that the amplitude for the region which is shadowed is less than that for the background region. A window 396e shows the template for the target feature 397 which is the same as that employed in the previous examples. A plot of a three-dimensional track correlation surface resulting from the correlation of the template with the radar response is shown in FIG. 26A. The result is the top of the building appears 10 feet closer to the radar, due to range layover. The radar cross section is similar to the second example. The response is displaced 10 feet closer to the radar and radar shadowing is evident. The correlation response peaks at cross range cell 6, the correct location, and is in both down range cells 4 and 5, resulting in a 1.5 cell average location error. Predicted down range bias is 15 feet. When comparing the model of target feature 397 to the model of target feature 395, the predicted bias of 15 feet versus the predicted bias of 6 feet results from range layover from the 40 foot height attributed to the building.

For the contemplated weapon system, bias is removed by adding the estimated bias to the location of the correlation peak at each measurement update. The bias estimate is applied to all measurement updates to minimize bias estimation error. Because the estimated bias varies with aspect angle, an average over the expected dwell angles is used.

Figure 27:
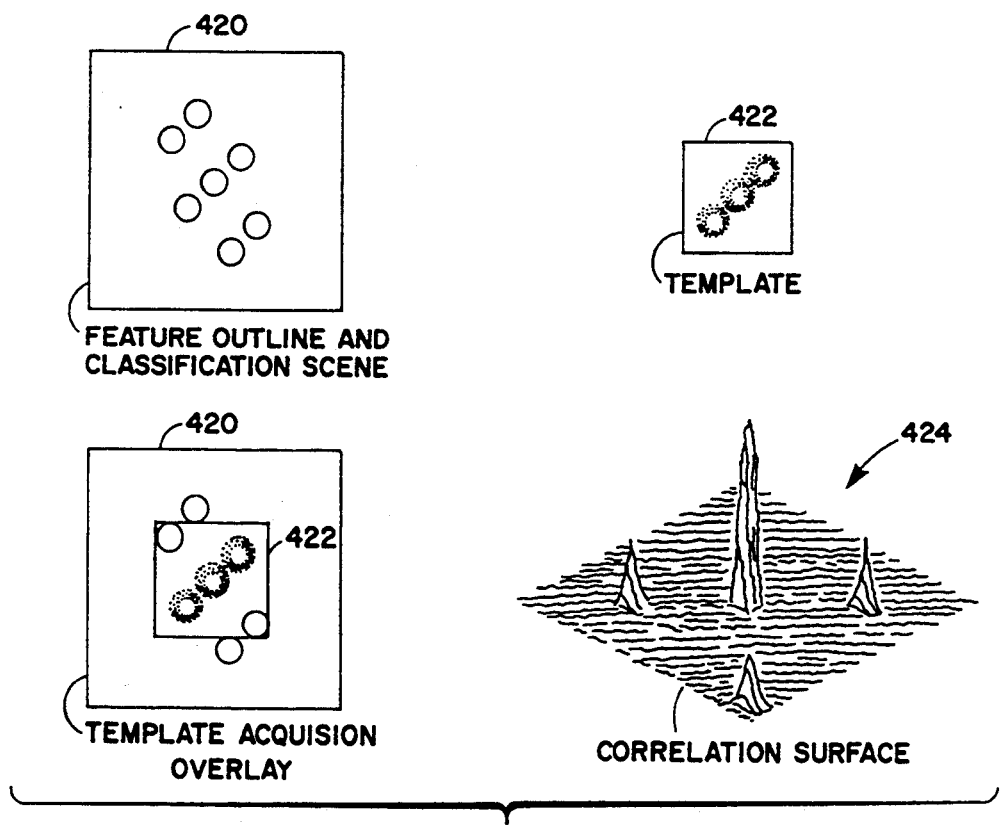
FIG. 27 illustrates a probability of detection of a typical target scene.

Referring now to FIG. 27, an example is illustrated of a probability of detection of a typical target scene 420 and a template 422 as shown. The target scene 420 includes a number of POLs. The template 422 includes three POLs. The template 422 is overlaid the target scene 420 at a location of maximum correlation. A correlation plot 424 is shown of the statistical digital correlation process response of the template 422 over the target scene 420. The probability of detection is calculated from this statistical digital correlation process response.

Figure 28:
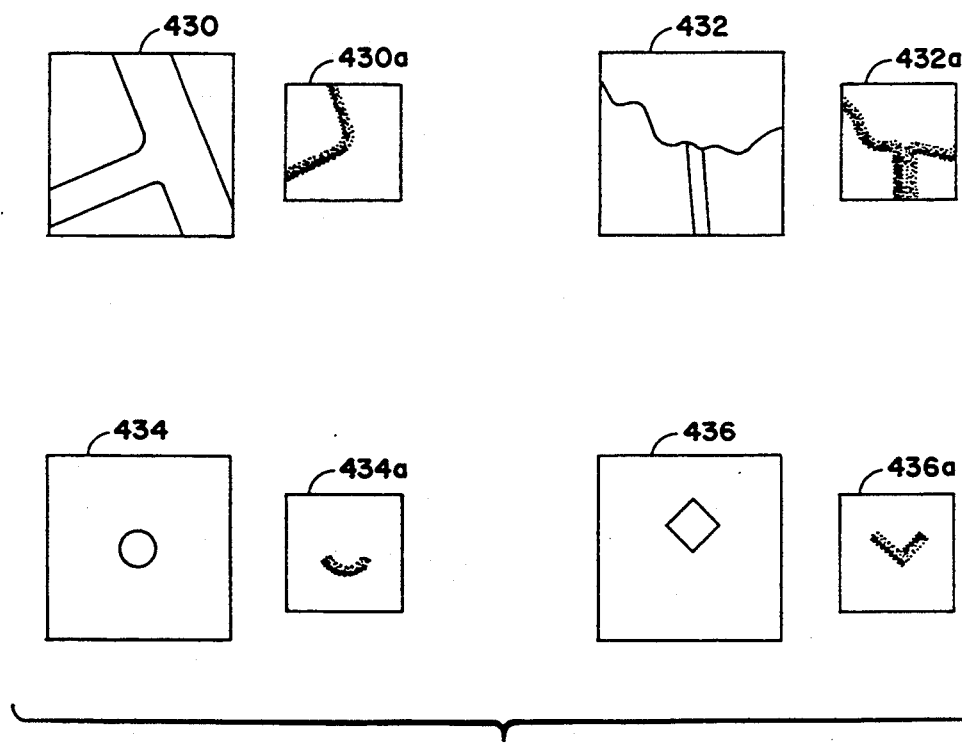
FIG. 28 illustrates typical target scenes and corresponding templates.

Referring now to FIG. 28, typical template bias calculations are illustrated for typical target scenes and corresponding templates including a runway scene 430 and a corresponding template 430a, a bridge scene 432 and a corresponding template 432a, a simple roof building 434 and a corresponding template 434a and a complex roof building 436 and a corresponding template 436a. The template bias is calculated for both the cross range and down range directions. The runway scene 430 includes grass and asphalt features in the ground plane only. Bias occurs primarily in the cross range direction because the down range features almost cancel each other. The biases are small as compared to most other scenes because of the relative small radar cross section between grass and asphalt features. Target scenes with relative height features typically exhibit larger template biases.

The bridge scene 432 includes land/water boundary features and bridge/water boundary features. When the template 432a is overlaid at a corresponding location, cross range bias is almost canceled by both sides of the bridge/water features. Thus, the bias is dominated in down range by the land/water feature which is modeled on the ground plane only.

In the simple roof building scene 434, bias is dominated in the down range direction. The cross range is totally eliminated. The height of the structure is here modeled as 30 feet high. The bias is larger than the previously described scenes because of the larger relative RCS and range layover effects as previously described.

Bias for the complex roof building scene 436 which is modeled with a 30 foot height is also dominated in the down range direction. The down range bias is larger because a complex roof building exhibits higher reflectivity along the roof top. A higher reflectivity causes a greater range layover effect which causes the larger bias.

In generating search and track templates, the templates should include template features that provide uniqueness for target acquisition and accuracy for target track. A good template should always include sufficient orthogonal features that are not obscured or shadowed by elevated objects and shadow forecasting is used to aid the mission planner in positioning the search and track templates.

In the contemplated system, to effect shadow forecasting, template generation and template verification, it is necessary for the operator to outline, classify and specify the height of key features here in a 2240 ft. by 2240 ft. area centered about the target location. With a mapped area of 1440 ft. by 1440 ft. and considering a possible uncertainty of the missile relative to the target of 1400 ft. in each direction on the ground, a mapped feature will fall within the 2240 ft. by 2240 ft. area. If a feature height is not known, it may be obtained by observing the sun shadow cast by that feature and comparing it to the sun shadow cast by a feature whose height is known. The height of a desired feature $H_F$ can be calculated by the equation $$H_F = \frac{H_R}{S_R} \cdot S_F,$$

where
$H_F$ is the height of the reference feature,
$S_R$ is the length of the shadow cast by the reference feature,
$S_F$ is the length of the shadow cast by the desired feature and
$H_F$ is the height of the desired feature.

When templates are generated, it is necessary to evaluate their effectiveness to uniquely acquire and accurately track the target or reference features. It has been observed that simple buildings, when viewed at near cardinal angles, typically do not provide orthogonal features. In the template generation process, a side of a building is predicted to provide a dihedral image if the face of the building is oriented greater than 15 degrees relative to the line of sight. With an orientation less than 15 degrees, predicted acquisition performance of a search template is poor. As described earlier, better search performance can be achieved by either adding more features, changing the engagement angle or effecting an offset aimpoint. If all features lie along cardinal angles, then adding more features or using an offset aimpoint are not desirable choices. Changing the engagement angle is the better way to enhance both the search and track template performances. It has been observed that with incident angles less than 15 degrees with sufficient features, unambiguous target acquisition performance is achievable. As shown in FIG. 20C, selecting an engagement angle which will provide an adequate predicted radar response is desirable. In FIG. 20C, it is apparent that the radar shadow cast by building 266a will obscure a portion of the side dihedral of building 265a. The radar shadow of building 265a will obscure a portion of both the dihedrals of building 264a. Thus, the portion of the features which are radar shadowed are deleted from the reference template, but sufficient features are retained to provide an adequate search template.

Figure 29:
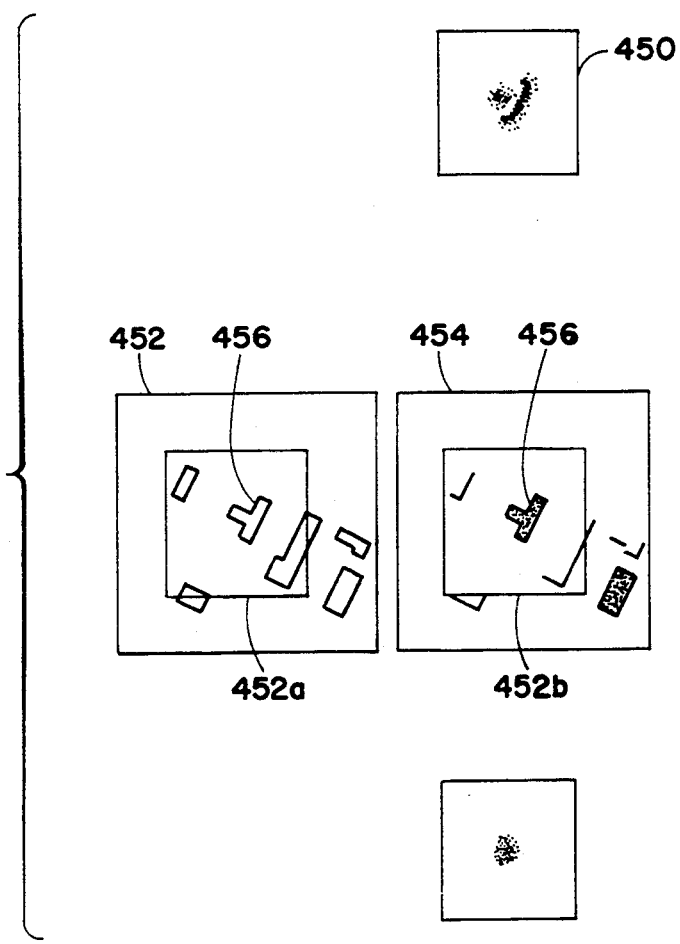
FIGS. 29 and 29A illustrates a corresponding track template of the search template of FIG. 20C.

Referring now to FIG. 29, a window 450 shows a corresponding track template used with the search template of FIG. 20C. A window 452 shows a corresponding target scene wherein each of the designated target features have been outlined. A template window 452a is shown to enclose a T-shaped building 456 and portions of other buildings. A window 454 shows a predicted SAR response for the target scene of window 452. A window 452b shows the predicted radar shadow SAR response for the area of the target scene of window 452a.

Figure 29A:
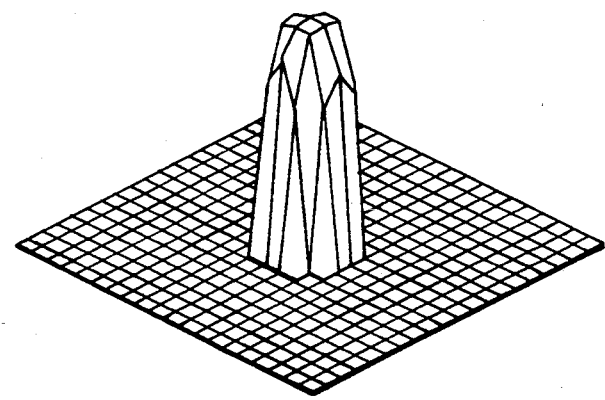

A predicted SAR image is correlated against the reference template 450 until the reference template is overlaid at an optimum target track location as shown by window 452a. FIG. 29A shows a 3-D target surface plot wherein the correct target location peaks with minimal variance.

Having described this invention, it will now be apparent to one of skill in the art that various elements of the embodiment disclosed may be changed without affecting the invention. It is felt, therefore, that this invention should not be restricted to its disclosed embodiment, but rather should be limited only by the spirit and scope of the appended claims.

What is claimed is:

1. A synthetic aperture radar system comprising:
   a) means, responsive to a controller, for transmitting a plurality of radio frequency pulses, each pulse having a frequency range wherein the frequency of each pulse changes at a linear rate during the pulse wherein an initial frequency of each successive pulse is outside the frequency range of an immediate preceding pulse; and
   b) means, responsive to the controller, for adjusting the transmission time of a successive pulse to receive a reflection of a prior pulse at an interval between the transmission of two successive pulses.

2. The synthetic aperture radar as recited in claim 1 further comprising:
   a) means, responsive to the controller, for providing the radio frequency pulses are transmitted at a point on the ground; and
   b) means, responsive to the controller, for providing the linear rate varies in response to the range between the synthetic aperture radar and the point on the ground.

3. The synthetic aperture radar as recited in claim 2 wherein:
   a) the time between the pulses varies in response to the range between the synthetic aperture radar and the point on the ground.

4. The synthetic aperture radar as recited in claim 1 wherein a reflection of a transmitted pulse is received in an interval following the transmission of a plurality of successive pulses.

5. The synthetic aperture radar as recited in claim 4 wherein the radio frequency pulses are transmitted at a point on the ground and the number of pulses between the transmission of a pulse and the reception of the reflection of that pulse varies in response to the range between the synthetic aperture radar and the point on the ground.

6. A method of operating a synthetic aperture radar comprising the steps of:
   a) transmitting a series of chirped pulses;
   b) receiving reflections of transmitted pulses from an object at a range from the synthetic aperture radar and mixing the received signal with a chirped pulse to produce a dechirped signal; and
   c) mixing the dechirped signal with a controllable signal and changing the frequency and phase of the controllable signal as the range changes.

7. The method of operating a synthetic aperture radar as recited in claim 6 wherein the step of transmitting pulses comprises sequentially transmitting a plurality of pulses, in sequentially transmitted groups of pulses, the frequency at the start of the first pulse in each group of pulses being a first value, and the frequency at the start of each successive pulse in each group of pulses exceeding the frequency at the start of the preceding pulse by a fixed amount.

8. The method of operating a synthetic aperture radar as recited in claim 7 wherein the step of changing the frequency and phase of a controllable signal comprises:
   a) changing the required frequency of the controllable signal after the transmission of each pulse; and
   b) changing the required phase of the controllable signal once for each group of pulses.

9. The method of operating a synthetic aperture radar as recited in claim 8 further comprising the step of providing a map of an array of pixels wherein the pixel in the array closest to a pixel in one section of the map is selected by multiplying the coordinate of the pixel by a matrix and selecting the pixel in a corresponding patch having coordinates closest to a transformed coordinate.

10. A method of operating a synthetic aperture radar on a flying object to form a map of an area on the ground encompassing a plurality of pixels, each representing a location on the ground, the method comprising the steps of:
    a) pointing a beam of radio frequency energy at a location on the ground;
    b) receiving reflections from objects within the patch of ground centered at the locations during a dwell time;
    c) forming an array of pixels from the received signal, the values of each of the pixels representing objects at a different location within the patch;
    d) assigning values to each of the plurality of pixels in one section of the map by selecting one of the pixels in the array of pixels, the selected pixel in the array representing a location on the ground closest to the location represented by the pixel in the map; and
    e) repeating steps a) through d) to assign values to pixels in other sections of the map.

11. The method of operating a synthetic aperture radar as recited in claim 10 wherein:
    a) the plurality of pixels in each array are organized in a two-dimensional array along a first set of two axes, each pixel in the array having associated with it two coordinates representing its displacement along each axis from the origin of the first set of axes;
    b) the plurality of pixels in each section of the map are organized in a two-dimensional array along a second set of two axes, each pixel in the map having associated with it two coordinates representing its displacement along each axis from the origin of the second set of axes; and
    c) the origin of the first set of axes for each of the arrays of pixels corresponds to the same point on the ground as the origin for one of the map sections.

12. The method of operating a synthetic aperture radar as recited in claim 11 wherein the pixel in the array closest to a pixel in one section of the map is selected by multiplying the coordinate of the pixel by a matrix and selecting the pixel in the corresponding patch having coordinates closest to the transformed coordinates.

13. The method of controlling a synthetic aperture radar as recited in claim 12 wherein a value of the matrix is computed for each dwell time.

14. The method of controlling a synthetic aperture radar as recited in claim 13 further comprising the step of controlling the flying object to fly along a patch, such patch being selected such that the angle between the flying object and the point on the ground at the center of the map and the direction of travel of the object changes at a constant rate while the map is being formed.

15. A synthetic aperture radar apparatus comprising:
    a) means for transmitting chirped pulses with a chirp slope, S, and a pulse repetition interval, $T_p$;
    b) means for receiving reflected radio signals of the transmitted pulses from an object;

c) means for determining the range between the synthetic aperture radar and the object; and d) means, responsive to the range determining means, for changing the chirp slope, S, and pulse repetition period, $T_p$.

16. The synthetic aperture radar apparatus as recited in claim 15 further comprising a plurality of signal paths, responsive to the means for receiving reflected radio frequency signals, each path comprising:
   i) means for passing a signal during a periodically occurring time interval and blocking the signal at all other times;
   ii) a bandpass filter connected in series with the means for passing signals.

17. The synthetic aperture radar apparatus as recited in claim 16 further comprising:

a) a mixer, responsive to the receiving means and to a reference signal; and
   b) means for producing the reference signal comprising:
      i) means for producing a signal having a frequency which varies in response to a frequency control input and a phase which varies in response to a phase control input;
      ii) a first accumulator having an input and having an output connected to the frequency control input;
      iii) a second accumulator having an input and having an output connected to the phase control input;
      iv) a third accumulator having an output connected to the input of the first accumulator; and
      v) a fourth accumulator having an output connected to the input of the second accumulator.

* * * * *